United States Patent
Dorsey et al.

(10) Patent No.: US 9,153,062 B2
(45) Date of Patent: Oct. 6, 2015

(54) SYSTEMS AND METHODS FOR SKETCHING AND IMAGING

(71) Applicant: Yale University, New Haven, CT (US)

(72) Inventors: Julie Dorsey, Madison, CT (US);
Patrick Paczkowski, New Haven, CT (US); Andreas Kalpakci, Lugano (CH);
Michael Nestler, Lebanon, NH (US)

(73) Assignee: Yale University, New Haven, CT (US)

( * ) Notice: Subject to any disclaimer, the term of this patent is extended or adjusted under 35 U.S.C. 154(b) by 248 days.

(21) Appl. No.: 13/693,473

(22) Filed: Dec. 4, 2012

(65) Prior Publication Data
US 2013/0222385 A1 Aug. 29, 2013

Related U.S. Application Data

(60) Provisional application No. 61/673,146, filed on Jul. 18, 2012, provisional application No. 61/604,909, filed on Feb. 29, 2012.

(51) Int. Cl.
*G06T 15/00* (2011.01)
*G06T 11/20* (2006.01)
*G06T 11/60* (2006.01)
*G06T 15/20* (2011.01)
*G06T 19/00* (2011.01)

(52) U.S. Cl.
CPC ............... *G06T 15/005* (2013.01); *G06T 11/20* (2013.01); *G06T 11/60* (2013.01); *G06T 15/205* (2013.01); *G06T 19/00* (2013.01); *G06T 2210/61* (2013.01)

(58) Field of Classification Search
CPC ....... G06T 11/20; G06T 11/60; G06T 15/005; G06T 19/00; G06T 2210/61; G06T 15/205

USPC .................................. 345/427, 589, 595, 619
See application file for complete search history.

(56) References Cited

U.S. PATENT DOCUMENTS

| | | | | |
|---|---|---|---|---|
| 7,538,774 | B2 * | 5/2009 | Kunita et al. | 345/589 |
| 8,325,179 | B2 * | 12/2012 | Murray et al. | 345/419 |
| 8,576,222 | B2 * | 11/2013 | Handley et al. | 345/419 |
| 2003/0164838 | A1 | 9/2003 | Guo et al. | |
| 2005/0007378 | A1 | 1/2005 | Grove | |
| 2005/0128210 | A1 | 6/2005 | Berger | |
| 2006/0020204 | A1 | 1/2006 | Serra et al. | |
| 2006/0082571 | A1 | 4/2006 | McDaniel | |
| 2006/0232583 | A1 | 10/2006 | Petrov et al. | |

(Continued)

OTHER PUBLICATIONS

Bae, S.H., et al., "ILoveSketch: As-Natural-As-Possible Sketching System for Creating 3D Curve Models", Proceedings of the 21st Annual ACM Symposium on User Interface Software and Technology (UIST '08), pp. 151-160 (2008).

(Continued)

*Primary Examiner* — Phu K Nguyen
(74) *Attorney, Agent, or Firm* — Mintz Levin Cohn Ferris Glovsky and Popeo, P.C.

(57) ABSTRACT

A method, a system, and a computer program product for generating a three-dimensional representation of a scene within a three-dimensional space are disclosed. A plurality of two-dimensional planes to be positioned within the three-dimensional space are generated. The plurality of two dimensional planes include two-dimensional content that is capable of being modified. The generated two-dimensional planes are positioned within the three-dimensional space. The positioning of the planes is capable of being modified.

117 Claims, 57 Drawing Sheets

(56) References Cited

U.S. PATENT DOCUMENTS

| | | |
|---|---|---|
| 2007/0122027 A1 | 5/2007 | Kunita et al. |
| 2007/0146360 A1 | 6/2007 | Clatworthy et al. |
| 2007/0146372 A1 | 6/2007 | Gee et al. |
| 2007/0182738 A1 | 8/2007 | Feldman et al. |
| 2008/0001962 A1 | 1/2008 | Lefebvre et al. |
| 2008/0252527 A1 | 10/2008 | Garcia |
| 2009/0284550 A1 | 11/2009 | Shimada et al. |
| 2009/0315978 A1 | 12/2009 | Wurmlin et al. |
| 2010/0085351 A1 | 4/2010 | Deb et al. |
| 2010/0141648 A1 | 6/2010 | Bell et al. |
| 2010/0225642 A1 | 9/2010 | Murray et al. |
| 2011/0074772 A1 | 3/2011 | Wada et al. |
| 2011/0169829 A1 | 7/2011 | Berger et al. |
| 2011/0176179 A1 | 7/2011 | Judelson |
| 2011/0202856 A1 | 8/2011 | Handley et al. |
| 2012/0007862 A1 | 1/2012 | Shefi |
| 2012/0176366 A1 | 7/2012 | Genova |
| 2013/0093768 A1 | 4/2013 | Lockerman et al. |

OTHER PUBLICATIONS

Cohen, J.M., et al., "Harold: A World Made of Drawings", Proc. of the symposium on Nonphotorealistic Animation and Rendering (NPAR), pp. 83-90 (2000).

Efros, A.A., et al., "Image Quilting for Texture Synthesis and Transfer", Proceedings of the 28th Annnual Conference on Computer Graphics and Interactive Techniques, SIGGRAPH '01, ACM, pp. 341-346 (2001).

Garland, M., et al., "Parallel Computing Experiences with CUDA", Micro, IEEE 28:4, pp. 13-27, (2008).

Igarashi, T., et al., "Teddy: A Sketching Interface for 3D Freeform Design", SIGGRAPH '99, pp. 409-416 (1999).

Kallio, K., "3D6B Editor: Projective 3D Sketching with Line-Based Rendering", Proc. of Eurographics Workshop on Sketch-based Interfaces and Modeling, pp. 73-79 (2005).

Kalnins, R.D., et al., "WYSIWYG NPR: Drawing Strokes Directly on 3D Models", ACM Trans. on Graph. 21:3, pp. 755-762 (2002).

Lau, M., et al., "Modeling-In-Context: User Design of Complementary Objects with a Single Photo", Proc. Symposium on Sketch-Based Interfaces and Modeling, pp. 1-8 (2010).

Muja, M., Flann, Fast Library for Approximate Nearest Neighbors (2009).

Olsen, D.R., Jr., et al., "Edge-Respecting Brushes", Proceedings of the 21st Annual ACM Symposium on User Interface Software and Technology (UIST '08), ACM, pp. 171-180 (2008).

Pollefeys, M., et al., "Visual Modeling with a Hand-Held Camera", Int. J. Computer Vision, 59:3, pp. 207-232 (2004).

Rother, C., et al., "Grabcut: Interactive Foreground Extracting Using Interated Graph Cuts", ACM Trans. Graph. 23, pp. 309-314 (2004).

Sachs, E., et al., "3-Draw: A Tool for Designing 3D Shapes", IEEE Comput. Graph. Appl., 11:6, pp. 18-26 (1991).

Sando, T., et al., "Effects of Animation, User-Controlled Interactions, and Multiple Static Views in Understanding 3D Structures", Proc. Applied Perception in Graphics and Visualization, ACM, pp. 69-76 (2009).

Snavely, N., "Phototourism: Exploring Photo Collections in 3D", ACM Trans. Graph 25:3, pp. 835-846 (2006).

Sollenberger, R.L., et al., "Effects of Stereoscopic and Rotational Displays in a Three-Dimensional Pathtracing Task", Human Factors 35:3, pp. 483-499 (1993).

Sutherland, I.E., et al.., "Sketchpad: A Man-Machine Graphical Communication System", New York Garland Publishers (1980).

Tolba, O., et al.., "A Projective Drawing System", Proc. of Symposium on Interactive 3D graphics (SI3D), pp. 25-34 (2001).

Tsang, S., et al., "A Suggestive Interface for Image Guided 3D Sketching", Proc. of the SIGCHI Conference on Human Factors in Computing Systems (CHI), pp. 591-598 (2004).

Ventura, J., et al., "A Sketch-Based Interface for Photo Pop-Up", Proc. Eurographics Symposium on Sketch-Based Interfaces and Modeling, pp. 21-28 (2009).

Zeleznik, R.C., et al.., "Sketch: An Interface for Sketching 3D Scenes", SIGGRAPH '96, pp. 163-170 (1996).

International Search Report for PCT/US2012/059742 mailed Mar. 11, 2013.

International Search Report for PCT/US2013/050707 mailed Jan. 15, 2014.

\* cited by examiner

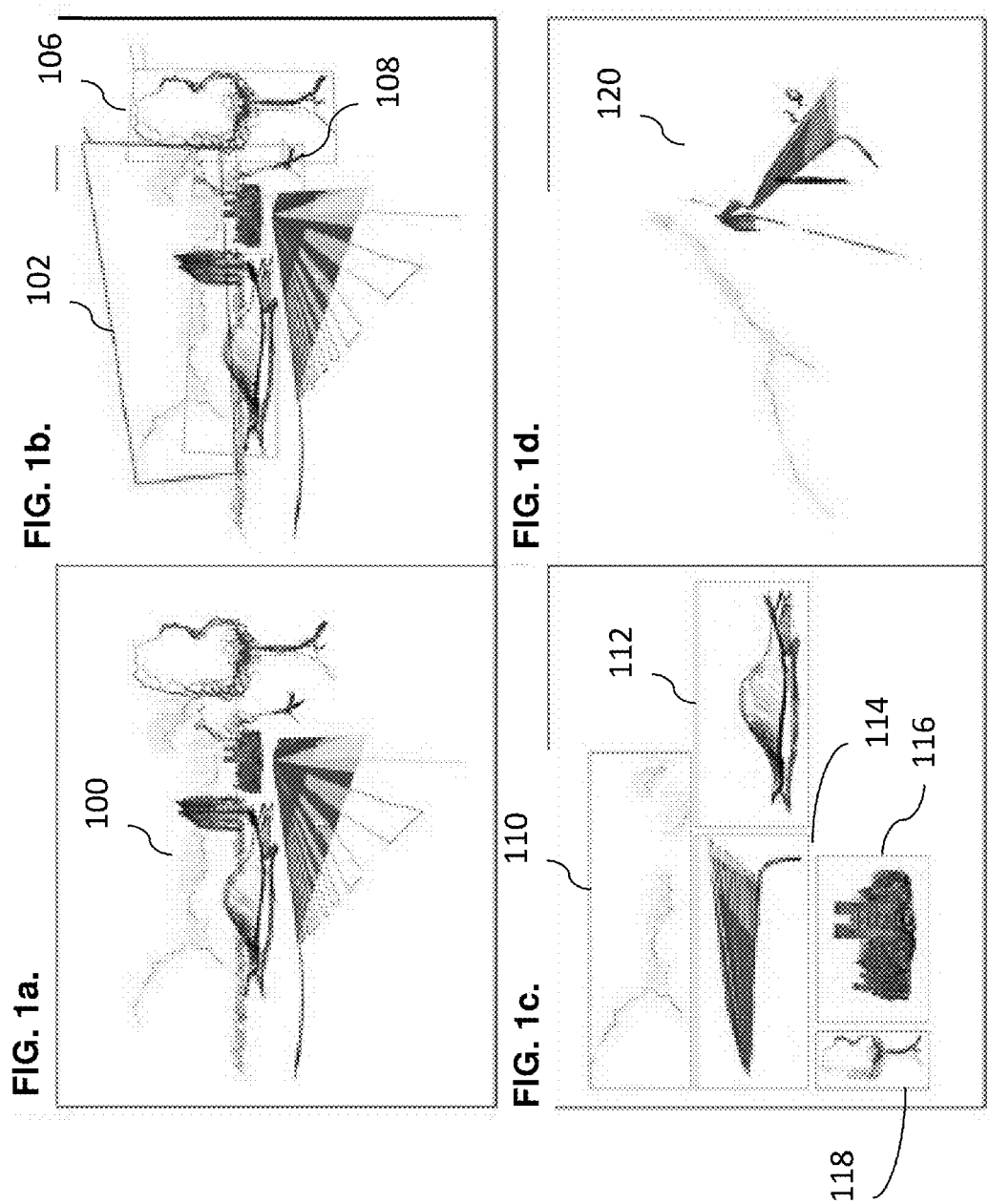

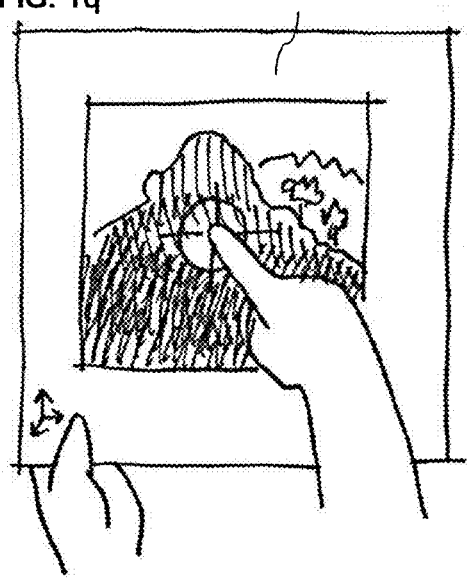
FIG. 1q    182
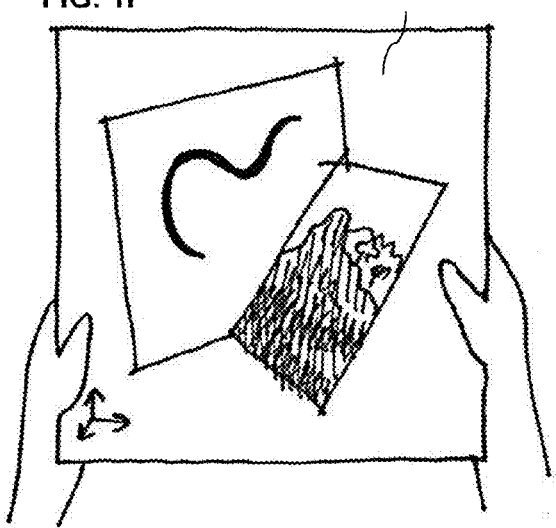
FIG. 1r    184

FIG. 8a 802
FIG. 8b 804
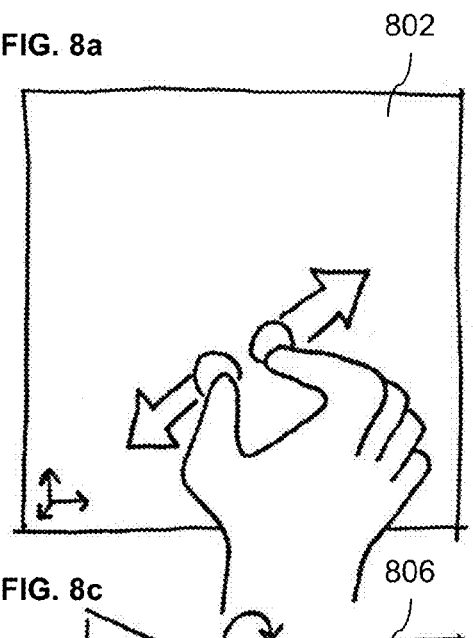
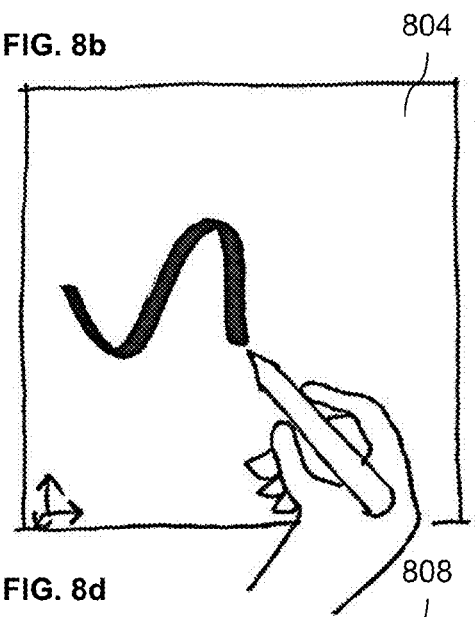
FIG. 8c 806
FIG. 8d 808
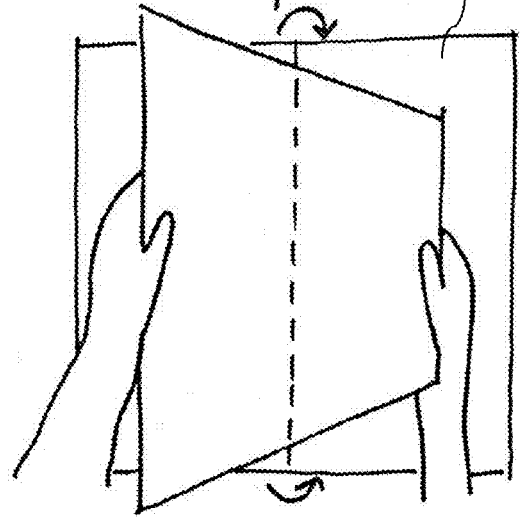
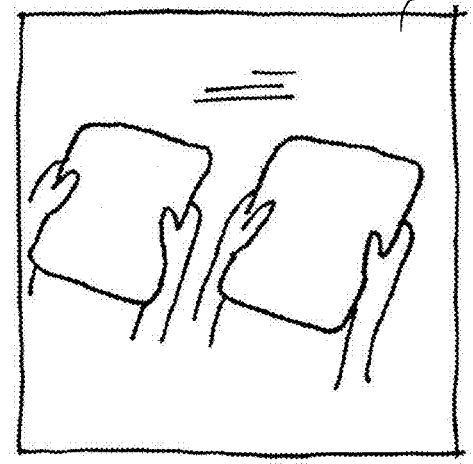

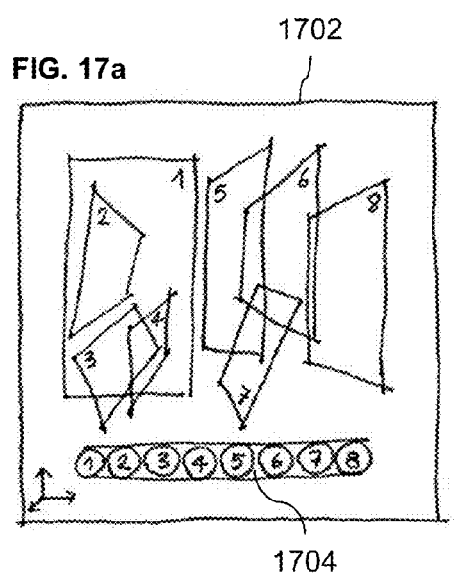 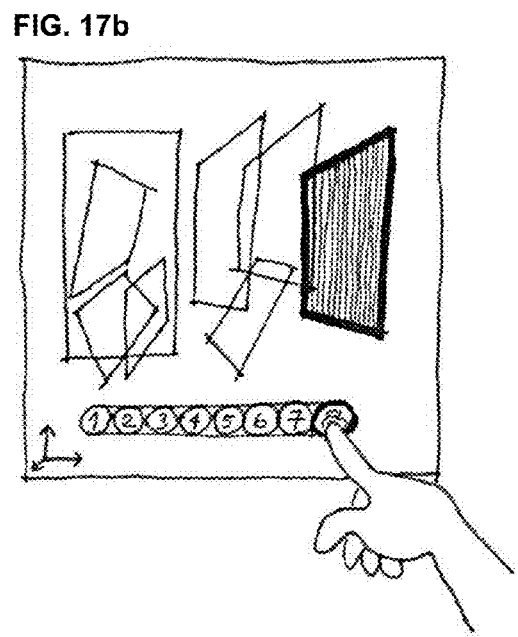
FIG. 17a  1702
FIG. 17b
1704

BEFORE

AFTER CREATION OF NEW CANVAS

BEFORE AS SEEN FROM VIEWPORT

AFTER (A) ORIGINAL CANVAS 2102

(B) DRAW STROKE 2104

(C) NEW CANVAS 2106

FIG. 33a
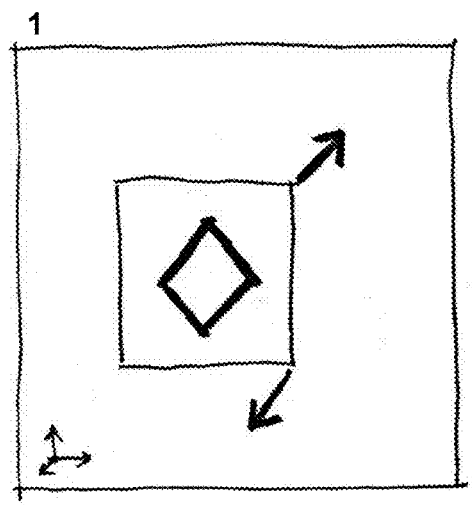
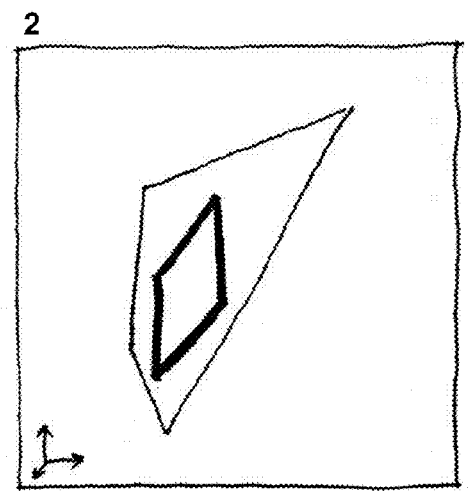
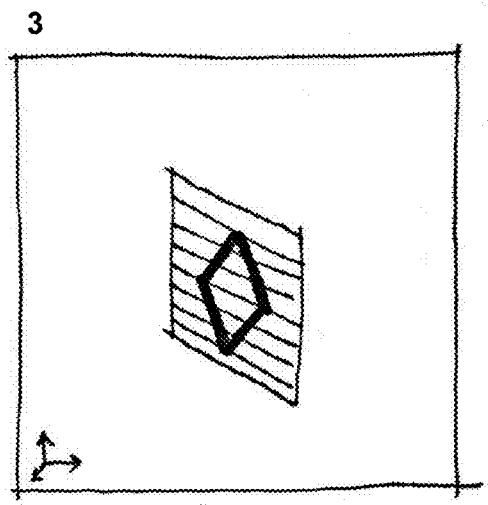
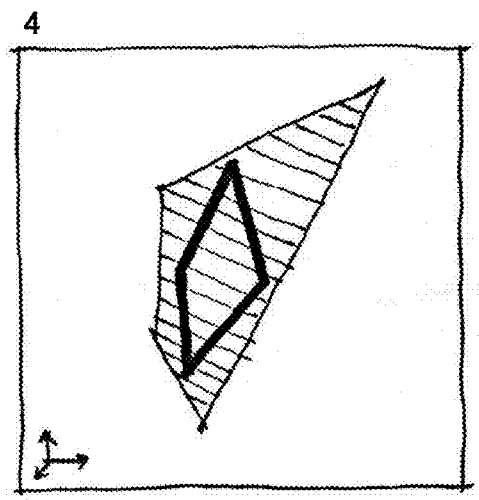

FIG. 33b
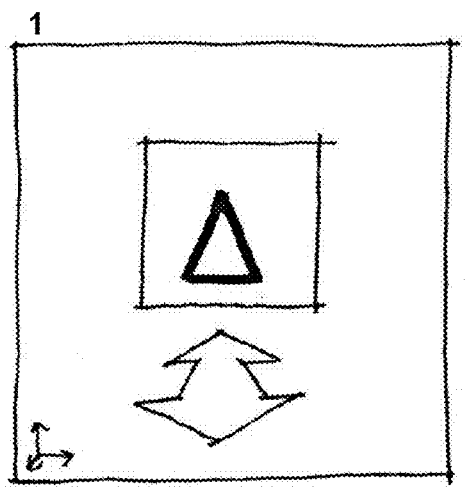
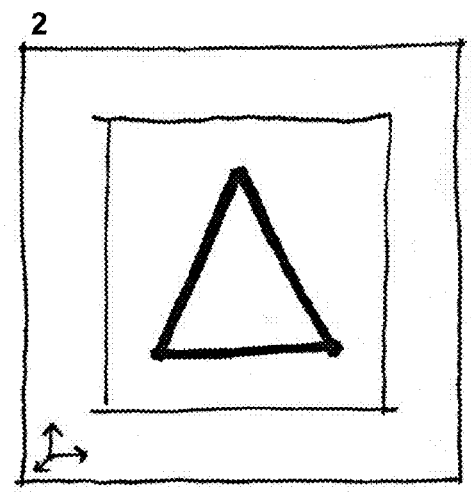
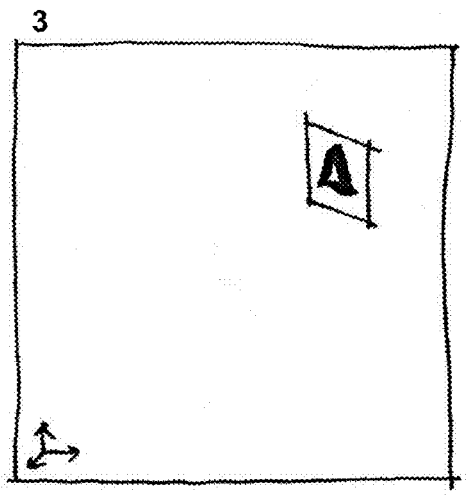
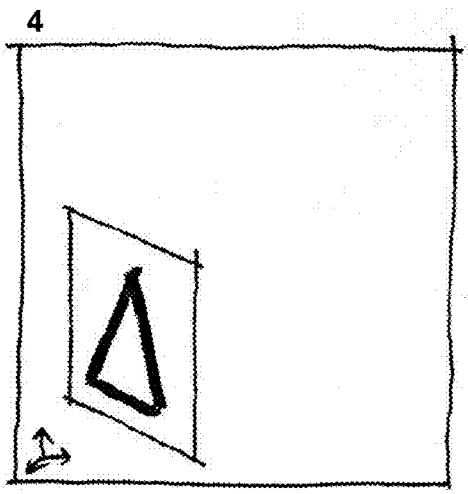

FIG. 33c
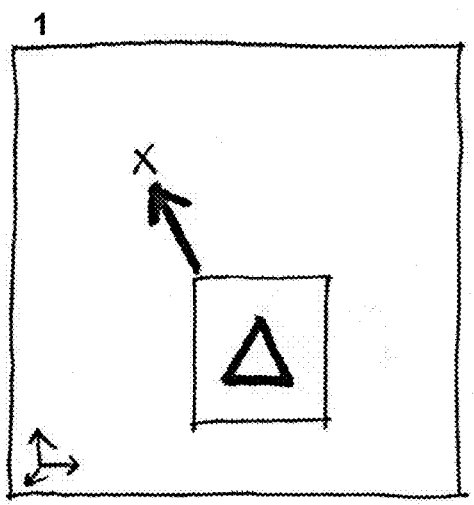
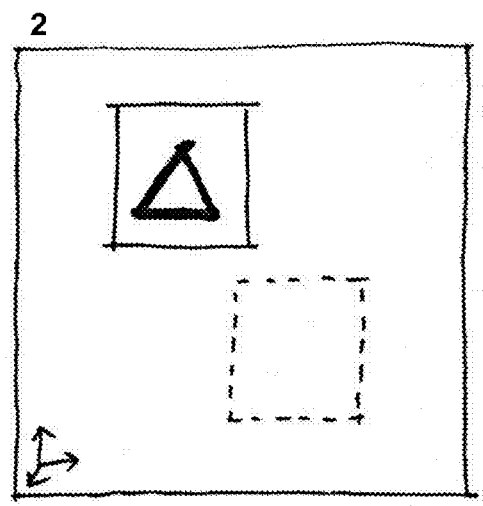
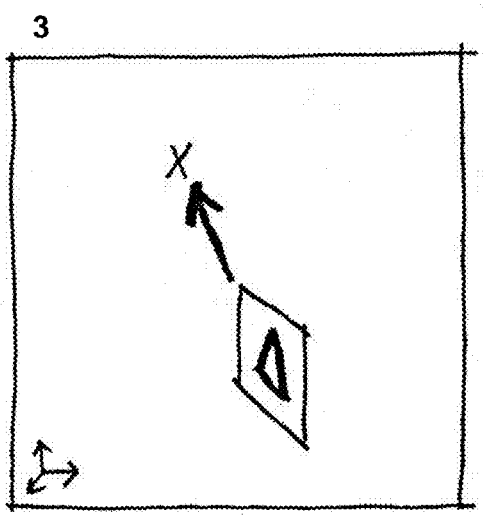
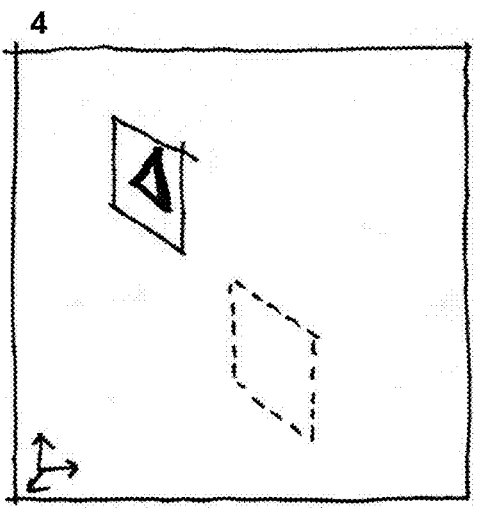

FIG. 33d
1
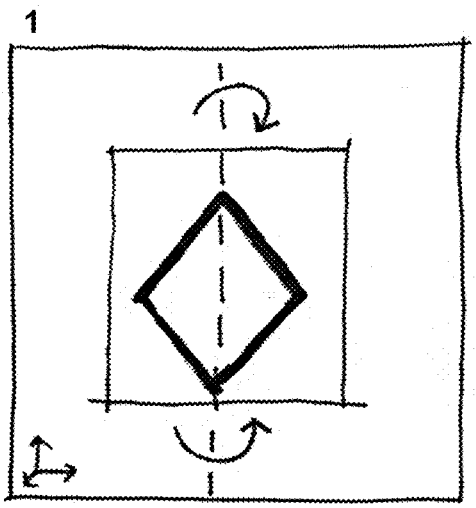
2
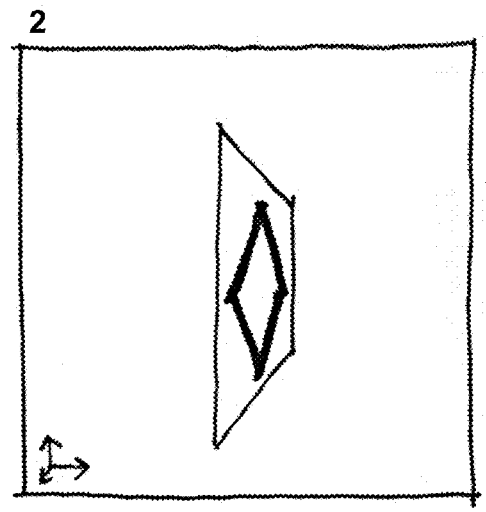
3
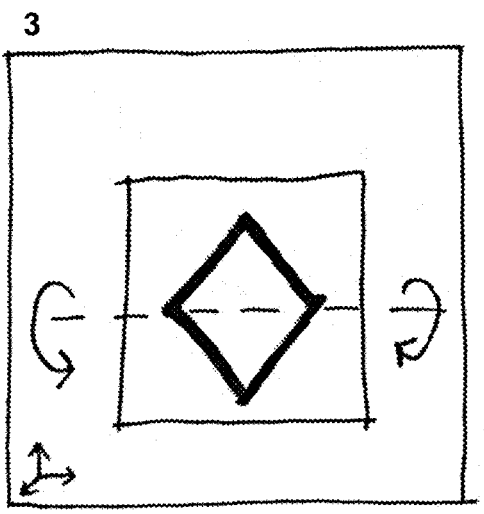
4
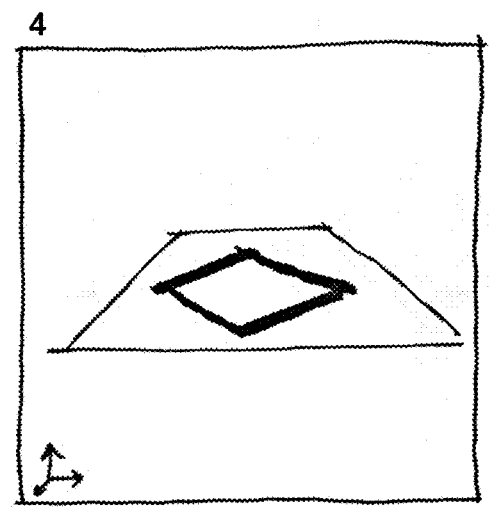

FIG. 33f
1
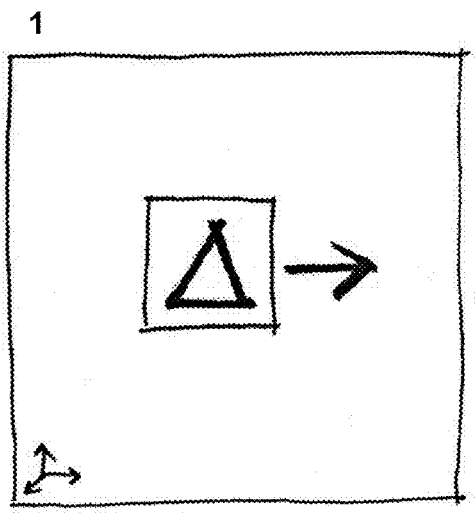
2
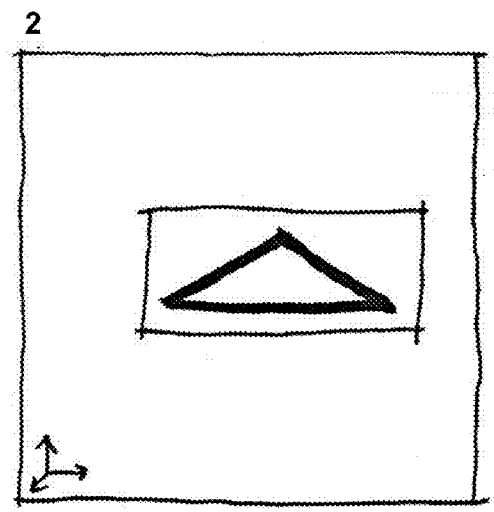
3
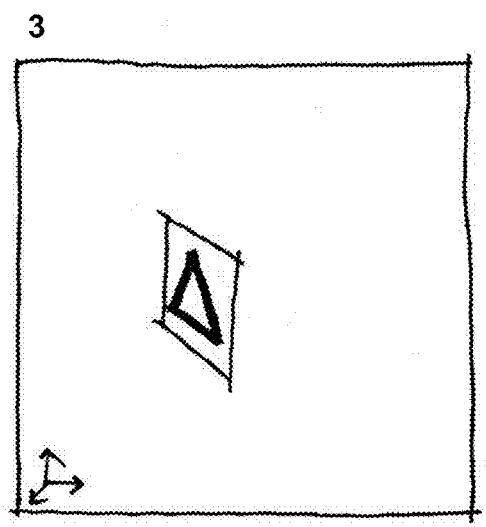
4
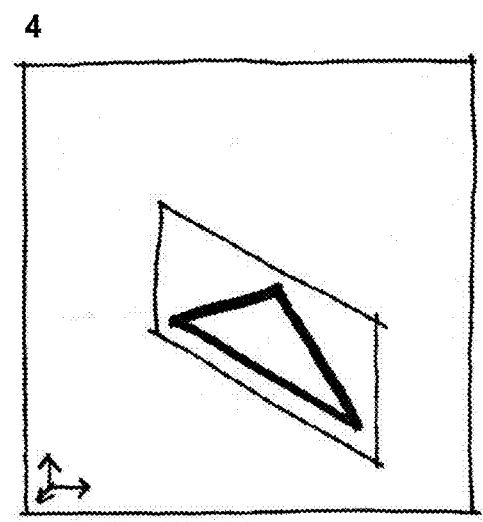

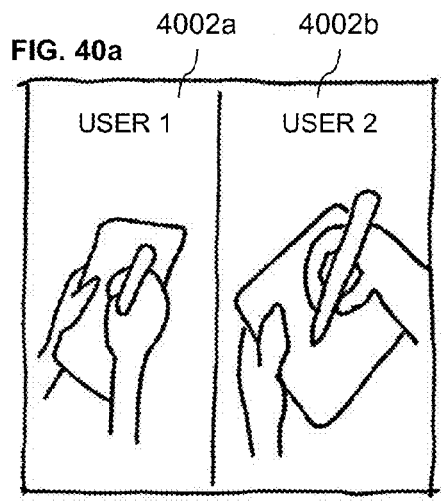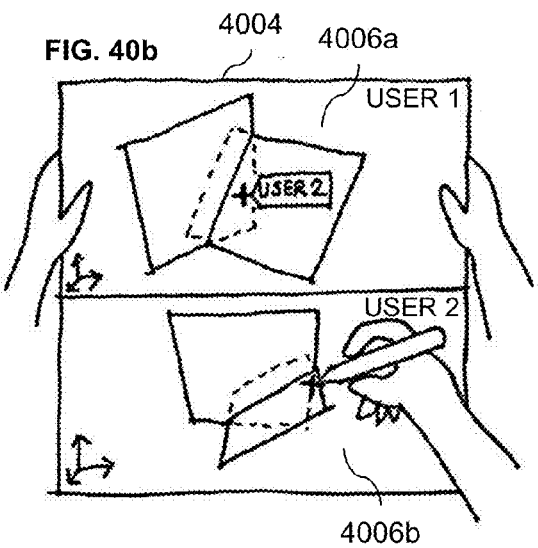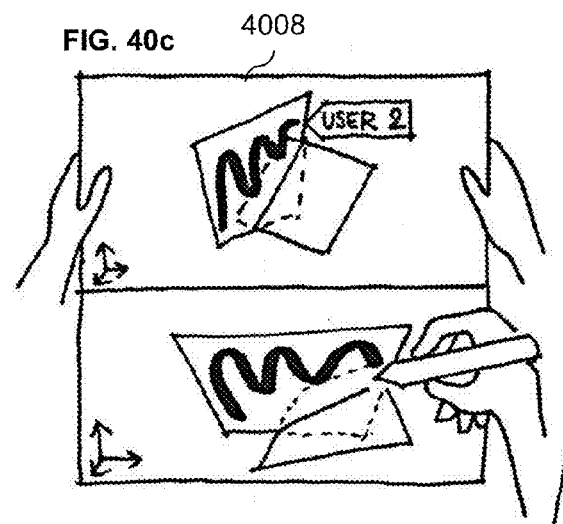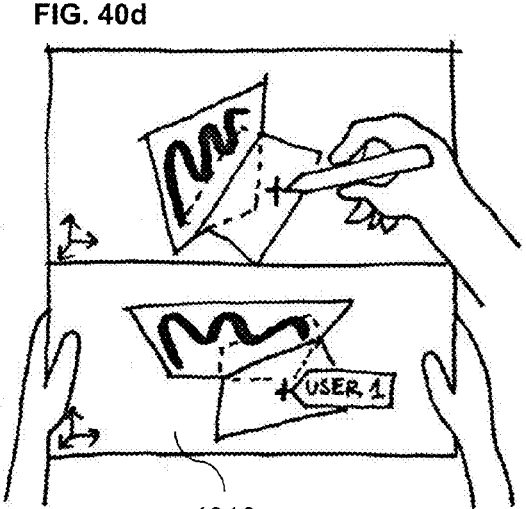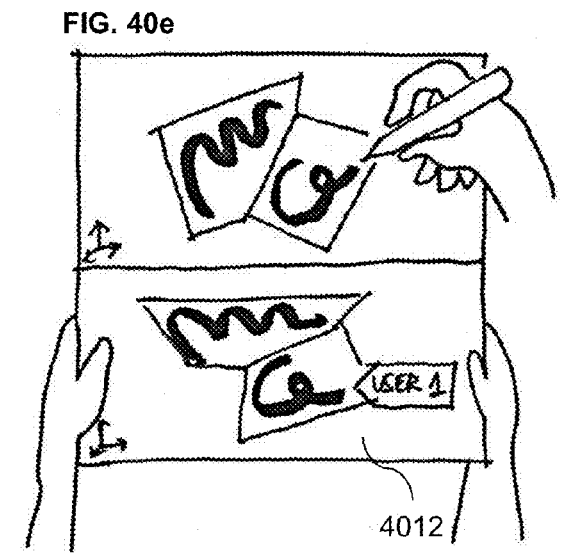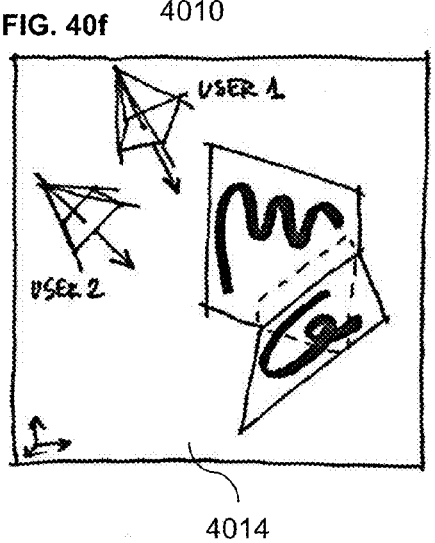

SYSTEMS AND METHODS FOR SKETCHING AND IMAGING

CROSS-REFERENCE TO RELATED APPLICATIONS

The present application is a non-provisional application and claims priority to U.S. Provisional Patent Application No. 61/673,146 to Dorsey et al., filed Jul. 18, 2012, and entitled "Systems and Methods for Sketching and Imaging," and incorporates its disclosure herein by reference in its entirety. The present application is a non-provisional application and claims priority to U.S. Provisional Patent Application No. 61/604,909, to Dorsey, filed Feb. 29, 2012, and entitled "Insitu: Sketching Architectural Designs in Context," and incorporates its disclosure herein by reference in its entirety.

TECHNICAL FIELD

The subject matter described herein relates to data processing and computer graphics and, in particular, to systems and methods for creation and/or generation of a three-dimensional ("3D") representation of a scene, and more particularly, to creation and/or generation of a 3D representation of a scene using one or more two-dimensional ("2D") planes, each including 2D content that is capable of being modified, according to one embodiment, various interactive computer-aided tools can be used to modify the 2D content, including but not limited to, tools for generating, animating, and/or editing 2D content and/or the positioning of 2D planes to form the 3D sketch representation of a scene. Such systems and methods can support conceptualization and/or ideation of a 3D representation of a scene without a need to use fully-defined and/or complete 2D and/or 3D content in the sketching process.

BACKGROUND

Conceptualization is a critical process for individuals in a variety of professional, technical, and academic fields. Designers, architects, engineers, medical professionals, animators and teachers are only some groups of individuals who benefit greatly from systems and methods designed to facilitate the conceptualization process.

Traditionally, conceptualization makes heavy use of drawing and sketching as aids to visual thinking, due to their simplicity and fluidity. Professionals will often create multiple sketches, highlighting certain properties, views, and/or ideas of a structure or concept. Typically, these sketches are 2D representations of a 3D idea; however there is no defined "middle ground" or information that "goes between" the sketch and the object. In fact, a crucial stage in the conceptualization process is the effective mental fusion of a collection of these sketches, to arrive at a more coherent and complete visualization of an idea. However, the roughness and incompleteness of conceptual sketches often make it difficult to resolve ambiguities without further input from the user, and it is difficult to provide an intuitive way to convey that information. These challenges have been passed over by 3D modeling and visualization programs that instead support the modeling of well-defined geometric objects. Beyond conceptualizing for the purpose of one's own personal knowledge, sketches are often used as aids to instruction, communication, and organization.

A computer allows 3D rather than 2D sketching. The ability to change viewpoint dynamically has been shown to enhance the perception of 3D structures or concepts compared to the mental merging of static views. (T. Sando, M. Tory, and P. Irani, "Effects Of Animation, User-Controlled Interactions, And Multiple Static Views In Understanding 3D Structures," In Proc. Applied Perception in Graphics and Visualization, ACM, pages 69-76, 2009; R. L. Sollenberger, and P. Milgram, "Effects Of Stereoscopic And Rotational Displays In A Three-Dimensional Pathtracing Task," Human Factors 35, 3, pages 483-499, 1993).

The earliest computer-based sketching system, known as "Sketchpad," was developed in the early 1980s by Ivan Sutherland (I. E. Sutherland, "Sketchpad: A Man-Machine Graphical Communication System," New York: Garland Publishers, 1980), and followed by Sachs et al.'s creation of 3-draw (E. Sachs, A. Roberts, and D. Stoops, "3-Draw: A Tool For Designing 3D Shapes," IEEE Comput. Graph. Appl., 11, 6, pages 18-26, 1991), which introduced 3D sketching to the computer graphics community. Of note are systems such as Robert Zeleznik's SKETCH (R. C. Zeleznik, K. P. Herndon, and J. F. Hughes, "Sketch: An Interface For Sketching 3D Scenes," In SIGGRAPH '96, pages 163-170, 1996), and Takeo Igarashi's Teddy (T. Igarashi, S. Matsuoka, and H. Tanaka, "Teddy: A Sketching Interface For 3D Freeform Design," In SIGGRAPH '99, pages 409-416, 1999), both early attempts at inferring 3D geometry from pen-based user gestures. One problem with prior art techniques is that they are restrictive in that they require an explicitly-defined geometry at any given time, which often impedes rapid ideation and limits freedom in expressing and exploring forms. Systems such as Harold (J. M. Cohen, J. F. Hughes, and R. C. Zeleznik, "Harold: A World Made Of Drawings," In Proc. Of The Symposium On Nonphotorealistic Animation And Rendering (NPAR), pages 83-90, 2000), and ILoveSketch (S-H. Bae, R. Balakrishnan, and K. Singh, "ILoveSketch: As-Natural-As-Possible Sketching System For Creating 3D Curve Models," In Proceedings Of The 21st Annual ACM Symposium On User Interface Software And Technology (UIST '08), pages 151-160, 2008) explore interesting ideas of 3D curve sketching, either by imposing certain constraints on the strokes, or asking users to draw each stroke in two steps. While this can create some interesting sketches, the sketching process is again less fluid and more constrained than in traditional sketching. Other projective-based stroke systems (K. Kallio, "3D6B Editor: Projective 3D Sketching With Line-Based Rendering," Proc. of Eurographics Workshop on Sketch-based Interfaces and Modeling, pages 73-79, 2005; O. Tolba, J. Dorsey, and L. McMillan, "A Projective Drawing System," In Proc. of Symposium on Interactive 3D graphics (SI3D), pages 25-34, 2001) offer interesting notions of how to effectively place 2D sketched input fluidly into a 3D scene, but with significant geometric and interactive limitations. In summary, 3D sketching systems have tried to leverage the flexibility and intuitiveness of 2D sketching, while simultaneously providing a way to add depth and dimensionality to sketches, so they may be visualized to some degree in three dimensions. However, their inconsistent and often unwanted shape inference and interpretation of depth from hand-drawn input, their imposed constraints of the input, and their lack of straightforward, fluid interfaces limits their scope and use. As such, no widespread, commercially viable 3D sketching system currently exists.

In addition to sketches and drawings, many of the aforementioned user groups traditionally use images and photographs as supplementary material in creating, understanding and conveying a concept. For example, photos and images of existing relevant structures may serve as inspiration for a user. Engineers and architects often need photographs of structures to be able to design and ideate in relation to surrounding structures. Photos and images can be used by teachers as instructional tools to convey certain ideas. Medical professionals use images to help patients and other doctors understand the characteristics of anatomical and chemical processes and conditions. Despite their widespread use in concept visualizations, a similar problem exists as in 2D sketching, in that photos and images tend to be 2D visualizations of 3D objects or scenes, and the lack of dimensionality limits the understanding, organization and mental fusion of these visual aides.

Image collections allow for virtual tours of sites. One such system is Microsoft Photosynth, Microsoft, Inc., Redmond, Wash., USA, which allows for the organization of sets of photographs in 3D of an existing location, via estimating camera positions with bundling techniques, as described by Snavely et al. (N. Snavely, S. M. Seitz, and R. Szeliski, "Phototourism: Exploring Photo Collections In 3D," ACM Trans. Graph 25, 3, pages 835-846, 2006). On the other end of the spectrum, entire detailed structures can also be reconstructed to some extent from images, using the work of Pollefeys et al. (M. Pollefeys, L. J. V. Gool, M. Vergauwen, F. Verbeist, K. Cornelis, J. Tops, and R. Koch, "Visual Modeling With A Hand-Held Camera," Int. J. Computer Vision 59, 3, pages 207-232, 2004). To provide representations closer to 3D models, techniques have been explored such as automatically creating photo pop-ups (coarse, texture mapped geometry) from single photographs. The work of Ventura et al. (J. Ventura, S. Diverdi, and T. Hollerer, "A Sketch-Based Interface For Photo Pop-Up," In Proc. Eurographics Symposium on Sketch-Based Interfaces and Modeling, pages 21-28, 2009) builds on this, by adding some user-flexibility, and designing an interface for specifying occlusion boundaries. These tools allow for the creation of 2D image-based or 3D model-based representations of scenes and can assist in viewing existing content, but they do not support the conceptualization or ideation process.

More generally, computers have recently proven critical in the visualization of real-world and/or virtual objects. Such visualizations can contribute greatly to a multitude of fields, including but not limited to, art, printed media, design, technology, medicine, automotive design, video games, films, television programs, commercials, etc. Visualizations that can be created by computers can be dynamic or static, and can be 2D or 3D. The images can be animated and can be rendered as a movie. Such images, whether static or dynamic, can be created virtually, where a virtual world can refer to an interactive environment.

Computer graphics software can be used to create the above visualizations. The availability of such computer graphics software and increased computer speeds have allowed users to produce high quality, professional-grade images, films, games, fine art, etc. using their computers.

Physical or virtual (that might not exist in a real world) objects can be represented or otherwise sketched using two broad classes of authoring tools that are available in computer graphics software. Such tools include 2D drawing and image-editing tools, such as Adobe Photoshop®, by Adobe Systems Incorporated, Mountain View, Calif., USA, and Autodesk Sketchbook Pro®, by Autodesk, Inc., San Rafael, Calif., USA, and 3D modeling packages, such as AutoCAD®, Maya®, and Revit®, all by Autodesk, Inc. Both categories of tools, while providing users with the ability to create respectively 2D images or 3D models, have significant limitations. In particular, using 2D sketching, an object can be created very fluidly and expressively, but the sketch is 2D and static. Three-dimensional modeling packages, while allowing the user to see the object from multiple vantage or viewing points, can be cumbersome, rigid and can further inhibit creativity, as the user may be required to strictly conform to specifics of the objects and/or limitations of the package and/or system that is running the package.

Thus, there is a need for a system and method that encompasses the ease of use and flexibility of sketching and imaging tools, while at the same time allowing for a clearer understanding of 3D structure and form. In other words, there is a need for a tool for generating and manipulating collections of 2D content that can then be progressively arranged and fused together in 3D space, to aid in understanding and visualizing concepts in three dimensions.

Attempts have been made in the research community to integrate a sketching system with imaging capabilities. Kalnins et al. (R. D. Kalnins, L. Markosian, B. J. Meier, M. A. Kowalski, J. C. Lee, P. L. Davidson, M. Webb, J. F. Hughes, and A. Finkelstein, "WYSIWYG NPR: Drawing Strokes Directly On 3D Models," ACM Trans. on Graph. 21, 3, pages 755-762, 2002) developed a system to annotate existing 3D models with hand-drawn, non-photorealistically rendered ("NPR") strokes in 3D. This offers the ability to add a personal rendering aesthetic to a 3D object. Tsang et al. (S. Tsang, R. Balakrishnan, K. Singh, and A. Ranjan, "A Suggestive Interface For Image Guided 3D Sketching," In Proc. Of The SIGCHI Conference On Human Factors In Computing Systems (CHI), pages 591-598, 2004) introduced an image-aided sketching interface system, where 2D images are overlaid to guide user strokes. The system then produces a coarse, structured, 3D wireframe model. Lau et al. (M. Lau, G. Saul, J. Mitani, and T. Igarashi, "Modeling-In-Context: User Design Of Complementary Objects With A Single Photo," In Proc. Symposium On Sketch-Based Interfaces And Modeling, pages 1-8, 2010) developed a system for sketches and markups on a single photo to define a 3D object. Insitu (P. Paczkowski, M. H. Kim, Y. Morvan, J. Dorsey, H. Rushmeier, and C. O'Sullivan, "Insitu: Sketching Architectural Designs In Context," In Proceedings Of The 2011 SIGGRAPH Asia Conference (SA '11), 2011), an architectural design system, integrates a sketching system with a novel lightweight, environment site representation methodology, to conceptualize architectural scenes in context. These and other existing tools, however, are too specialized, too complex for broader use, or not suitable for true conceptualization of ideas that are not yet fully developed.

The consistent property of two-dimensionality of user-generated content used in the conceptualization process lends itself to the idea of a plurality of 2D planes that can be positioned in a 3D space. The 2D planes can include a variety of content, including, but not limited to, sketches, photographs, text, videos, and any other content having various levels of detail. Initially, the content can be generated without any specification of 3D positions. The content included in the 2D planes and/or the 2D planes themselves can be manipulated in the 3D space. The 2D planes along with their respective content then can be arranged in a 3D space to generate a 3D representation of a scene. The scene can correspond to a real-world physical object and/or collection of objects, or it can be a virtual scene, or it can be a combination of both. As the scene does not require an explicit geometric representation, the 2D content admits ambiguities, inconsistencies and incompleteness. Further, the system and methods can also provide various graphical tools that can allow users to perform various manipulations of the 2D planes, their content, and/or both.

SUMMARY

In some implementations, the current subject matter relates to a computer-implemented method for generating a 3D representation of a scene within a 3D space. The method includes generating a plurality of 2D planes to be positioned within the 3D space and positioning the generated 2D planes within the 3D space. The plurality of two dimensional planes can include content that is capable of being modified. The positioning is capable of being modified. At least one of the generating and the positioning can be performed by at least one processor.

In some implementations, the current subject matter can include one or more of the following optional features. The content can include at least one of the following: an object, a texture, a color, a photograph, a photograph dependent on a predetermined angle of view of the 2D plane, a portion of a photograph, a drawing, a sketch, a stroke, a stroke dependent on a predetermined angle of view of the 2D plane, an occlusion, an annotation, an animation, and/or a video. The content can be a user-defined content. A portion of the content can be arranged on at least one 2D plane according to a referential model.

In some implementations, the representation of the 3D scene can be viewed from a least one angle of view located within the representation of the 3D scene.

In some implementations, at least one 2D plane in the plurality of planes can intersect at least another 2D plane in the plurality of planes. Further, the representation of the 3D scene can include a plurality of layers. Each layer in the plurality of layers can include at least one 2D plane in the plurality of 2D planes and at least a portion of the content. Also, the representation of the 3D scene can include at least one view-dependent layer that is viewable only from a predetermined angle of view within the representation of the 3D scene. At least one view-dependent layer can include at least one 2D plane in the plurality of 2D planes and at least a portion of the content. Further, at least one 2D plane in the plurality of 2D planes can include at least one layer that can have at least a portion of the content.

In some implementations, the method can include generating a plurality of angles of view for viewing the 3D representation of the scene, selecting an angle of view from the plurality of angles of view for viewing the 3D representation of the scene, and changing from at least one selected angle of view in the plurality of angles of view to at least another angle of view in the plurality of angles of view to view the 3D representation of the scene. The method can also include selecting a predetermined angle of view from the plurality of angles of view for viewing the 3D representation of the scene, wherein the 3D representation of the scene is not viewable from at least another angle of view of the plurality of angles of view. In some implementations, modification of the content can include selecting at least one of the content and at least one 2D plane in the plurality of 2D planes based on a predetermined angle of view and modifying the selected content and the at least one 2D plane based on the predetermined angle of view. Modification of the positioning of the plurality of 2D planes can also include grouping at least two 2D planes in the plurality of 2D planes based on a predetermined arrangement for positioning in the 3D space. The predetermined arrangement can include at least one of the following: parallel stacks grouping, axial cross-section grouping, a circumferential ring, and a random grouping. Further, modification of the positioning of the plurality of 2D planes can include positioning at least one 2D plane in the plurality of 2D planes based on at least one of the following: at least one geographical coordinate of the content contained on the at least one 2D plane, and a global positioning coordinate of the content contained on the at least one 2D plane. In some implementations, modification of the positioning of the plurality of 2D planes can include positioning at least two 2D planes in the plurality of 2D planes based on at least one of the following: at least one geographical coordinate of the content contained on at least one of the two 2D planes, and a global positioning coordinate of the content of at least one of the two 2D planes. Also, modification of the positioning of the plurality of 2D planes can include positioning at least one 2D plane in the plurality of 2D planes based on a predetermined 3D model.

In some implementations, the method can include generating additional content, wherein the additional content is configured to be placed on at least one generated 2D plane in the plurality of 2D planes an placing the additional content on at least one generated 2D plane, wherein the additional content is capable of being modified.

In some implementations, a portion of the content contained on at least one 2D plane in the plurality of 2D planes can be merged with a portion of the content contained on at least another 2D plane in the plurality of 2D planes.

In some implementations, the method can include generating another 2D plane, selecting a portion of the content contained on at least one 2D plane in the plurality of 2D planes, and placing the selected portion of the content on the another 2D plane.

In some implementations, at least one attribute for a portion of the content can be defined and the portion of the content can be modified based on the at least one attribute. At least one attribute can include at least one of the following: a thickness, a length, a width, a height, a brightness, an opacity, at least one geographical coordinate, a time, a moving velocity, a gyroscopical positioning parameter, and/or a combination thereof. Modification of the content can also include removing content from the at least one 2D plane.

In some implementations, a portion of the content contained on the at least one 2D plane can be transferred to another 2D plane in the plurality of 2D planes. Transferring can include at least one of the following: duplicating a portion of content from a first two dimensional plane to a second 2D plane in the plurality of 2D planes, pushing a portion of the content from a view-dependent 2D plane onto another 2D plane in the plurality of 2D planes, and splitting a portion of the content contained on a 2D plane into a first split portion and a second split portion and placing the first split portion onto a first 2D plane and the second split portion onto a second 2D plane in the plurality of 2D planes.

In some implementations, a portion of the content contained on a first 2D plane in the plurality of 2D planes can be projected onto a second 2D plane in the plurality of 2D planes based on at least one angle of view located within the representation of the 3D scene. The content can be modified by copying a portion of the content contained on a first 2D plane in the plurality of 2D planes and placing the copied portion onto a second 2D plane in the plurality of 2D planes. A portion of the content contained on at least one of 2D plane can also be concealed.

In some implementations, the content contained on at least one 2D plane can be split into at least two portions for placement on at least two other 2D planes in the plurality of 2D planes, wherein at least one of a position and an orientation of the at least one 2D plane is different from respective positions and orientations of the at least two other 2D planes.

In some implementations, a portion of the content can be transformed within at least one 2D plane in the plurality of 2D planes. The transformation can include at least one of the following: freeform distortion, translation, shifting, rotation, scaling, stretching and/or combination thereof.

In some implementations, a folding region in at least one 2D plane in the plurality of 2D planes can be defined and, using the defined folding region, the at least one 2D plane can be folded into at least two portions representative of the 2D plane separated by the folding region.

In some implementations, a bending region in at least one 2D plane in the plurality of 2D planes can be defined and, using the defined bending region, the at least one 2D plane can be bent to generate an axial curvature to the at least one 2D plane.

In some implementations, at least one of a position and an orientation of at least one 2D plane can be modified.

In some implementations, modification of the positioning of the plurality of 2D planes can include inserting a 3D surface into the 3D space, visualizing the 3D surface, and positioning at least one 2D plane in relation to the inserted 3D surface. Visualizing can be performed using at least one of the following: a point cloud and a polygonal mesh.

In some implementations, 2D planes can be positioned according to at least one first position within the 3D space. Then, the modification of the positioning of the generated 2D planes can include selecting at least one 2D plane to be re-positioned to at least one second position within the 3D space, and re-positioning the selected 2D plane within the 3D space according to the at least one second position.

In some implementations, a portion of the content contained on at least one 2D plane in the plurality of 2D planes can be animated. The animation can be performed based on time.

In some implementations, a plurality of users can perform at least one generating, the positioning, the modification of the content, and the modification of the positioning of the plurality of 2D planes.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations.

FIGS. 1a-d illustrates an exemplary scene that can include a collection and an arrangement of 2D images, sketches, photographs, etc. as an "initial sketch," according to some implementations of the current subject matter.

FIGS. 1k-1r illustrate an exemplary user interaction and design workflow for generating a 3D representation of a scene, according to some implementations of the current subject matter.

FIGS. 8a-g illustrate exemplary tools and capabilities of a mobile device that can be used in connection with the current subject matter system.

FIGS. 17a-b illustrate an exemplary ability to select a particular 2D plane that can be displayed in a 3D representation of a scene, according to some implementations of the current subject matter.

FIGS. 33a-f illustrate various exemplary ways in which a 2D plane can be transformed, according to some implementations of the current subject matter.

FIGS. 40a-f illustrate an exemplary scene collaboration between users, according to some implementations of the current subject matter.

DETAILED DESCRIPTION

Figure 1E:
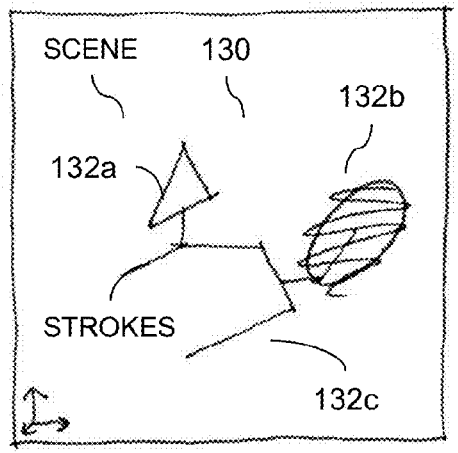
FIGS. 1e-h illustrate mockups of a 3D representation of a scene, according to some implementations of the current subject matter.

To address the deficiencies of currently available solutions, one or more implementations of the current subject matter provide systems, methods, and computer program products for creation and/or generation of a 3D representation of a scene using one or more 2D layers and/or canvases.

In the following description, the term "3D representation of a scene" shall be broadly interpreted to mean a 3D computer graphical representation of real-world object(s), real-world environment(s), virtual world object(s) (e.g., not existing in the real world), virtual environment(s), and/or any combination thereof. The 3D representation of a scene can be characterized by at least one of the following: height, length, width, velocity, time, spatial orientation, global positioning coordinates, geographical location, and/or any other characteristics, and/or any combination thereof. In some implementations, the 3D representation of a scene can include a collection of 2D content. The 2D content can be arranged and positioned in the 3D space in a predetermined manner. A user can "view" the 2D content and/or the 3D representation of a scene and/or any of its portions from a particular point or angle of view. This allows the user to view the content from different points/angles of view, thereby allowing the user to move from less clear to clearer views of the content. In some implementations, the 3D representation of a scene can also have various levels of detail or completeness which can vary from one viewpoint to another. The current subject matter's 3D representation of a scene can be different from a "conventional" 3D representation, such as a polygonal/triangular mesh, NURBS surface, etc. as well as not require a uniform completeness as may be required by a conventional 3D model.

The term "2D plane" shall be broadly interpreted to mean a graphical 2D plane that can be positioned within a 3D space and can contain various types of 2D content. The 2D plane can be infinite, i.e., without having predefined border(s), and/or it can be defined by a particular border and/or borders. In the following description, the terms 2D plane, 2D canvas, and canvas are used interchangeably and have the same meaning A "canvas" or a "2D canvas" shall be broadly interpreted to mean a 2D plane.

I. Introduction

In some implementations, the current subject matter relates to a computer graphics system, method and/or a computer-program product for generating 3D ("3D") representations of a scene using 2D ("2D") planes, where such a scene can include arrangements of compositions of 2D content, where such content can be user-created or otherwise. The generation of 3D scenes can include generation of 2D planes and/or 2D surfaces within a 3D space. Once the virtual planes are generated, they can be positioned within the virtual 3D space to generate a 3D representation of a scene. Prior to or subsequent to positioning the virtual planes, at least one instance of 2D content can be generated and can be placed on the 2D planes in the 3D scene. The 2D content can be manipulated within the 2D planes of the 3D scene. The 2D content can also be transferred between two 2D planes in the 3D scene. The 2D content(s) (whether entire or partial content(s)) can be merged from at least two 2D planes in the 3D scene. A three dimensional surface or model can be inserted in the 3D scene to provide spatial reference for arranging 2D planes and content within the scene. Further, one or more new planes can be generated from existing planes containing content and positioned in the scene, where the planes contain content and can be positioned in the scene. The visibility of portions of and/or entire 2D planes can be manipulated within the scene from at least one, and possibly all 2D views of the 3D scene. The current subject matter can also allow manipulation of how the 3D scene can be viewed.

In some implementations, the current subject matter can be configured to provide a user with a variety of graphical system components, computer graphical object visualization and/or manipulation tools, as well as a plurality of graphical user interfaces that can assist the user in performing at least one of the above functionalities. The following description illustrates further details as to the various system components, tools, and interfaces. As can be understood, the current subject matter system is not limited by the specific embodiments described herein.

In some implementations, the current subject matter can be configured to allow the user to create a 3D representation of a scene using 2D planes and/or canvases within a 3D space. The user can be allowed to manipulate canvases that can contain 2D content, including but not limited to, photograph, computer drawings, user-created sketches, text, video, content, textures, colors, and/or any other graphical objects, and/or any combination of the above. Such canvases can be created/manipulated/positioned for any purposes, including but not limited to, defining a particular shape or form of an object and/or a scene, sketching designs of a building, editing a photograph, designing a medical device, sketching an automotive part, etc. In some implementations, the current subject matter can be used in the creation and/or representation of various objects and/or scenes in various fields, which can include, but are not limited to, architectural design, movie storyboarding, fashion design, interior design, automotive design, scientific research, engineering design, and/or for any other purposes.

In some implementations, the current subject matter can provide a computer-implemented graphics system that can allow a user to sketch and/or visualize a 3D representation of a scene using at least one or a plurality of 2D representations, images and/or drawings that the user can create, where the drawings can represent various aspects of the 3D representation. In particular, a drawing can include, but is not limited to, at least one of the following: a graphical, an abstract, and/or an approximate illustration of a 3D structure and/or a portion of a 3D structure; a view-dependent perspective drawing of a 3D structure; a sectional view of a 3D structure; referential data associated with a 3D structure; a representation of the surface qualities of a 3D structure (e.g., material, color, fine details, etc.); a relationship between two or more concepts or structures; and/or an annotation of a 3D structure; an animation and/or any other moving graphical structure; a video; and/or any other structures, features, objects, etc., and/or any other combination thereof. The 2D and 3D representations can be generated using a computer that can include a processor, a memory (temporary and/or permanent), input/output device(s) (e.g., a keyboard, a mouse, a monitor, a touchscreen monitor, etc.). A computer graphics hardware and/or software can be installed on the computer to allow generation and/or manipulation of the 2D planes (including their content) and/or 3D representations by a user using input/output device(s). The computer can be a personal computer, a laptop computer, a smartphone, a cellular telephone, a tablet, a graphical tablet, a personal digital assistant ("PDA") device, an iPhone®, an iPad®, an iPod®, and/or any other device or combination of devices. The user can create and/or manipulate the 2D and/or 3D representations either by entering appropriate commands through the input/output devices (e.g., typing using a keyboard, clicking an icon on a screen corresponding to a command, touching a location corresponding to a command on a touchscreen, as well as by any other means). The canvases can be defined and placed for user sketches, photographs, painted textures, videos, animations, and/or other 2D content, and/or any combination thereof. The 3D representation can be generated by the user entering various computer graphics commands either using a mouse, a keyboard, a gesturing command, a stylus tool, a graphics tablet, etc. into the computing device, where the commands that can correspond to certain operations on various parameters, including but not limited to, entering, changing, adjusting, varying, etc. The various parameters can include, but are not limited to, textures, colors, lines, angles, orientation, and/or any other parameters and/or a combination of parameters of a particular graphical object and/or objects displayed in an image and/or portion(s) of an image and/or the entire image. The graphical object can correspond to a graphical representation of a physical object that can exist in the physical environment (the environment and/or the physical object are not necessarily created by the user) and/or a virtual object that can be created by the user using a computing device (which can be any computer graphics object, e.g., a computer drawing, a texture, a color, etc., that does not necessarily correspond to any physical object that may exist in the physical environment). The graphical representation can be a photograph, a drawing by the user, etc. The operation(s) can be implemented by typing commands in a computer prompt, moving a mouse cursor or otherwise manipulating an image, a portion of an image, a graphical object displayed on an image using various methods including, but not limited to, a joystick, a mouse, a keyboard, etc., using finger(s) (e.g., such as in the case of an iPad, iPod, iPhone, etc. and/or any other touch screen device), a stylus tool, and/or using any other methods and/or combination of methods. The canvases can be used to define, view, and/or manipulate objects and/or various representations as well as define, view and/or manipulate a particular form. The defining, viewing, and/or manipulation can occur in the 3D space. Canvases, sketches, photographs, painted textures, 2D content, and/or other objects as well as their use within the current subject matter's system will be described in further detail below.

In some implementations, a canvas can be a 2D computer graphics plane disposed within a virtual 3D computer graphics space. As will be apparent from the following discussion, a user can create, view, manipulate, etc. the canvas on a computer screen (or any other output device). In some implementations, the canvas can be constrained by specific dimensions (e.g., length, width, depth, number of pixels, etc.). Alternatively, a canvas can be dimensionless and can include no inferences about scale, orientation, size, etc. of the content that can be placed on the canvas. It can be represented without any finite boundaries. A canvas can provide an appearance of a simple sheet of paper that can be used to create images, textures, colors, manipulate photographs, etc. In some implementations, grid lines can be generated by computer graphics software to be overlaid on the canvas, that can convey how the canvas is oriented in the 3D space relative to an angle of view (e.g., such as a camera point of view, user's point of view, and/or any other angle of view). A 3D representation can include one 2D canvas. In some implementations, a 3D representation can include a plurality of 2D canvases.

In some implementations, the user can manipulate a canvas by making various graphical changes (e.g., adding, removing, altering, etc.) to an object displayed on the canvas. The graphical changes can include, but are not limited to, for example, entry of user strokes or sketches on the canvas, placement of photographs on the canvas, entry of user-painted textures on the canvas, embedding animations and/or videos in the canvas, entry of various other content, rotation, movement, sizing/re-sizing, shaping/re-shaping, etc. of objects displayed on the canvas, and/or any other manipulations and/or any combination of manipulations. Each such manipulation can be represented by a graphical command that can be entered by the user (as described above) causing the computer to perform a corresponding manipulation.

Further, user sketches can include collections of strokes projected onto the canvas, where each stroke can list sequentially connected points. Photographs or images can be placed on the canvas in full, partially, and/or certain portions/objects appearing on the photographs can be "cut out" from the photographs and placed on the canvas. User-painted textures (or computer-generated textures) can be similar to the photographs and can be painted by the user (or generated by the computer) using a variety of tools (e.g., brushes, lines, images, etc., all represented by an appropriate graphics software command(s)) and, like photographs, can be represented as texture mapped planar polygons as well. The content can be freely selected, moved within the plane of the canvas, overlaid on top of one another (e.g., a sketch can be placed over a photograph; an opaque surface can be painted over a sketch; textures, colors, and/or other features of a canvas can be changed and/or manipulated), and/or duplicated any number of times. Any combination of the above functionalities and/or operations can be performed by the user, the system, and/or both, either manually, semi-automatically, and/or automatically. In addition, a canvas can contain multiple layers, which can be disposed in the same plane, in a different plane, across multiple planes, etc. The layers can have a distinct ordering (e.g., front to back). The layers can also be selectively displayed, displayed with varying transparencies, blacked-out, activated, de-activated, accessible, inaccessible for manipulation, etc.

In some implementations, to create a 3D representation of a scene, the user can begin with a 2D canvas without any initial specification of positions, or views, or any inference of a perspective, or primitive shape(s), and/or any other restrictions. The user can then position the created canvas(es) in 3D space. The user can accomplish this by fusing and considering 2D views together by transferring individual drawn strokes onto new planes other than the one on which they were originally drawn. The fusing of 2D objects into a 3D representation can be accomplished using any known techniques. The user can control stroke visibility from different views and can control positioning and orientation of the 2D canvases. Once enough 2D canvases containing strokes are generated, the 3D representation of the physical object can be formed through the combination of the created 2D canvases. In some implementations, the user can collect and arrange 2D canvases as well as photographs as an initial "sketch" (similar to a collage-type assembly) to form a 3D representation of a scene.

In some implementations, the current subject matter system can provide a 3D representation for a scene as a collection of 2D canvases or planes, which can be created and/or placed relative to one another in a virtual 3D space. A canvas can hold a sketch and/or an image or other object(s) and/or various combinations of the above. In some implementations, the current subject matter system can provide a variety of graphics functionalities or tools for creating, editing, transforming, and/or reviewing a collection of canvases and can allow the user to view the 2D sketches and objects which can be combined to generate a 3D representation of a scene as represented by the 2D canvases.

In some implementations, one of the advantages of the current subject matter includes allowing a smooth transition from 2D drawing and image editing (in a planar or 2D configuration) to 3D representation of a scene. The current subject matter system can be especially advantageous to users employing tablet computers, smartphones, laptops, and/or other portable computing devices.

In some implementations, the current subject matter can also integrate with a computer system input means that can include but is not limited to, a gestural interface (e.g., such as the one on a touch screen computing device), a mouse, a keyboard, a touch screen, a virtual reality hardware/software input device/system, as well as any other devices/systems and/or any combination thereof. In the case of a gestural interface, user gestures can correspond to certain functions in the system, e.g., sketching, moving a canvas, etc. For functions that might not require additional user input, such as specific location indications, various graphical tools (e.g., computer screen buttons) can be used. In the case of keyboard/mouse input, mouse motions can be interpreted as gestures and can be supplemented using keyboard shortcuts indicating specific functions.

In some implementations, the current subject matter can include different operating states that can allow generation of a 3D representation of a scene. The states can include, but are not limited to: a sketching state, a viewing state, and/or other manipulation states. The sketching state can allow the user to sketch object(s) using various computer graphics sketching tools. The viewing state can allow the user to view the object(s), canvas(es), and/or entire 3D representation of a scene from at least one angle of view. The manipulation states can allow the user, using various computer graphical tools as well as any other computing tools, to manipulate object(s), group(s) of objects, and/or canvas(es) in various ways. Each of these states will be discussed in more detail below.

The current subject matter system can also allow switching between different states. For example, in the sketching state, the gestures can correspond to sketching tools. In the viewing state, the user can move around the scene camera and view the object(s), canvas(es), and/or 3D representation of a scene. In other states, the user can perform various manipulations, which can correspond to various functions, including, but not limited to, moving a canvas and its content, rotating a plane and its content, folding a portion of a plane and its content, etc. Further, the current subject matter can also allow performing some functions that can be used at all times, which can include, but are not limited to, saving/loading, undoing/redoing operations, showing/hiding canvas bounds, etc.

In some implementations, the system can interface with built-in hardware/software, including, but not limited to, a compass, a gyroscope, an accelerometer, a global positioning device, a stylus tool, a camera, and/or any other hardware/ software. This can be accomplished through the use and/or implementation of specific application programming interfaces ("APIs"), which can allow access to information about and/or control the particular hardware/software.

In some implementations, any known stylus tools can be used and recognized by the user's computing device and such tools can be used for sketching object(s), canvas(es), and/or scene manipulations. A single finger and/or multiple fingers and/or palm pan gesture(s) (such as those that can be used with a touch screen computing device) can be used as well to perform these functions.

When taking a photograph or a video using a camera hardware/software in the system, the camera can produce a feed (e.g., an image, a video, etc. prior to it being captured) that can be overlaid on the virtual scene as a preview of the photograph/video that is about to be taken (i.e., as the user computing device is moved, the preview can change accordingly). Once the user takes the photograph/video, it can be converted into a texture mapped polygon in the system, and added to the content of a newly created canvas.

In some implementations, other hardware/software devices can be used as geolocation tools within the current subject matter system. Geolocation data can be acquired, as necessary, from these devices, to track the GPS location and/or orientations of the mobile computing device. The location and/or orientation can be used for at least one of the following: (1) to place canvases at corresponding locations and orientation within the virtual scene (the "real-world" coordinate space is mapped to the virtual 3D coordinate space); (2) to orient and place the scene camera to correspond with the orientation and position of the mobile computing device.

In some implementations, the system can implement scene graph data structures to represent content within the scene. Low level objects can include strokes, photographs, etc. Any number and variety of these can have a specific canvas in the scene as their "parent", i.e., the objects can lie on the same 2D surface as the canvas. In turn, two or more canvases can be grouped together to form canvas groups, which can then be positioned as a single entity within the scene, sketched on simultaneously, scaled simultaneously, etc. A full map structure of all these objects can be stored, for easy access, removal, etc. List structures can be used to store ordered elements such as points of a stroke, layers on a canvas, or points of an outline of a photograph, for efficient traversal, and for easy partitioning, such as when a stroke and/or an image is segmented into two or more strokes and/or images. A binary space partitioning ("BSP") tree can be used to correctly render transparent 2D content from back to front (with respect to the user's viewpoint).

In some implementations, 2D objects can be manipulated in a local, 2D coordinate space. Vertices lying within the plane of the object can be represented in the local coordinate system, and/or in the global, 3D coordinate system of the virtual scene.

Further, any input from the user's computing device's input device, e.g., a stylus, finger, etc., can be initially represented in 2D screen coordinate space. Based on the parameters of the current scene camera, any such point can be unprojected into 3D space, using functions such as OpenGL's unproject function. To accomplish this, a depth parameter can be used to determine how far the point should be from the scene camera. For any plane positioned in 3D space, this depth can be computed, and if it is positive (i.e., the plane is visible in front of the camera), the point can be projected onto the specified plane, by first unprojecting into 3D space, such that the point can lie on the specified plane, and subsequently transforming the point into the local coordinate space of the canvas. In such a way, content sketched and/or drawn on the monitor (e.g., vertices of a stroke, outline vertices of an image, etc) can be automatically projected from the screen plane of the camera onto a selected plane.

Many operations on vertices or sets of vertices corresponding to portions of visible two dimensional content might require converting between screen coordinates, local 2D planar coordinates, and global 3D space coordinates. For this reason, a point data structure can be used for all points in the system that can allow storage of all three of these coordinates, for easy conversion. A set of functions converting between these coordinate spaces store the resulting converted coordinate directly within the same instance of the point data structure.

In some implementations, the current subject matter system can allow a user to collect and arrange 2D images, sketches, photographs, etc. as an initial "sketch" (collage-like assembly) of a 3D representation of a scene. FIGS. 1*a*-*d* illustrate such an arrangement. FIG. 1*a* illustrates a 3D representation 100 of a physical environment to be sketched. FIG. 1*b* illustrates the same representation 100 including canvases 102, 104, 106, 108 that bound various portions of the representation. For example, the canvas 106 bounds a tree present in the representation. FIG. 1*c* illustrates each selected graphical object in the 3D representation 100 being shown in separate canvases 110-118. For example, a "sky" object is shown in the bounded canvas 110, a "building complex" object (e.g., the Ingalls Ice Skating Rink facility at Yale University, New Haven, Conn., USA) is shown in canvas 112, a "road" object is shown in canvas 114, a "building" object is shown in canvas 116, and a "tree" object is show in canvas 118. FIG. 1*d* illustrates the 3D representation 100 from a different viewpoint than the view shown in FIG. 1*a*. The viewpoint can be represented by a particular viewing angle of the scene camera (e.g., a user looking at a physical object from a certain position) and can be appropriately selected, changed, predetermined by a user using the graphics software installed on the user's computing system. Referring back to FIG. 1*d*, images, sketches and combinations of the two can be positioned to appear correct in at least the view the user originally had in mind when the 2D image or drawing was generated. The user can use and manipulate 2D canvases to create a 3D representation of a scene.

Figure 1F:
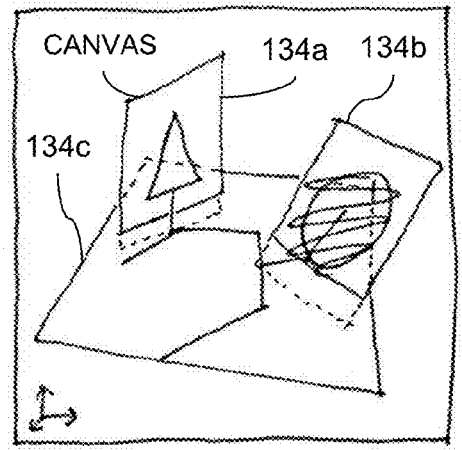
Figure 1G:
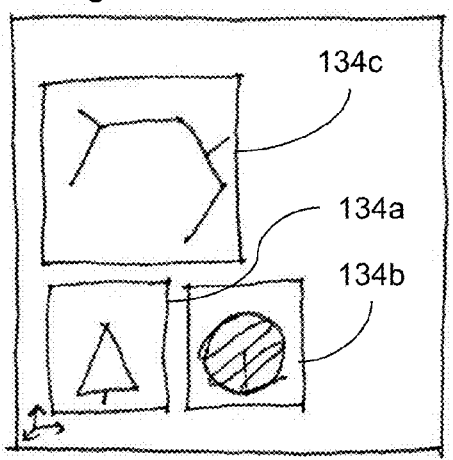
Figure 1H:
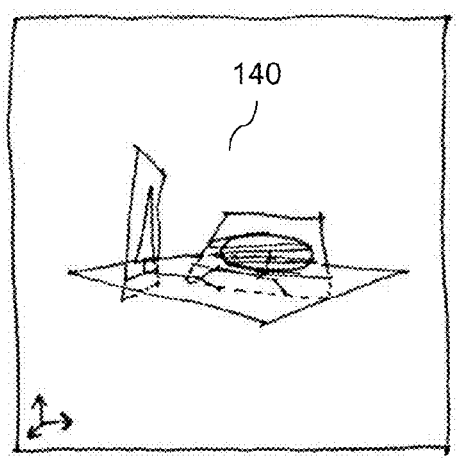

FIGS. 1*e*-*h* illustrate a 3D representation 130 (e.g., a scene, a physical object, etc.). As shown in FIG. 1*e*, the 3D representation 130 can include various objects 132 (*a, b, c*), which can be represented by various strokes that can be entered by the user using a computing device (or can be entered by the computing device automatically and/or semi-automatically). FIG. 1*f* illustrates the bounds of canvases 134 (*a, b, c*), onto which objects 132(*a, b, c*) were placed, respectively. FIG. 1*g* illustrates each of the canvases 134 in a side-by-side fashion. This can assist a user in selecting the canvases 134 for editing and/or manipulation. FIG. 1*h* illustrates scene 140, which corresponds to scene 130 but is shown from a different vantage or viewing point (similar to FIG. 1*d*).

Figure 1I:
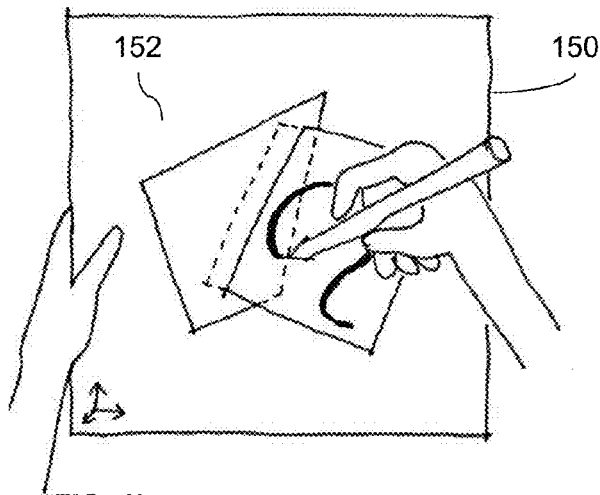
FIGS. 1i-j illustrate exemplary ways for a user to provide input and generate a scene projection, according to some implementations of the current subject matter.
Figure 1J:
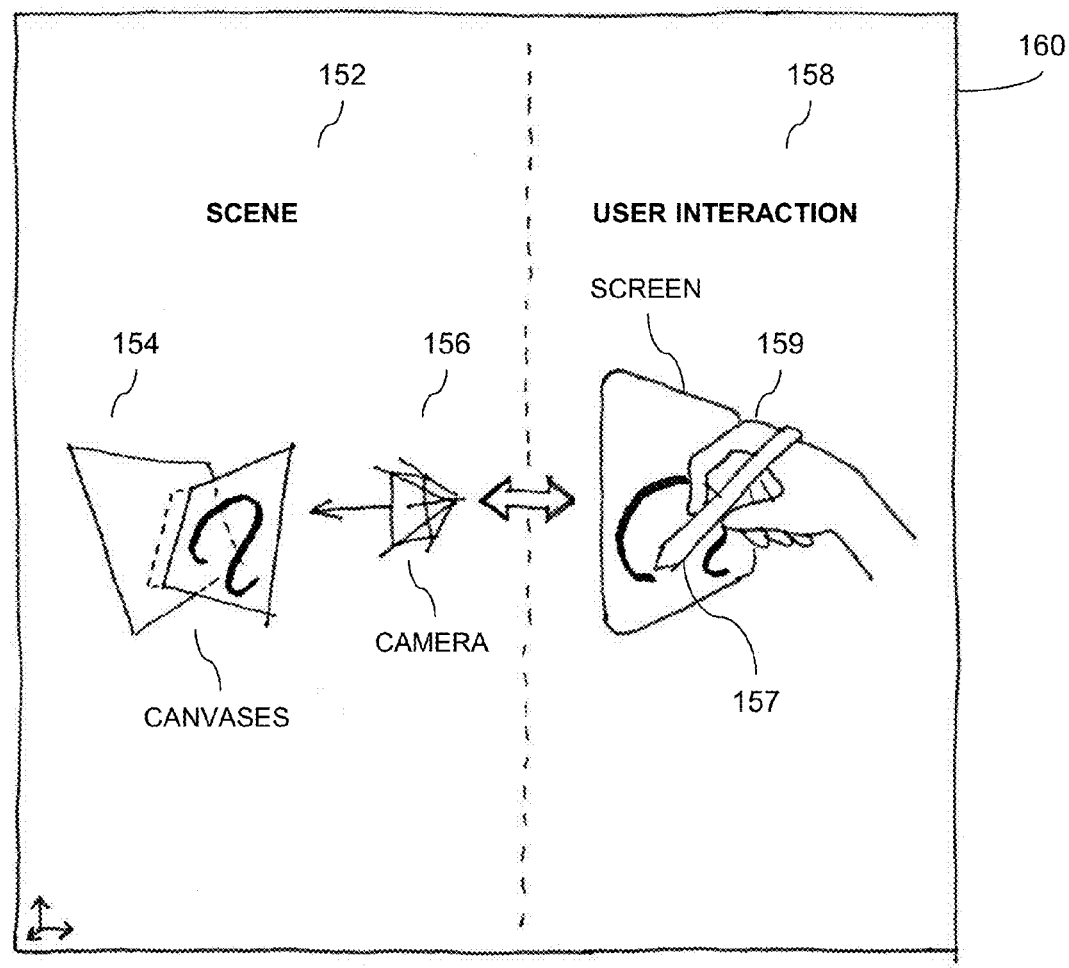

FIGS. 1*i*-*j* illustrate exemplary ways for a user to provide input and generate a scene projection, according to some implementations of the current subject matter. FIG. 1*i* illustrates a user computing device 150 that allows the user to provide input, look at, edit, etc. for the purposes of generating and/or viewing a 3D representation of a scene 152. FIG. 1*j* illustrates an expanded view 160 of FIG. 1*i*. FIG. 1*j* illustrates the relationship between the user's interactions (e.g., input, edit, view, etc.) with the computing device 159, the scene camera 156, the virtual camera through which the 3D scene 152 can be viewed, and content being added to the 3D scene 152 based on the interaction and input of user 157.

Figure 1K:
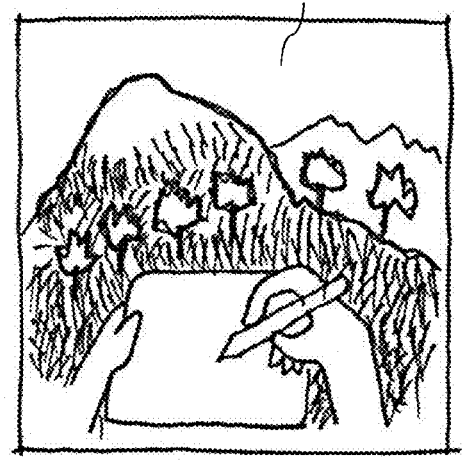
Figure 1L:
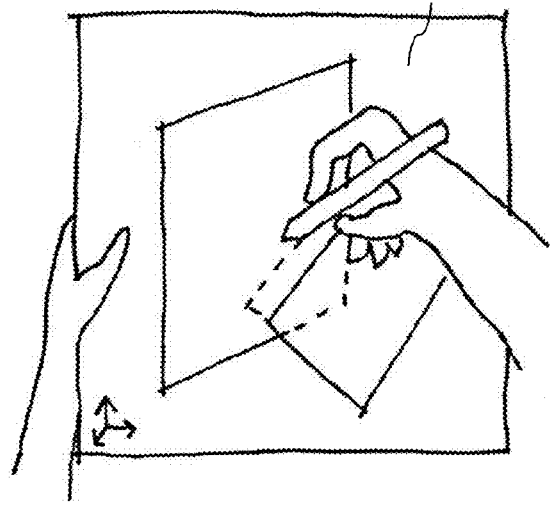
Figure 1M:
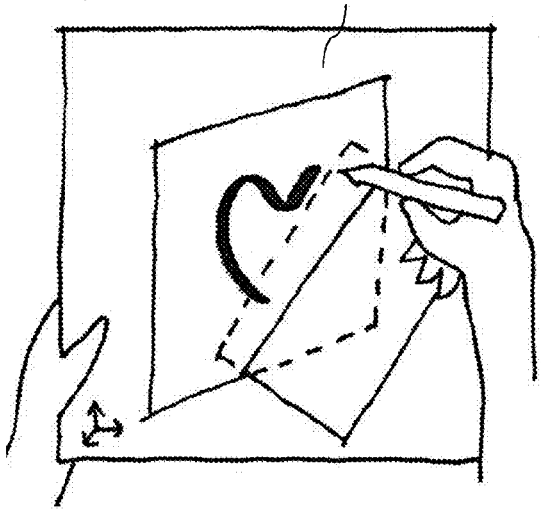
Figure 1N:
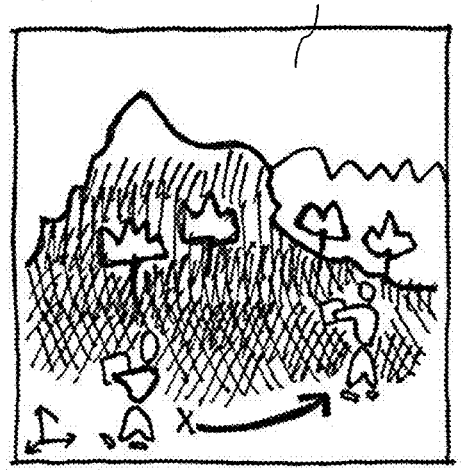
Figure 1O:
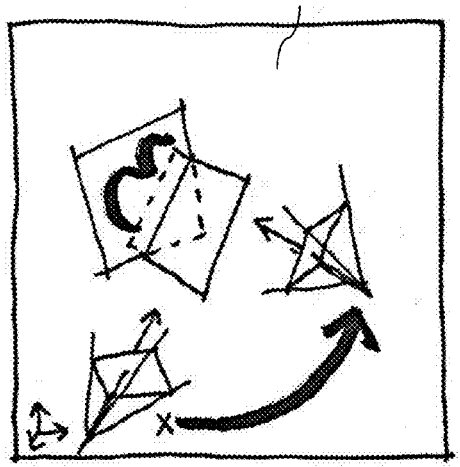
Figure 1P:
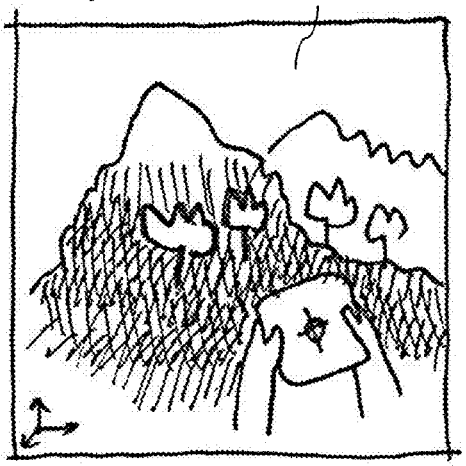

FIGS. 1k-1r illustrate an exemplary user interaction and design workflow for generating a 3D representation of a scene, according to some implementations of the current subject matter. FIG. 1k illustrates a user using the user's computing mobile device on a particular site location 170. FIGS. 1l and 1m show the user sketching 2D content 172, 174 associated with the user's location on the site using the user's computing device. The user can add sketches, photographs, videos, animations, textures, and/or any other 2D content. FIG. 1n shows the user moving to a different location 176. The location can be on the same site and/or on a different site. The user can be viewing the site from a different position, elevation, angle, etc. FIG. 1o shows the scene camera of the virtual 3D scene move 178 in accordance to the user's movement shown in FIG. 1n. FIG. 1p shows the user taking a photograph 180 of the site from the user's new location. FIG. 1q shows the user editing and placing photograph 182 within the virtual 3D scene. FIG. 1r shows the user viewing resulting 3D scene 184 using the user's computing device. The sequence of events shown in FIGS. 1k-1r and the types of interaction of the user with the system and with the site can vary. These sequences can also be repeated multiple times, as necessary, until the desired 3D scene is created.

In some implementations, as an alternative or intermediary to creating full 3D representations, sketches and drawings can be converted to view-dependent "billboards" that can allow the user to inspect views composed of multiple sketches and photographs. View dependency can be determined based on the angle of view of the user of a particular object or scene.

II. System Components

In some implementations, the current subject matter relates to a computer graphics system that can allow a user to create canvases and that can be used for placement or entry of user sketches, photos, painted textures, and/or other content (e.g., 2D content), and/or combination of content. Such content placement can be performed with a specific goal of defining and viewing a 3D representation of a scene. The placement of content can be accomplished through use of graphical commands (such as, entered by the user on the computer, automatically and/or semi-automatically entered by the computer), importing of content from a computer memory, use of the computing device's hardware/software (e.g., a camera, a gyroscope, a global positioning device, a compass, etc.) and/or in any other way. In some implementations, the current subject matter's graphics software system can allow creation, definition, and/or various manipulation of 2D canvases, sketches, images or photographs, textures, various 2D content, referential 3D models, and bookmarked scene cameras. A scene camera can correspond to a particular view from which a user can view the scene, and from which particular object(s), canvas(es), 3D representations of a scene, and/or a combination thereof can appear in a particular way. In some implementations, the scene camera can be a virtual representation of a real camera that can be looking at a real object or a real scene in the real world.

A. Canvas

Figure 2A:
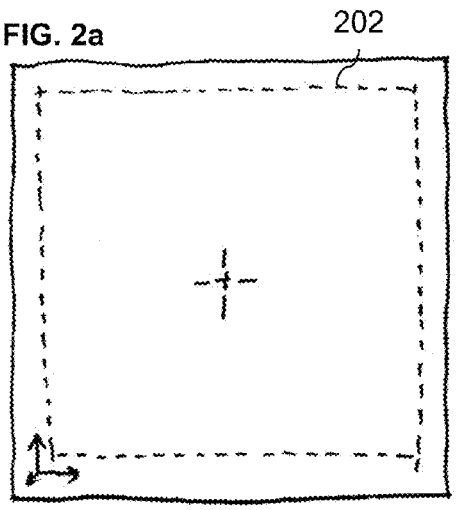
FIG. 2a illustrates an exemplary 2D plane, according to some implementations of the current subject matter.
Figure 2B:
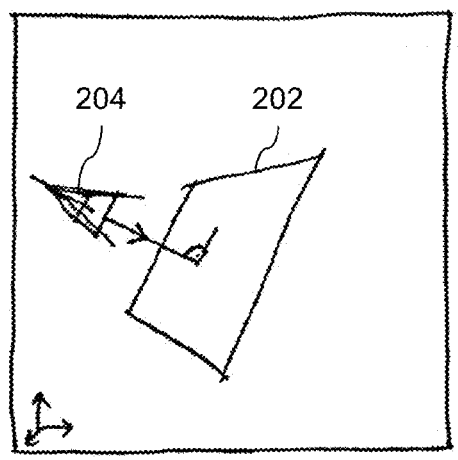
FIG. 2b illustrates an exemplary hypothetical scene camera looking at the 2D plane shown in FIG. 2a from a different viewing angle, according to some implementations of the current subject matter.
Figure 2C:
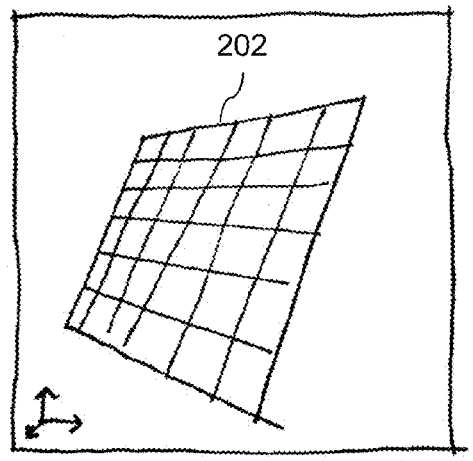
FIG. 2c illustrates yet another exemplary viewing angle of the 2D plane shown in FIG. 2a, according to some implementations of the current subject matter.
Figure 2D:
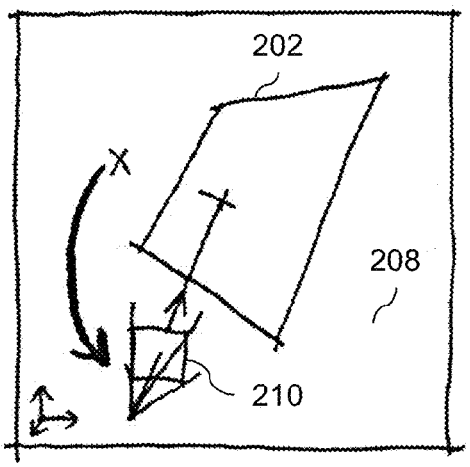
FIG. 2d illustrates a change in a position and an orientation of the exemplary hypothetical scene camera shown in FIG. 2b that results in a perspective view of the 2D plane shown in FIG. 2c.

As stated above, a canvas can be a 2D plane disposed in a 3D space. The canvas can be dimensionless, in the sense that there can be no inferences made or suggested about the scale or orientation of the content that can be placed on the canvas. It can generally be represented without any finite boundaries. FIG. 2a illustrates an exemplary canvas 202. The canvas 202 is "blank" which indicates that it currently does not include any content. The dashed lines can indicate that the canvas 202 does not include any finite boundaries. A canvas can be viewed from a particular angle of view or through a hypothetical scene camera (in the following description, these terms will be used interchangeably and have the same meaning) For example, FIG. 2a illustrates a scene camera looking directly at the canvas. FIG. 2b illustrates a hypothetical scene camera 204 looking at the canvas 202 from a different viewing angle. For illustrative purposes only, the canvas 202 in FIG. 2b is shown having finite borders, but as will be understood by one of ordinary skill in the art, the canvas 202 shown in FIG. 2b can also have no boundaries. FIG. 2c illustrates yet another viewing angle and also includes a plurality of grid lines being overlaid on the canvas 202 to indicate orientation of the canvas 202 relative to a hypothetical scene camera 210, which is illustrated in FIG. 2d.

Figure 3A:
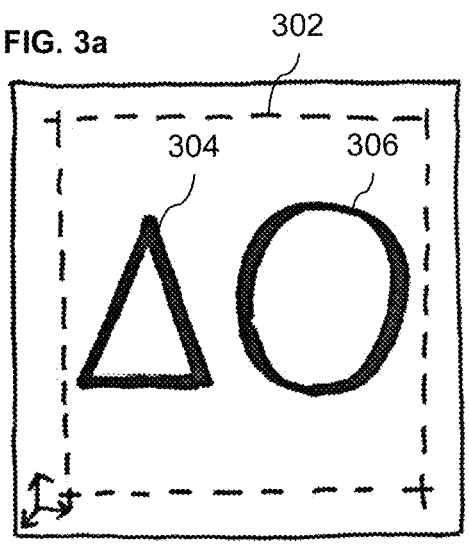
FIGS. 3a-d illustrate an exemplary "view canvas," according to some implementations of the current subject matter.
Figure 3B:
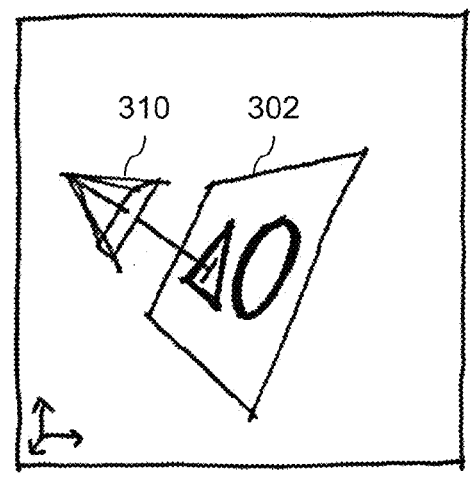
Figure 3C:
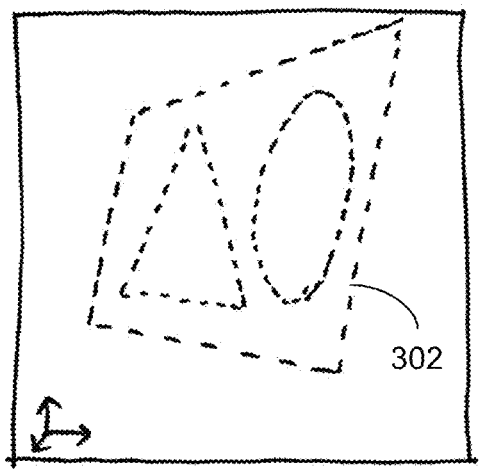
Figure 3D:
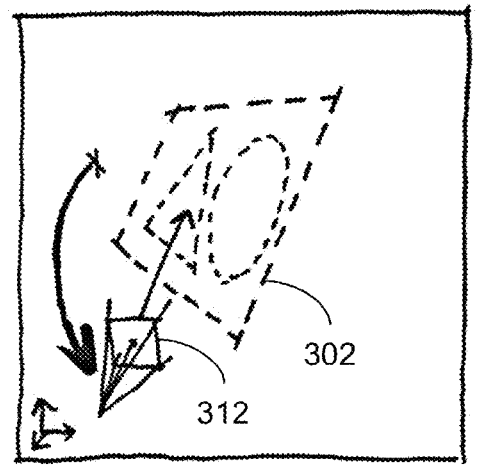

In some implementations, the current subject matter graphics system can also include a view canvas 302, as shown in FIG. 3a. A view canvas can be similar to a canvas, as discussed above, except that its content can only be seen from a particular viewing angle. This can allow the user to add view-dependent 2D content to the scene. Referring back to FIG. 3a, the view canvas 302 can include several strokes sketched onto it (a triangle 304 and a circle 306 shown in FIG. 3a). As shown in FIG. 3b, a scene camera 310 can be directly looking at the canvas 302, defining a particular viewing angle for the view canvas 302 in which it is visible. Once the viewing angle changes, such as when a user looks at the canvas from a different viewing angle (e.g., when a user issues a graphics command to rotate or otherwise alter the position and/or spatial orientation of the camera 302), the content disposed on the view canvas 302 can "fade out" or "disappear" from view, as illustrated in FIGS. 3c and 3d. As shown in FIG. 3d, a scene camera 312 has a different angle of view than the scene camera 310 shown in FIG. 3b and hence, the user is unable to view the content on the view canvas 302.

Figure 4A:
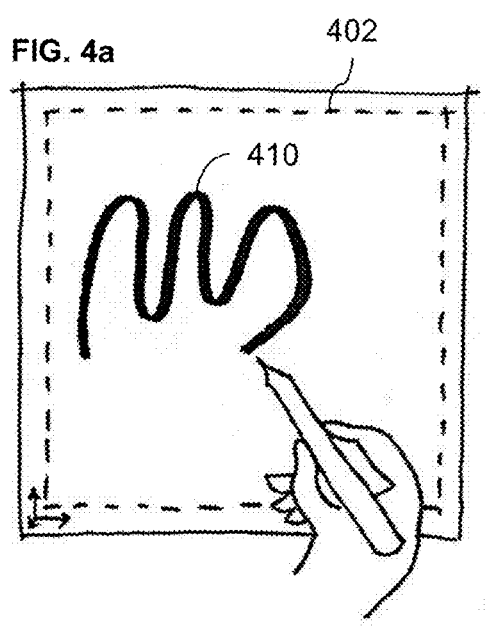
FIGS. 4a-4b illustrate exemplary sketches that can be generated by a user using a sketching tool (e.g., a stylus tool), where a sketch can be projected on a 2D plane, according to some implementations of the current subject matter.
Figure 4B:
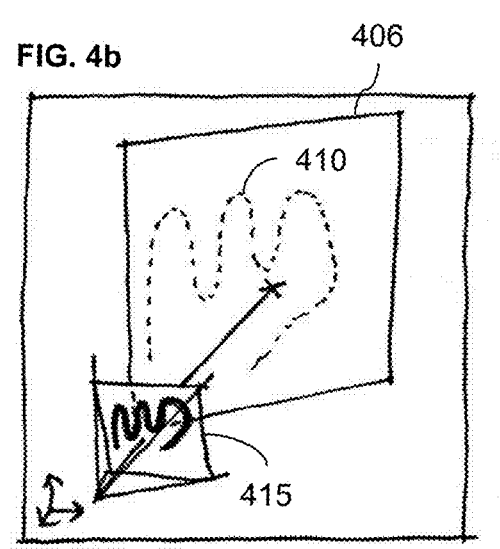

In some implementations, once a canvas is created, any and/or all combinations of any content (e.g., sketches, photographs, etc., as described above) can be added to a canvas, removed from the canvas, modified on the canvas, and/or manipulated in any other way. Such manipulation can be accomplished through the use of computer graphics hardware and/or software that can be installed on the user's computing device, wherein the user can issue various graphics commands using the computing device's input hardware/software (e.g., a mouse, a keyboard, a touchscreen, a voice prompt, etc.). The following discussion illustrates exemplary content that can be placed on a canvas. FIGS. 4a-4b illustrate user-generated sketches that can be placed on a canvas. FIGS. 5a-d illustrate the addition of photographs to a canvas. FIGS. 6a-6c illustrate the addition of painted occlusions to a canvas. Each of these is discussed in more detail below.

B. User Sketches

Referring to FIGS. 4a-b, user-generated sketches can be defined as collections of strokes projected onto the canvas, where each stroke can be a list of sequentially connected points. Strokes can have a thickness, opacity, color, texture, and/or any other characteristic(s). FIG. 4a illustrates an example of a stroke 410 being sketched onto a canvas 402. FIG. 4b illustrates an exemplary projection of the stroke 410 onto a currently selected canvas 406. The projection is performed automatically by the system as the user is sketching the stroke, while viewing the scene through scene camera 415. Much like a video projector that projects images onto a projector screen, strokes, and other 2D input, can be projected along the camera's viewing direction onto a 2D canvas positioned in the 3D scene.

C. User Photographs

Figure 5A:
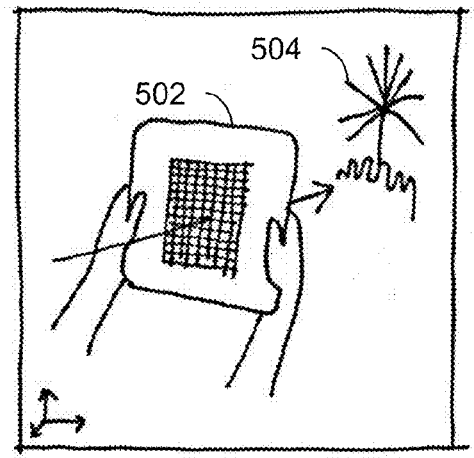
FIGS. 5a-d illustrate an exemplary addition of photographs to a 2D plane, according to some implementations of the current subject matter.
Figure 5B:
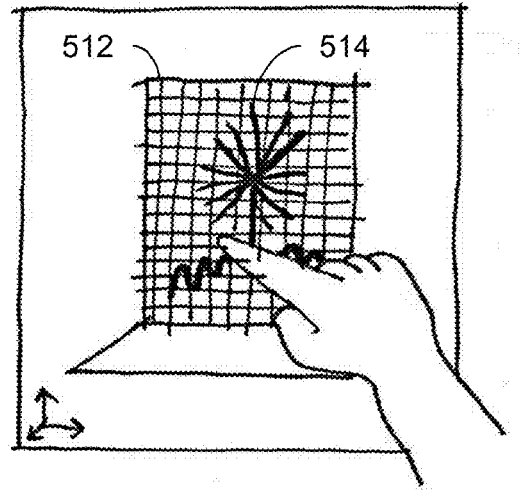
Figure 5C:
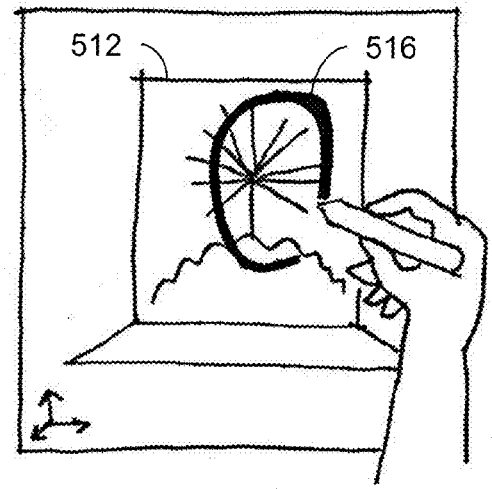
Figure 5D:
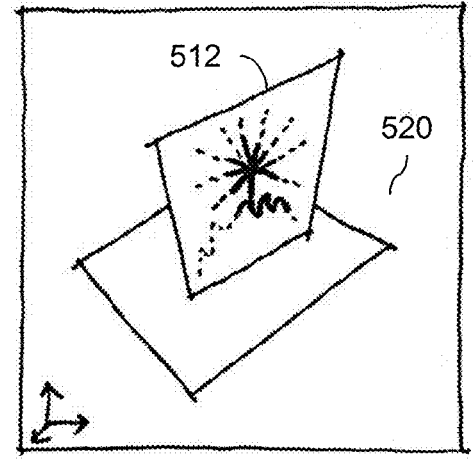
Figure 6A:
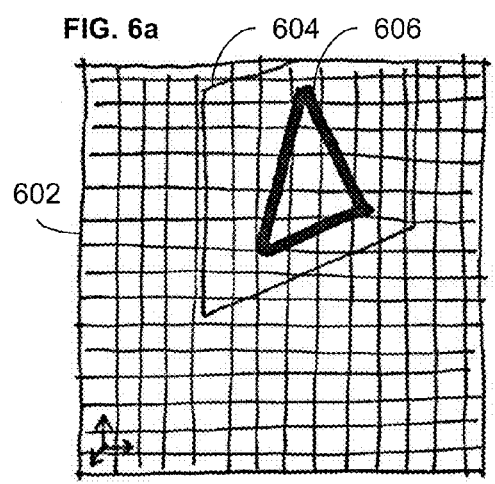
FIGS. 6a-6c illustrate an exemplary addition of painted occlusions to a 2D plane, according to some implementations of the current subject matter.
Figure 6B:
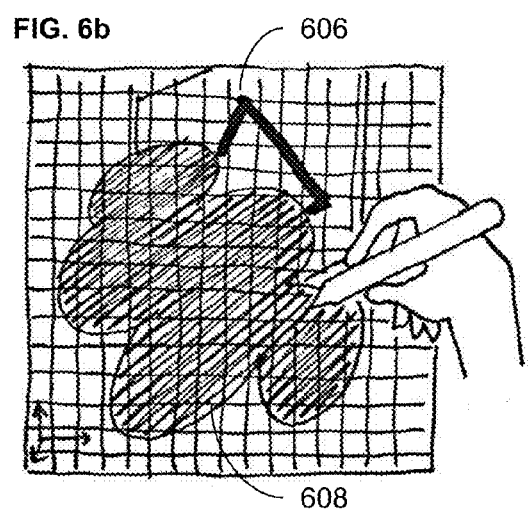
Figure 6C:
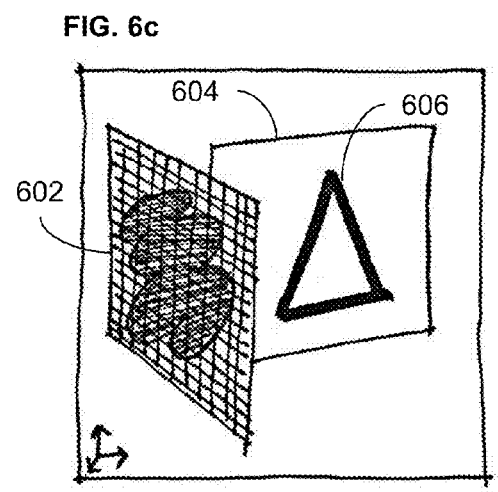

Referring to FIGS. 5a-d, in some implementations, images and/or photographs can be displayed using polygonal modeling techniques, such as texture mapped planar polygons, curve modeling techniques, digital sculpting techniques, and/or using any other techniques and/or combinations thereof. Either full or partial images or photographs can be placed on a canvas. FIG. 5a illustrates a user using a photographic capture device 502 (e.g., a camera, a camcorder, a smartphone equipped with a camera, etc.) to capture an image of an object 504. The captured image 514 can be positioned automatically on a canvas 512, as shown in FIG. 5b. A user can outline a portion 516 of the captured image to be retained on the canvas 512, as shown in FIG. 5c. The resulting image can be displayed in a 3D scene representation 520, as shown in FIG. 5d.

In some implementations, the user can also preview a photograph on the canvas(es) and/or scene, which can be overlaid on the canvas(es) and/or scene prior to being taken by the user's device. This can be accomplished by overlaying a feed from the photograph-capturing device (e.g., a camera, etc.) prior to taking the photograph. The user can use the photograph-capturing device to preview various photographs and select one that is most suitable (and/or desired) by the user for placement on the canvas(es) and/or scene.

D. User-Created Textures

As shown in FIGS. 6a-c, various textures can be added to a canvas, according to some implementations of the current subject matter. The textures can be user-generated and/or computer-generated. The textures can be similar to photographs, but instead of originating from a digital or scanned photograph, these can be areas that can be "painted" by the user using a variety of computer graphics brush tools (e.g., similar to ones present in conventional image-editing packages), and can also be represented in the system using polygonal modeling techniques, such as texture mapped planar polygons, curve modeling techniques, digital sculpting techniques, and/or using any other techniques and/or combinations thereof. FIG. 6a illustrates a canvas 602 having grid lines on it and a canvas 604, where the canvas 602 can be positioned in the front of the canvas 604 containing an object 606. As shown in FIG. 6b, the user can introduce a painted occlusion 608 on the front canvas 602, thereby obstructing a view of the canvas 604 that contains the object 606. FIG. 6c illustrates canvases 602 and 604 from a different viewing angle. Painted occlusions can also be semi-transparent, to simulate materials such as glass, or approximate the cross-section of a sparse object, such as a partially transparent crown of a tree.

E. Other Content

In some implementations, other 2D content can be added to a canvas. Examples of the content can include videos, text annotations, scanned documents, URL links, etc. The canvas, and its content, can also have attached properties, including geographical location, global positioning coordinates, speed, time, dimensions, author, time of creation, etc. Any of the content can be freely selected, moved within the plane of the canvas, overlaid on top of one another (e.g., a sketch can be placed over a photograph, an occluding surface can be painted over a sketch), manipulated, and/or duplicated any number of times. In addition, a canvas can contain multiple layers, which can be disposed within the same plane, but have a distinct ordering (e.g., front to back).

F. Referential 3D Models

In some implementations, referential 3D models can be used as a reference point for generating content and/or objects on canvases. Existing 3D models can be generated in a conventional CAD or other modeling system, or they can be 3D scans of an existing structure. These models can serve as input into the system, and used as a reference for creating a design. They can be represented at least in the following ways: as a polygonal mesh, or as a point cloud. A polygonal mesh can be a collection of vertices, edges and/or faces that can define a shape of a polyhedral object in 3D computer graphics. The faces usually consist of triangles, quadrilaterals and/or other polygons. A point cloud can be a set of vertices in a 3D coordinate system, where the vertices are usually defined by X, Y, and Z coordinates, and can be intended to be representative of the external surface of a graphical object.

The generated models can be scaled uniformly, positioned, and oriented in space. A user can position canvases in reference to the generated model and begin creating 2D content on the canvases with respect to the generated model. The model can be hidden and/or removed once the surrounding 2D content has been generated and placed.

G. Scene Cameras

Figure 7A:
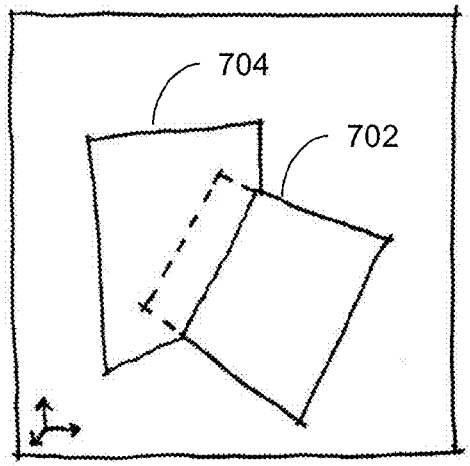
FIGS. 7a-7d illustrate an exemplary use of the scene camera that can be used to view a 3D representation of a scene, according to some implementations of the current subject matter.
Figure 7B:
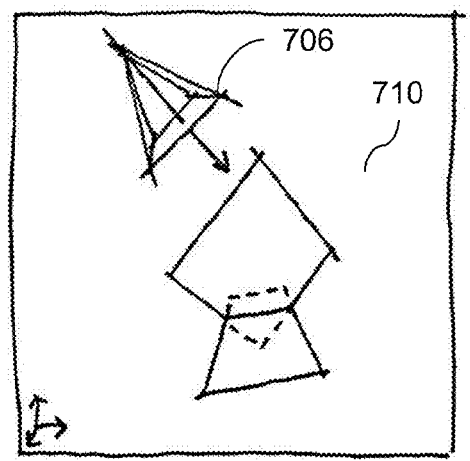
Figure 7C:
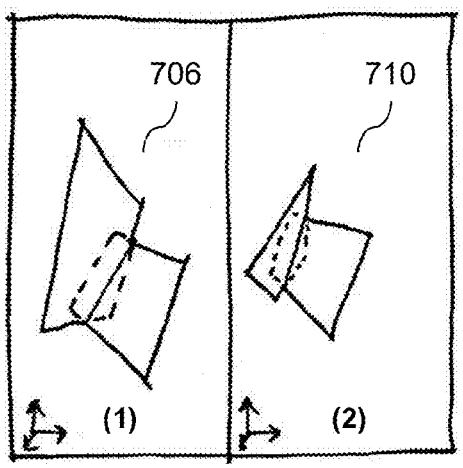
Figure 7D:
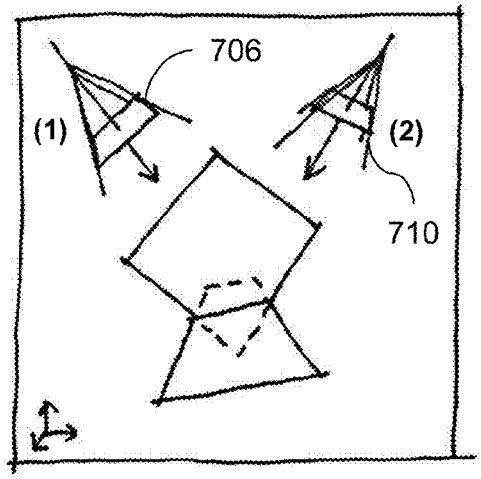

In some implementations, as stated above, the current subject matter can include at least one scene camera, which can represent a particular viewing angle, from which the user can "view" the scene. The scene can either be displayed in a perspective or axonometric projection. The user can define multiple scene cameras, allowing the scene to be viewed from more than one location simultaneously (e.g., in a "split screen" mode). Multiple scene cameras can also allow different users to view/edit the same scene simultaneously. This is discussed in more detail later. Scene camera properties (e.g., focal length, resolution, etc.) may be adjusted by the user, or extracted from an inputted image's EXIF data, to mimic the properties of the physical camera through which the image was acquired. FIGS. 7a-7d illustrate an exemplary use of the scene camera that can be used to view a scene, according to some implementations of the current subject matter. FIG. 7a illustrates a user looking at a scene through a scene camera, where the scene can include two canvases 702 and 704. FIG. 7b illustrates the scene shown in FIG. 7a from a different viewing angle, where the scene camera 706 represents the view shown in FIG. 7a. FIG. 7c illustrates a user interface that allows viewing of the scene from two viewing angles shown in FIGS. 7a and 7b using two scene cameras simultaneously. FIG. 7d illustrates yet another viewing angle of the same scene, and also shows cameras 706 and 710, associated with the left and right views shown in FIG. 7c, respectively.

Figure 8E:
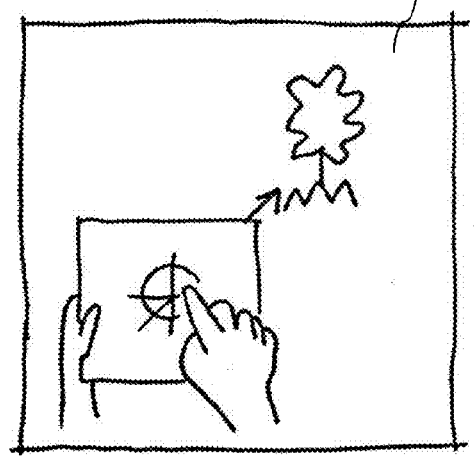
Figure 8F:
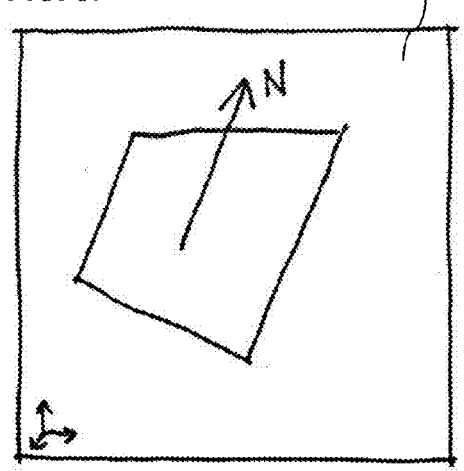
Figure 8G:
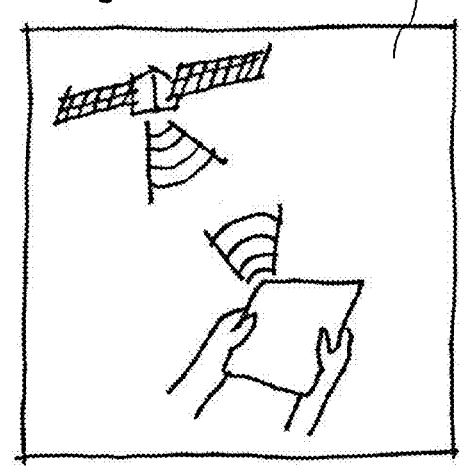

In some implementations, the use of canvases can be integrated into various mobile computing devices (e.g., laptops, tablet computing devices, etc.). The current subject matter graphics system can use various tools and capabilities of a mobile device, which can be present on the device on which the system is running. Such tools and capabilities can allow operation and/or use of a scene camera and further allow the user to change viewing angles from which an object in a scene, a 2D plane, and/or a scene can be viewed. FIGS. 8a-g illustrate some of these tools and capabilities. The tools include the ability 802 to input commands using multitouch gestures (as shown in FIG. 8a), the ability 804 to perform certain functions using a stylus (as shown in FIG. 8b), the ability 806 to use a built-in gyroscope (as shown in FIG. 8c), the ability 808 to use a built-in accelerometer for motion purposes (as shown in FIG. 8d), the ability 810 to use a camera to take photographs of surroundings (as shown in FIG. 8e), the ability 812 to use a compass (as shown in FIG. 8f), the ability 814 to use a built-in global positioning system ("GPS") device to enhance scene navigation and allow for scene geolocation, as well as any other locations. The stylus tool can be used to generate various strokes, sketches, and/or for any other purposes. The tool can be used to manipulate object(s) and/or canvas(es), as well as to perform any other functions. The gyroscope device can be used to determine orientation of and/or orient and/or position object(s) and/or canvas(es) with respect to a particular location point (e.g., a ground, a location point in the scene, etc.). The compass can be used to determine orientation of and/or orient and/or position the object(s) and/or canvas(es) in a particular direction (e.g., north, south, etc.). The GPS coordinate data can be used to determine positioning, orientation, etc. of object(s) and/or canvas(es) in the scene. The user's computing device can receive the data corresponding to each of these tools and can provide that data to the user for integration and/or automatically apply that data to, including but not limited to, correct positioning and/or orientation of object(s) and/or canvas(es).

III. Scene Appearance

Figure 9A:
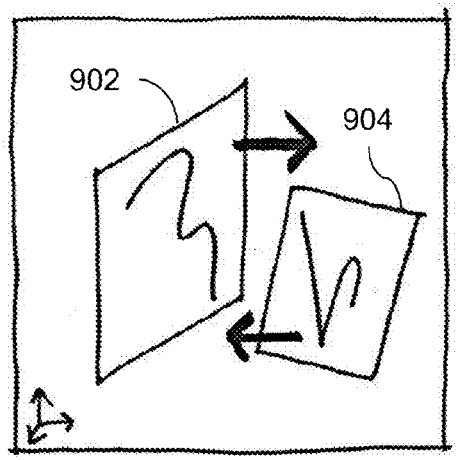
FIGS. 9a-b illustrate an exemplary intersection of two 2D planes, according to some implementations of the current subject matter.
Figure 9B:
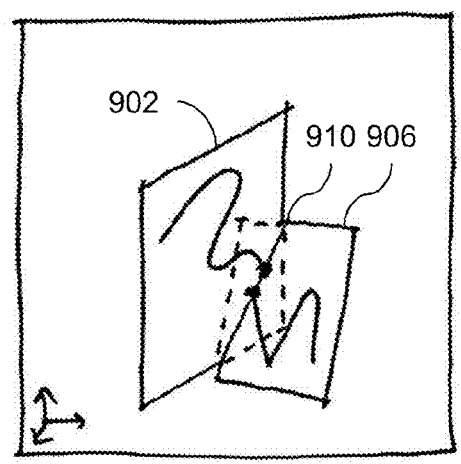

In some implementations, the user can control certain visual properties of a canvas within a scene, as well as the 2D content added to the canvas. Additionally, the spatial relationship between different elements of a scene can be visualized. Lastly, the user can have the ability to selectively show canvases and their content depending on the current viewpoint and specific user specifications, such as whether interiors, and/or only some region(s) of 3D space should be considered. This can allow the user to better understand a scene the user is creating, and can give the user the capability to define different "layers" of a design. The following discussion and FIGS. 9a-13d illustrate various elements of a scene as well as canvases that can be involved in the generation of the scene. In particular, FIGS. 9a-b illustrate exemplary canvas intersections. FIGS. 10a-d illustrate exemplary appearance characteristics of canvas strokes. FIGS. 11a-d illustrate exemplary scene layers. FIGS. 12a-d illustrate exemplary view dependent layers. FIGS. 13a-d illustrates exemplary canvas layers.

A. Canvas Appearance

As shown and discussed above in connection with FIGS. 2a-d, a canvas appearance can be dependent on a particular viewing angle that can be used by the user. If the user is looking directly at a canvas, it can give an appearance of a simple sheet of paper (see, e.g., FIG. 2a). However, if the user is looking at the canvas from a different angle (in perspective), a grid can be overlaid to convey where the canvas can be positioned in the 3D space relative to the viewing camera. Alternatively, a border can be drawn in lieu of or in addition to the grid (see, e.g., FIG. 2c). In some exemplary implementations, canvas visibility can be adjusted so that canvas opacity can be in proportion to how much a canvas is facing the current view. For illustrative and non-limiting purposes, canvases facing the scene camera can be opaque and canvases that are oriented at an angle from the scene camera can be somewhat (and/or fully) transparent. Further, canvas visibility can also be adjusted so that canvas opacity can be in proportion to the distance from the camera. In other words, canvases closer to the scene camera can be opaque, but canvases far away from the scene camera can be somewhat (or fully) transparent.

B. Canvas Intersections

FIGS. 9a-b illustrate exemplary canvas intersections, according to some implementations of the current subject matter. Such intersections can be between canvases (canvas-canvas) or between strokes and canvases (canvas-stroke). The intersections can be represented by dashed lines and points, respectively, to help the user visualize how existing canvases are positioned relative to each other in the scene, and as an aid in positioning new canvases within the scene. FIG. 9a shows an exemplary scene containing two canvases 902 and 904. As one canvas is moved, an intersection 910 between canvases 902 and 904 can be displayed to indicate the relative positions of canvases 902 and 904.

C. Stroke Appearance

Figure 10A:
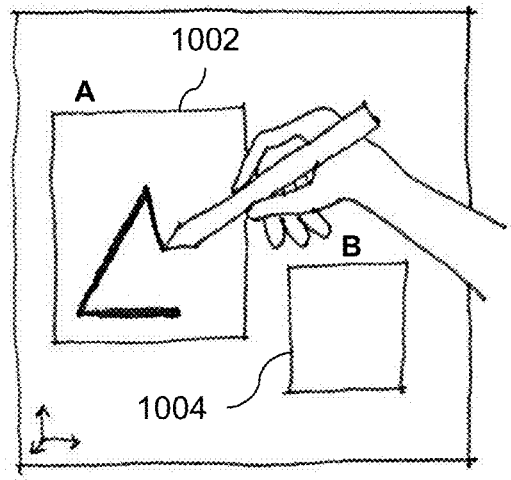
FIGS. 10a-d illustrate exemplary appearance characteristics of a 2D plane's strokes, according to some implementations of the current subject matter.
Figure 10B:
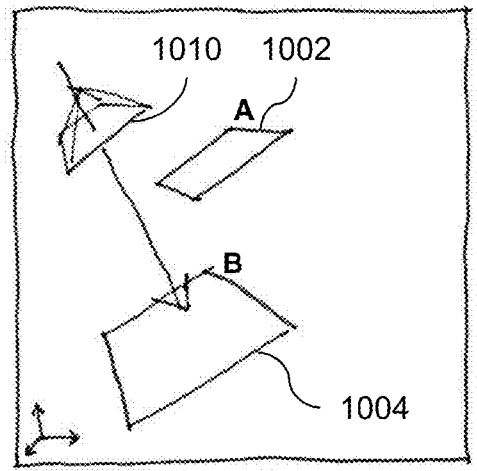
Figure 10C:
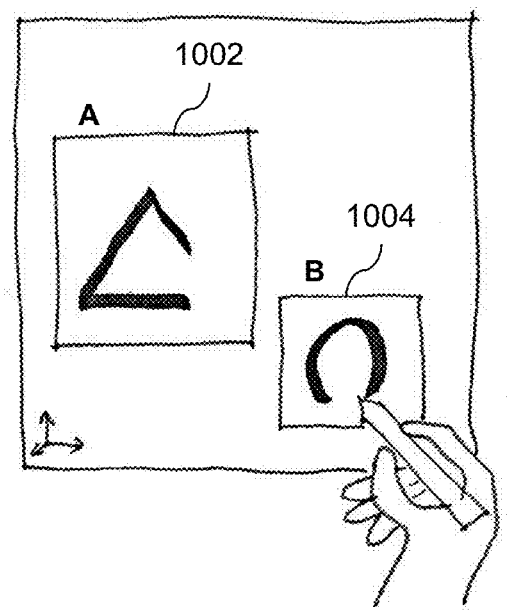
Figure 10D:
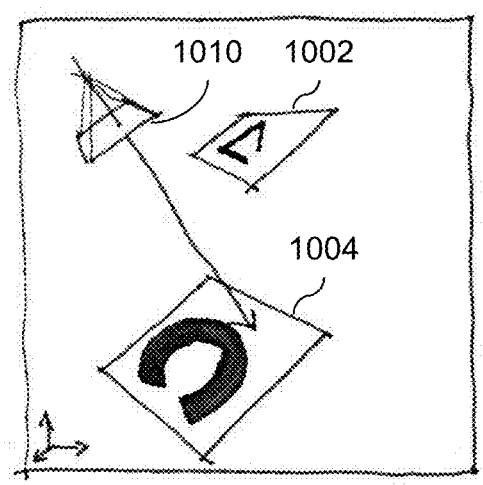

FIGS. 10a-d illustrate exemplary appearance characteristics of canvas strokes, according to some implementations of the current subject matter. Strokes can have user-specified thickness, color, transparency, and/or any other characteristics. In addition, each stroke can have a constant and/or a varying thickness, opacity, and/or any other characteristics. In this representation, each stroke's endpoints are thinner and more transparent, and the middle is thicker and more opaque. As opposed to defining a stroke width in "world" coordinates (e.g., 1 cm thick within the 3D representation of a scene), the user can set a view-dependent stroke thickness. In this case, the stroke thickness can be constant from the camera view the strokes are being drawn, but in reality, the farther away the stroke is projected (i.e., the farther the stroke is in 3D from the scene camera), the thicker the stroke can be in the world scale. This can mimic sketching a perspective scene on paper with a utensil of uniform thickness. This concept is shown in FIGS. 10a-d. FIG. 10a shows the user drawing a stroke on canvas 1002. FIG. 10b illustrates canvas 1002 being positioned closer to the scene camera 1010 than canvas 1004. When the user draws on canvas 1004, as shown in FIG. 10c, the stroke thickness can appear identical to the stroke thickness on canvas 1002. However, as shown in FIG. 10d, the stroke on canvas 1004 can actually be much thicker, in proportion to the greater distance of canvas 1004 from the scene camera 1010.

D. Scene Layers

Figure 11A:
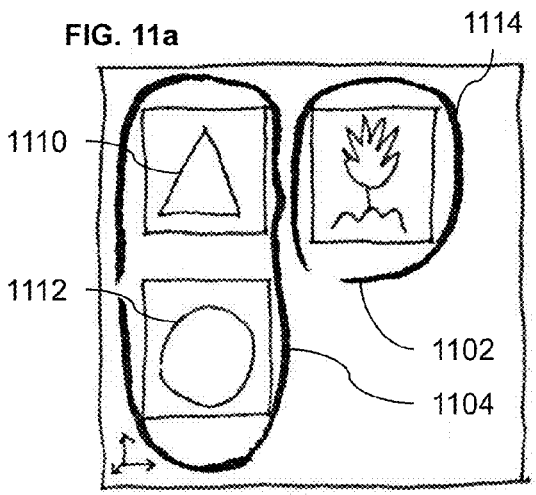
FIGS. 11a-d illustrate exemplary scene layers, according to some implementations of the current subject matter.
Figure 11B:
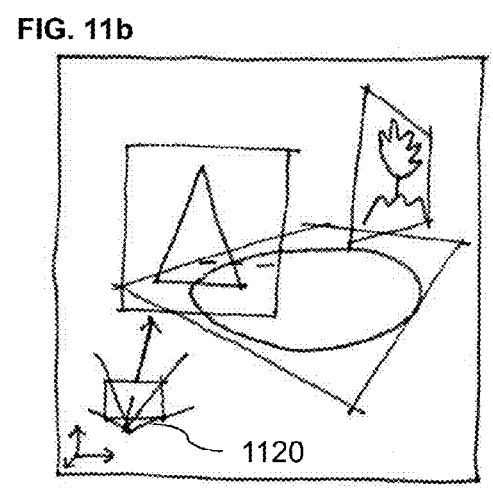
Figure 11C:
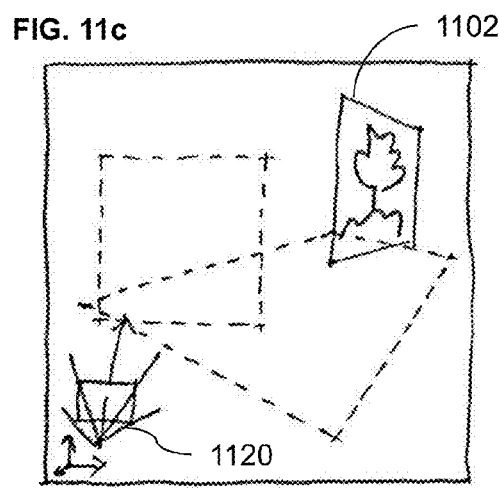
Figure 11D:
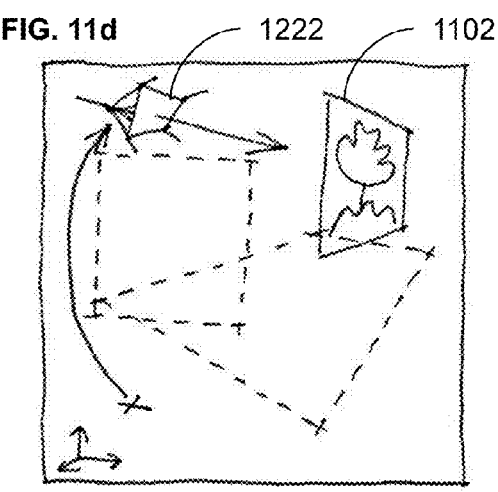

FIGS. 11a-d illustrate exemplary scene layers, according to some implementations of the current subject matter. Scene layers can allow the user to group certain elements of a scene, so that their position and visibility can be affected simultaneously. As shown in FIG. 11a, two distinct layers 1102 and 1104 can be defined within a scene. The layer 1102 includes canvases 1110, 1112 containing objects (a triangle in the canvas 1110 and a circle in the canvas 1112). The layer 1102 can include a canvas 1114 containing an image. FIG. 11b illustrates the positioning of the canvases 1110, 1112 and 1114 in a 3D representation of a scene using a particular viewing angle, as represented by a scene camera 1120. FIGS. 11c and 11d illustrate the scene layer 1104 being hidden from view and scene layer 1102 being displayed. Such "hiding" and displaying of layers can be independent of the scene camera being placed (whether it is scene camera 1120 in FIG. 11c or scene camera 1222 in FIG. 11d).

E. View-Dependent Layers

FIGS. 12a-d illustrate exemplary view dependent layers, according to some implementations of the current subject matter. The user can define an opacity map of any camera view, which can selectively hide elements of the scene in that particular view. The opacity map can be generated using a brush tool, and can be either local or global. A local opacity map can affect specific pixels ranges in the view, making them fully opaque. This can only be true from the original camera view. The pixels can reappear as soon as the user navigates away from the original viewpoint. A global opacity map can target entire strokes, images or canvases beneath the cursor of the brush. In the case where multiple objects overlap each other from that view, the content can be hidden in order of increasing depth from the camera. In the global opacity tool, users can choose whether these hidden objects only remain hidden from that particular view, or whether they stay hidden at different camera views.

Figure 12A:
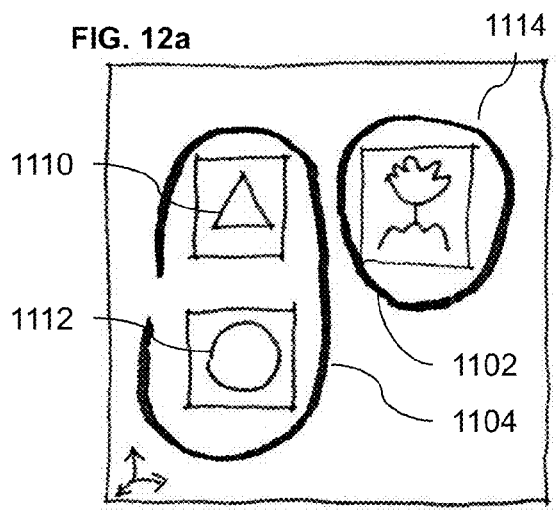
FIGS. 12a-d illustrate exemplary view dependent layers, according to some implementations of the current subject matter.
Figure 12B:
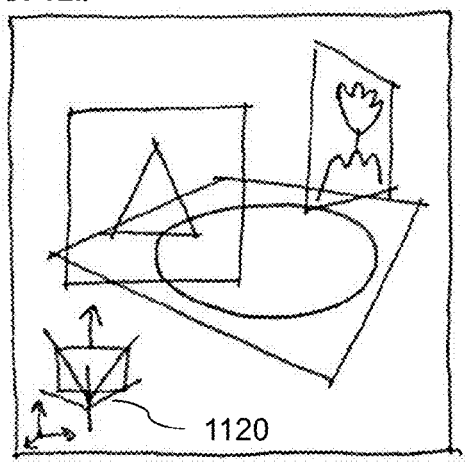
Figure 12C:
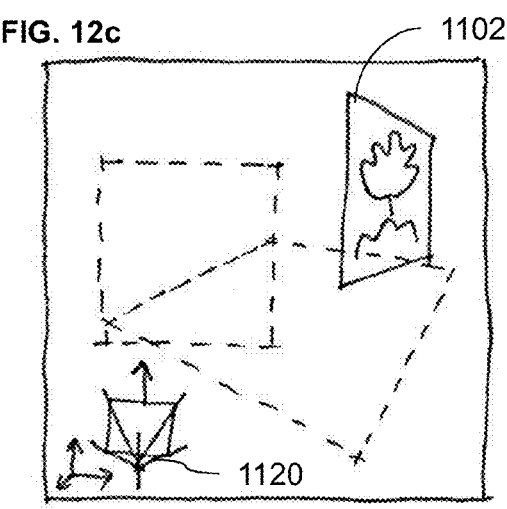
Figure 12D:
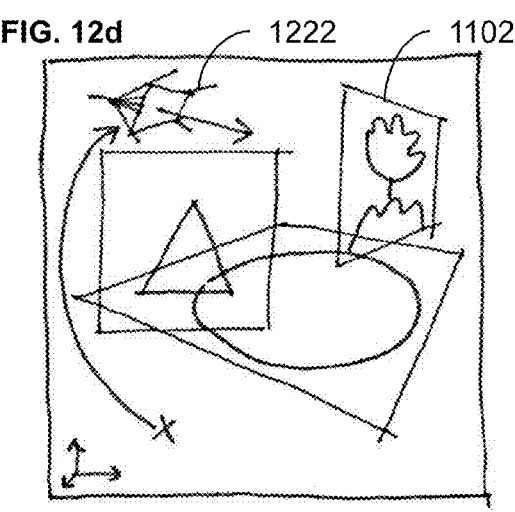

Similar to FIGS. 11a-b, FIGS. 12a-b illustrate two exemplary distinct view-dependent layers. FIG. 12c illustrates a viewpoint from which the opacity map for layer 1104 was created, i.e., this layer can be hidden from that particular view. As soon as the user navigates to a different viewing position, as indicated by a scene camera 1222 shown in FIG. 12*d*, however, the objects in layer 1104 can reappear (the object in layer 1102 can remain).

F. Canvas Layers

Figure 13A:
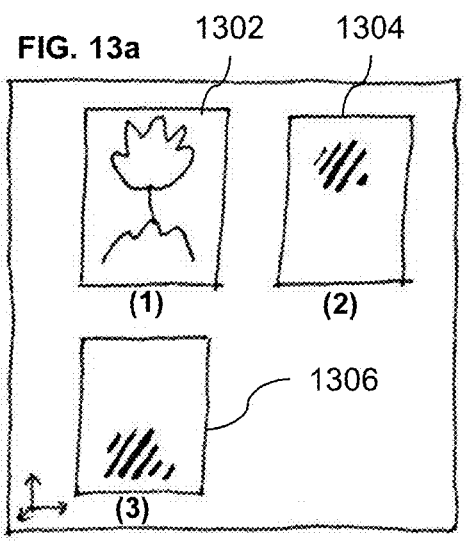
FIGS. 13a-d illustrate exemplary 2D plane layers, according to some implementations of the current subject matter.
Figure 13B:
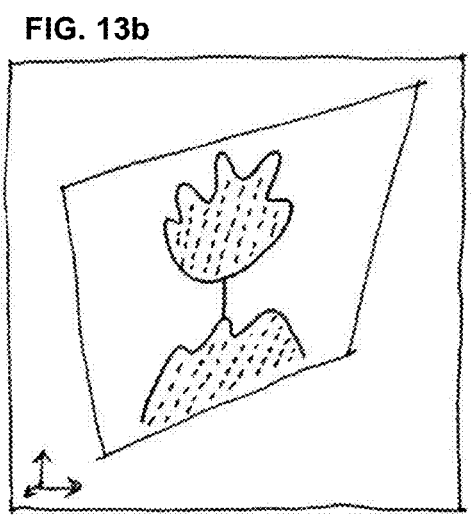
Figure 13C:
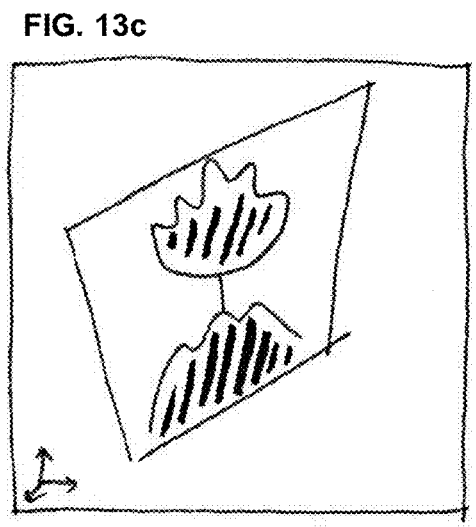
Figure 13D:
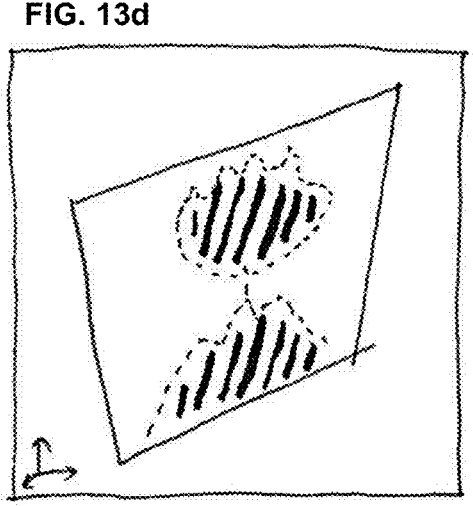

FIGS. 13*a-d* illustrates exemplary canvas layers, according to some implementations of the current subject matter. Canvas layers can allow users to specify multiple layers within a single 2D canvas, which can again be selectively hidden or moved within the plane of the canvas. Canvas layers can also be displayed with varying transparencies, which can reflect their front-to-back ordering. FIG. 13*a* illustrates exemplary overlapping layers of a canvas 1302, 1304, and 1306. FIG. 13*b* illustrate layer 1302 being displayed, while layers 1304 and 106 are hidden from view. FIG. 13*c* illustrates all three layers being visible. FIG. 13*d* illustrates only layers 1304 and 1306 being displayed.

IV. Scene Navigation

FIGS. 14*a*-19*d* illustrate exemplary scene navigation options that the user can make use of during the creation, manipulation, and viewing of the scene, according to some implementations of the current subject matter. In some implementations, the user can use various input devices of the user's computing device to perform gestural or keyboard/mouse navigation. The user can pan, orbit, zoom, and/or perform any other functions using the gesture functionality of a mobile device, a keyboard, a mouse of a desktop device, a touchscreen of a computing device, a stylus of a graphics tablet, and/or perform such functions using any other ways.

A. User-Defined Bookmarks

Figure 14A:
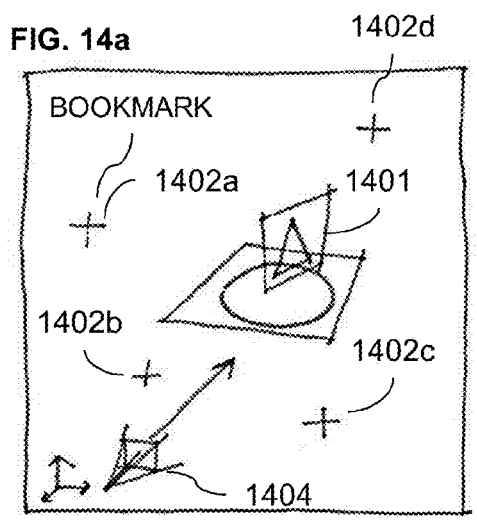
FIGS. 14a-b illustrate exemplary bookmarks, according to some implementations of the current subject matter.
Figure 14B:
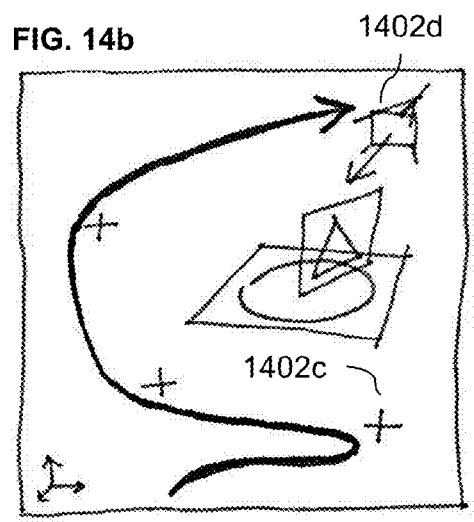
Figure 15A:
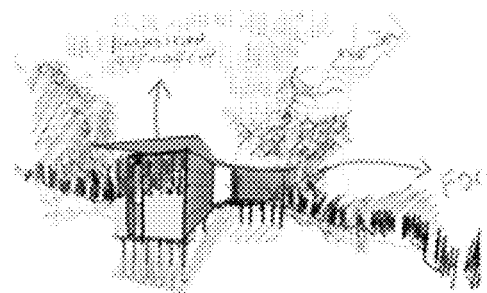
FIGS. 15a-e illustrate an exemplary movement of the scene camera, according to some implementations of the current subject matter.
Figure 15B:
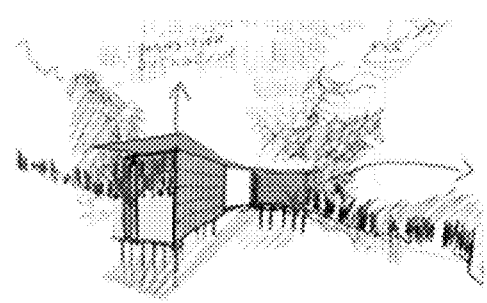
Figure 15C:
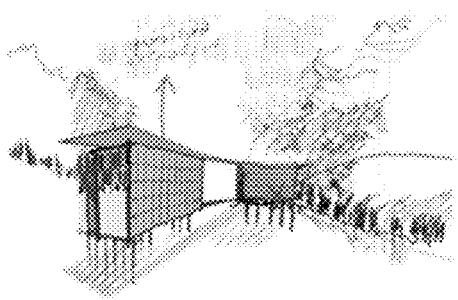
Figure 15D:
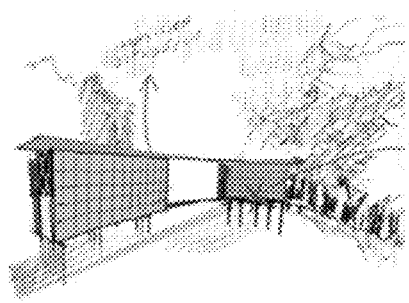
Figure 15E:
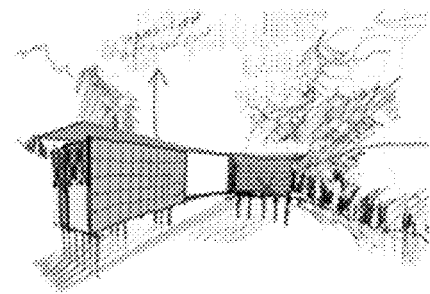

The user can also specify camera views by storing a bookmark of a scene. Bookmarks can be displayed as a 2D list of icons, where each icon can display the view from a specific vantage point. Alternatively, the bookmark can be displayed within the 3D representation of a scene, at its stored camera locations. In either case, clicking on a particular bookmark can move the virtual scene camera to a previously saved location. Exemplary bookmarks are illustrated in FIGS. 14*a-b*. As shown in FIG. 14*a*, viewpoints of several saved bookmarks of a scene 1401 can be marked (as represented by marks 1402 (*a, b, c, d*)). The scene can have a camera 1404. As shown in FIG. 14*b*, the scene camera 1404 can be moved to one of the saved bookmarks (e.g., 1402*d*), after the user has selected it.

The motion of the scene camera from its current position to the saved position of a bookmark can be computed automatically (and/or manually, semi-automatically, or by any other methods) by creating a sequence of in-between camera positions. The scene camera can iterate over a sequence of camera positions, with the final position being the saved position of the bookmark. FIGS. 15*a-e* illustrate movement of the camera from its current location in FIG. 15*a*, through intermediate locations shown in FIGS. 15*b-d*, to a location of a saved bookmark in FIG. 15*e*.

Figure 16A:
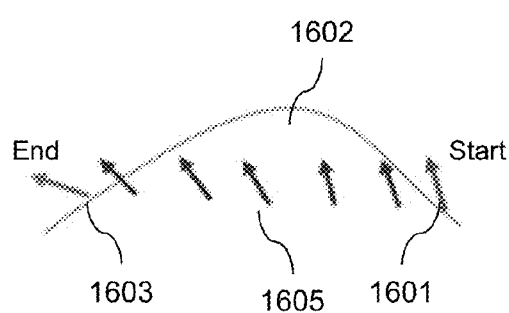
FIGS. 16a-e illustrate an exemplary scene camera motion that can be used to simulate a physical motion, according to some implementations of the current subject matter.
Figure 16B:
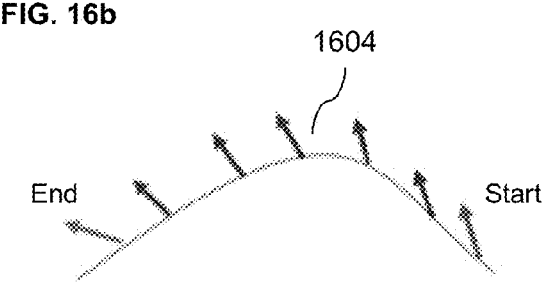
Figure 16C:
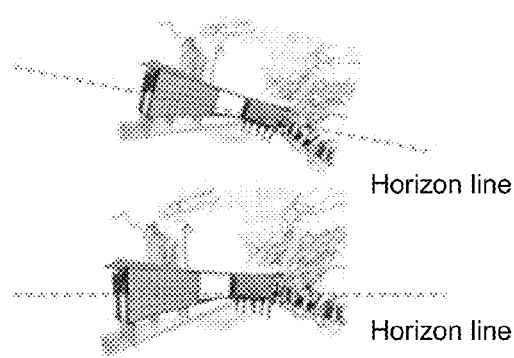
Figure 16D:
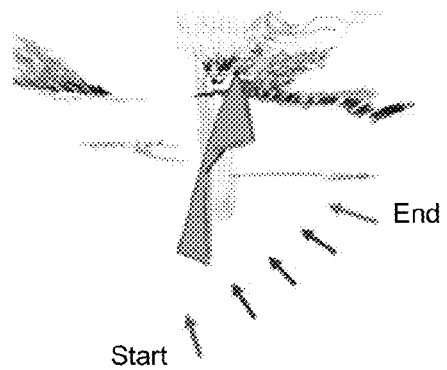
Figure 16E:
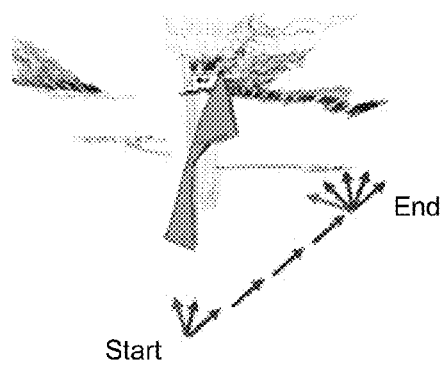

In some implementations, a camera motion can also be used to simulate a physical motion, as illustrated in FIGS. 16*a-e*. Such motion can be performed in reference to a particular geographical terrain. FIGS. 16*a* and 16*b* illustrate a side view of the terrain, including a particular elevation within the scene. To simulate the physical motion, the following constraints can be applied. First, if a ground elevation is specified within a scene, the camera motion can be constrained to always remain above ground, as indicated by arrows 1604 shown in FIG. 16*b*, in contrast to the unconstrained motion, as indicated by arrows 1602 shown in FIG. 16*a*. Second, the camera orientation can be constrained to have no tilt, as shown in FIG. 16*c*. Third, the position of the camera can be constrained while orbiting to only rotate about its origin (i.e., rotate in place, as shown in FIG. 16*e*, in contrast to the unconstrained motion, as shown in FIG. 16*d*). As shown in FIGS. 16*a-e*, the arrows 1601 and 1603 indicate start and end locations of the scene camera, respectively and the arrows 1605 can represent intermediate scene camera locations.

B. Canvas Selector

FIGS. 17*a-b* illustrate an exemplary ability to select a particular canvas that can be displayed in a scene (or a user interface), according to some implementations of the current subject matter. Similarly to the list of icons corresponding to saved bookmarks, the user can display a list of icons corresponding to each created canvas in the scene. The user can use this list as a way to select a particular canvas, and can also select (such as by clicking using a mouse, touching with a finger on a touchscreen, etc.) to move the scene camera to a spot directly in front of the selected canvas, and looking directly at it. FIG. 17*a* further illustrates the selector 1702, where each icon 1704 can correspond to the canvas in the scene with the same identifier (icon "1" can correspond to a canvas bearing identifier "1" in the scene, etc.). As an example, when a user selects icon "7" in the selector 1702, canvas 7 becomes selected or otherwise highlighted, as shown in FIG. 17*b*.

C. Joystick Navigation

In some implementations, other ways of navigating scenes can be used by the user. By way of a non-limiting example, the user can use a set of four "joystick" user interface buttons, which can move the camera iteratively a fixed distance forwards or backwards (along the viewing direction of the camera), or pan the camera a fixed distance left or right.

D. Gyroscope-Assisted Scene Navigation

Figure 18A:
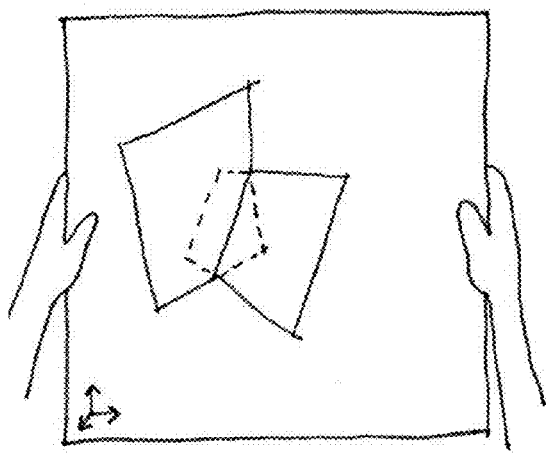
FIGS. 18a-d illustrate an exemplary gyroscope-assisted scene navigation, according to some implementations of the current subject matter.
Figure 18B:
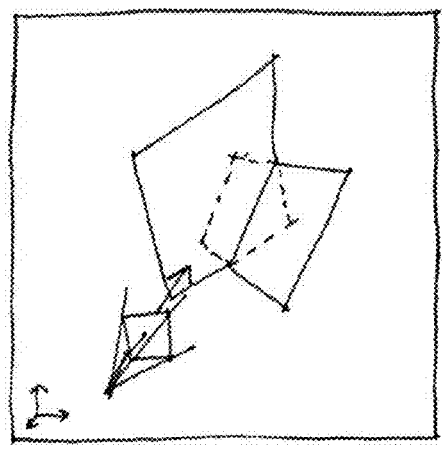
Figure 18C:
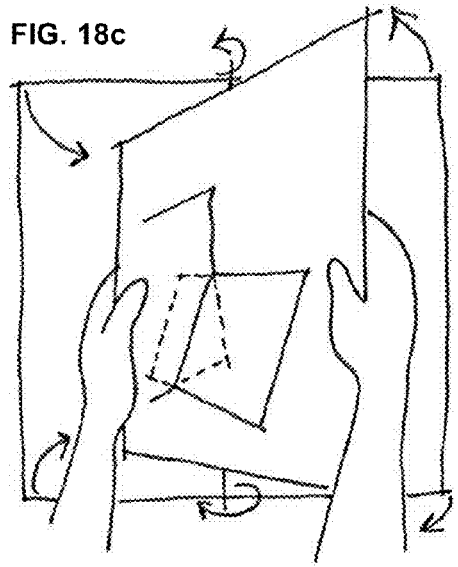
Figure 18D:
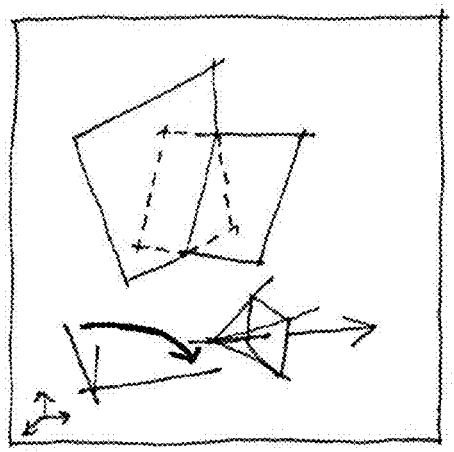

The user can also use a gyroscope-assisted scene navigation, according to some implementations of the current subject matter. Using the gyroscope and/or compass of the user's computing device, the user can orbit around the scene by physically rotating the device. The point of reference of the orbiting can be reset at any point, to account for any possible inaccuracies in the gyroscope measurements. FIGS. 18*a-d* illustrate an exemplary gyroscope-assisted scene navigation, according to some implementations of the current subject matter. FIG. 18*a* illustrates a user's computing device being held straight. FIG. 18*b* illustrates the computing device being aligned with the scene view. As shown in FIG. 18*c*, the computing device is rotated, as indicated by the arrows. As shown in FIG. 18*d*, the scene camera can orbit the scene in response to the motion shown in FIG. 18*c*.

E. GPS-Assisted Scene Navigation

Figure 19A:
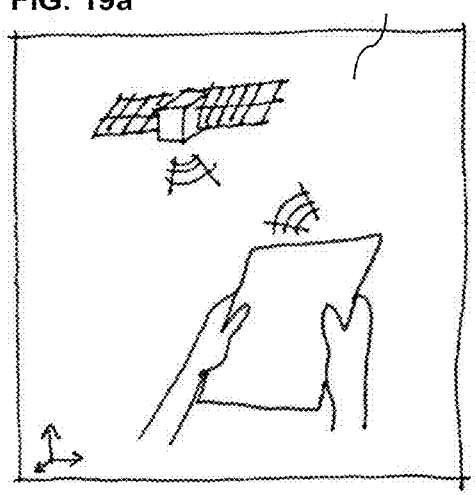
FIGS. 19a-d illustrate an exemplary GPS-assisted scene navigation, according to some implementations of the current subject matter.

The user can also use GPS-assisted scene navigation, according to some implementations of the current subject matter. Using the GPS device of the user's computing device, in conjunction with the gyroscope and/or compass, the user can navigate around the scene by physically moving and rotating the device. In this case, scene coordinates can be mapped to corresponding real-world GPS coordinates (e.g., a movement of 1 meter east in the real world can correspond to the virtual camera in the scene moving 1 meter to the east). This can allow users to navigate around a virtual scene simultaneously while navigating through an existing area. An exemplary GPS-assisted scene navigation is illustrated in FIGS. 19*a-d*, according to some implementations of the current subject matter. Here, an initial position and orientation of the user 1902 (in a real world) is shown in FIG. 19*a* and a corresponding position and orientation of the scene camera

Figure 19B:
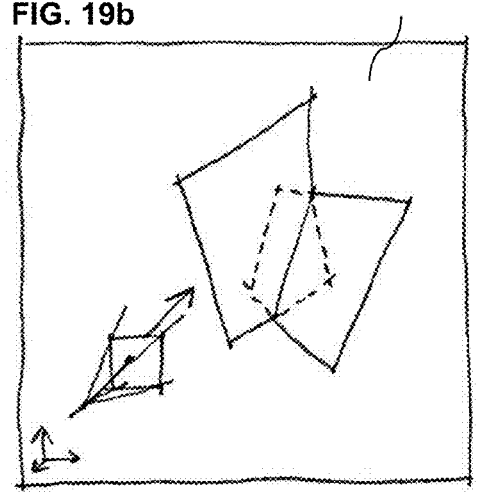
Figure 19C:
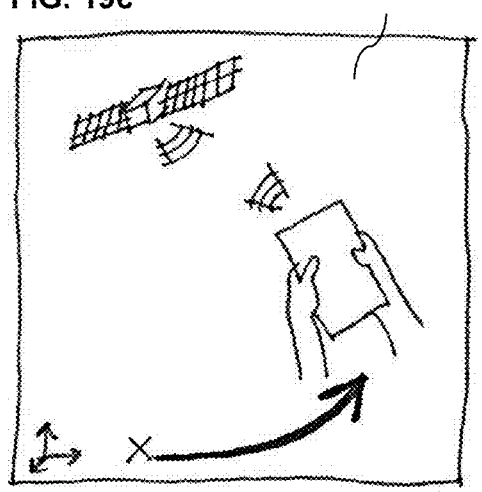
Figure 19D:
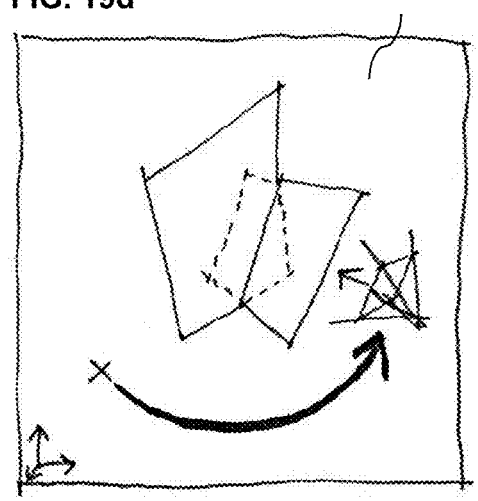

1904 (in a virtual world) is shown in FIG. 19*b*. As the user moves to 1906 in the real world (as shown in FIG. 19*c*), the scene camera can move to 1908 in response to this motion (as shown in FIG. 19*d*).

V. Canvas Generation

In some implementations, new canvases or empty (without any content) canvases can be generated in various ways. Exemplary ways of generating canvases are illustrated and discussed below in connection with FIGS. 20*a*-25*d*, according to some implementations of the current subject matter.

A. View-Aligned Canvas

Figure 20A:
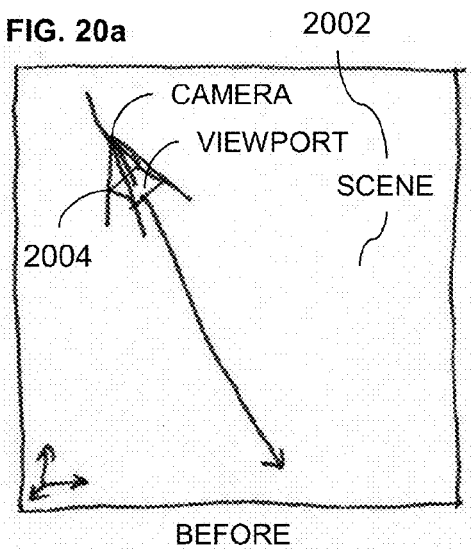
FIGS. 20a-d illustrate an exemplary creation of a new 2D plane that can be a fixed distance away from the scene camera, according to some implementations of the current subject matter.
Figure 20B:
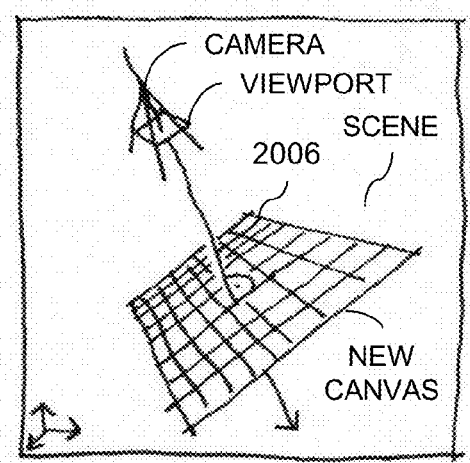
Figure 20C:
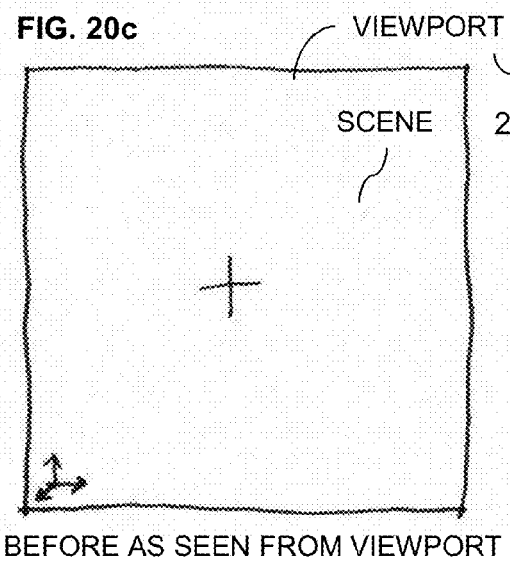
Figure 20D:
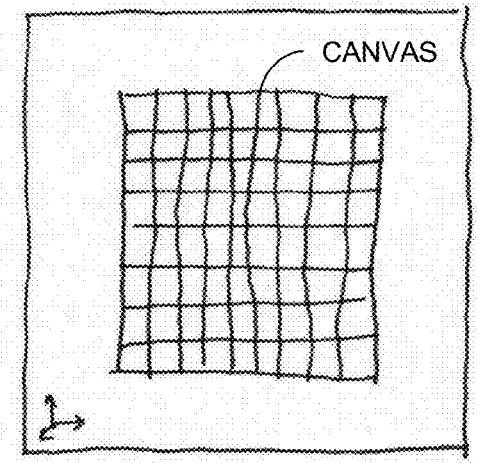

As shown in FIGS. 20*a*-*d*, a new canvas can be created that can be a fixed distance away from the scene camera. Alternatively, if an existing element of the scene is selected, the distance of this element from the scene camera is used as the distance of the new canvas to the scene camera. This canvas can be parallel to a viewport of the camera 2004. In other words, the user can be "looking at" the canvas 2006 once it is created. As shown in FIG. 20*a*, the scene 2002 and scene camera 2004 are illustrated, before creation of the canvas. FIG. 20*b* illustrates a newly created, viewport-aligned canvas 2006. FIGS. 20*c* and 20*d* illustrate the scene 2002 before and after creation of the canvas from the vantage point of the scene camera 2004.

B. Relational Canvas(es)

Figure 21A:
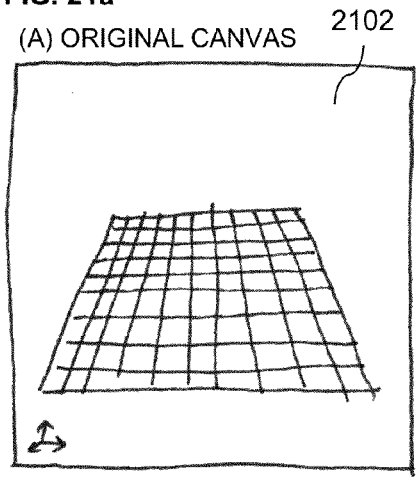
FIGS. 21a-c illustrate an exemplary way of creating a new 2D plane in reference to an existing 2D plane, according to some implementations of the current subject matter.
Figure 21B:
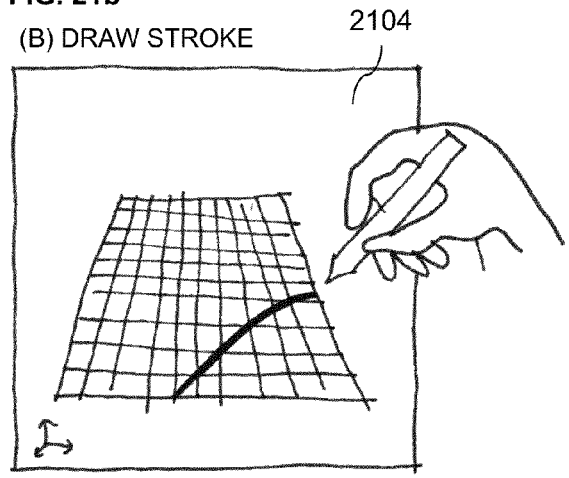
Figure 21C:
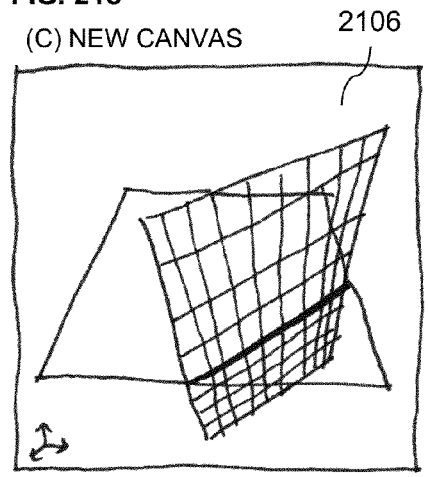

Alternatively, a line segment or stroke can be defined on an existing 2D canvas, defining the approximate intersection of the new canvas with this existing canvas. The new canvas can then be rotated to the correct orientation about the axis of intersection. An example of this is illustrated in FIGS. 21*a*-*c*. FIG. 21*a* illustrates an exemplary scene with an existing canvas 2102. FIG. 21*b* illustrates a stroke 2104 drawn by the user to indicate how a new canvas should intersect with the existing canvas. FIG. 21*c* illustrates a newly created canvas 2106, wherein the stroke is removed.

Similarly, two line segments and/or strokes can be defined on two distinct existing canvases. If the two lines passing through these strokes and/or line segments are not skew, a new canvas can then be created, such that both strokes/line segments lie within the plane of the new canvas.

C. View Canvas

As discussed above in connection with FIGS. 3*a*-*d*, the user can, at any point, create a canvas that is only viewable from the current scene camera view (a "view canvas"). The user can add any content to this canvas, but as soon as the user navigates away from the view the canvas was created in, the canvas and its content can become hidden.

D. Predefined Groups of Canvases

Figure 22A:
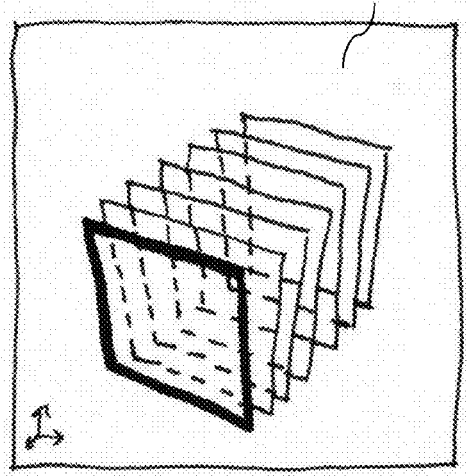
FIGS. 22a-d illustrate exemplary multiple arrangements of 2D planes, according to some implementations of the current subject matter.
Figure 22B:
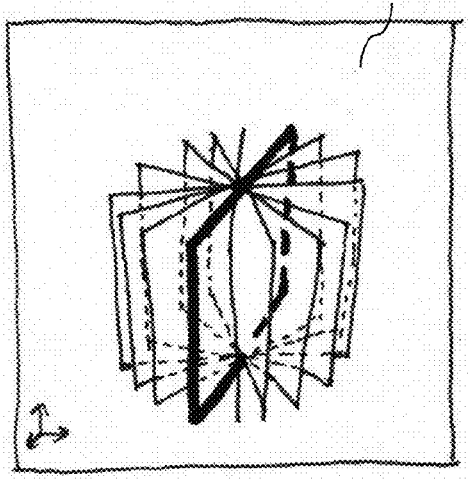
Figure 22C:
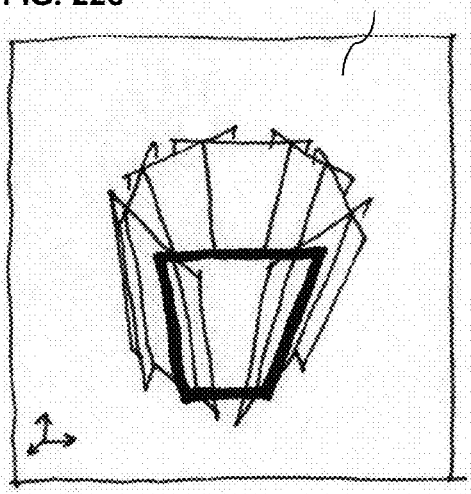
Figure 22D:
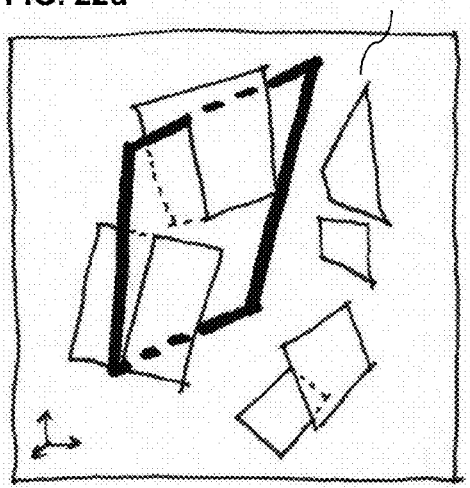

In some implementations, a predefined group of canvases can be assembled. Canvases can be assembled using several predefined suggested arrangements. Exemplary arrangements are illustrated in FIGS. 22*a*-*d*, and can include, but are not limited to, at least one of the following: parallel stacks 2202 (as shown in FIG. 22*a*), axial cross-sections 2204 (as shown in FIG. 22*b*), a circumferential ring 2206 (as shown in FIG. 22*c*), and/or any other predefined suggested arrangements, including randomly placed canvases 2208 within a certain area (as shown in FIG. 22*d*). The user can specify properties of these arrangements, such as the number of canvases, spacing, angular variation, etc.

Figure 23A:
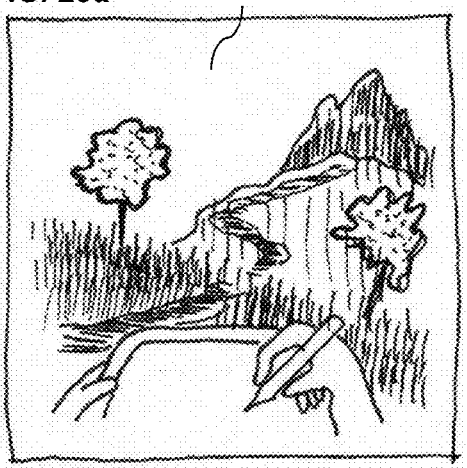
FIGS. 23a-d illustrate an exemplary usage of a predefined 2D plane arrangement, such as, a "parallel stack" of 2D planes, according to some implementations of the current subject matter.
Figure 23B:
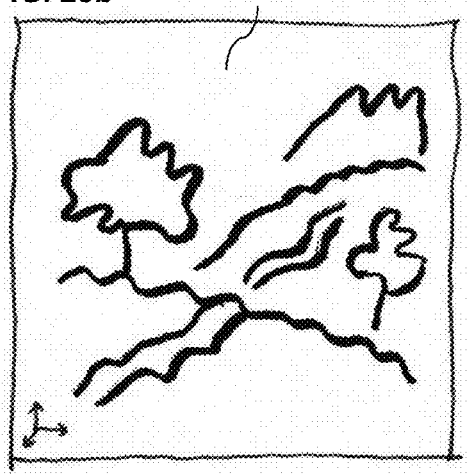
Figure 23C:
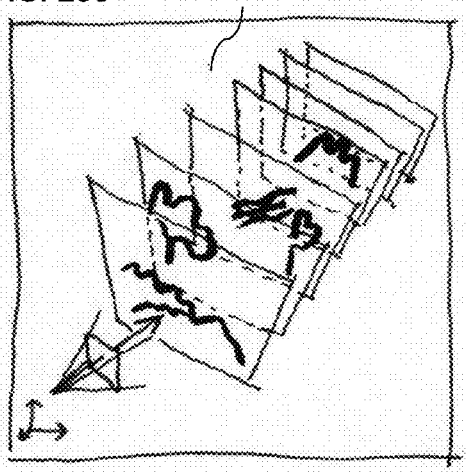
Figure 23D:
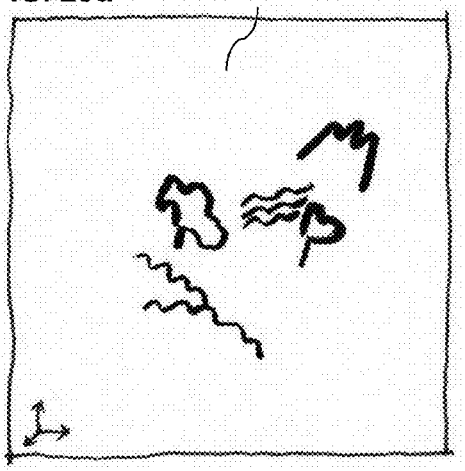

FIGS. 23*a*-*d* illustrate an exemplary usage of a predefined canvas arrangement, such as, a parallel stack of canvases. As shown in FIG. 23*a*, the user is shown sketching a landscape 2302 outdoors using the system on a mobile device. FIG. 23*b* illustrates an exemplary sketch 2304 of the landscape in the user computing graphics system. FIG. 23*c* illustrates the sketch from a different viewpoint 2306, wherein the sketch can be composed of several 2D sketches drawn on a stack of canvases parallel to the scene camera 2310. When the parallel canvases are arranged together, a determination of depth can be made from various points of view, such as viewpoint 2308, shown in FIG. 23*d*.

E. Geolocated Canvas and Geolocated Canvas Groups

FIGS. 24*a*-*f* illustrates an exemplary use of a GPS-assisted navigation, according to some implementations of the current subject matter. Using such navigation, a canvas can be positioned at a particular GPS location (corresponding to a real-world GPS location). Once a canvas is created in this manner, if the user enables GPS-assisted navigation, then whenever the user moves to the position in the real world where the canvas was created, the scene camera can navigate to where the canvas is located in the virtual scene. In some implementations, a constraint can be imposed to make new canvases vertical, and simply use the compass orientation to determine the orientation of the canvas around the vertical. The GPS coordinates and orientation of the canvas can also be specified manually when GPS-assisted navigation is disabled.

Figure 24A:
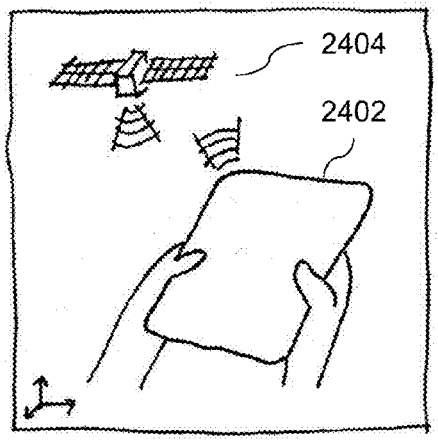
FIGS. 24a-f illustrates an exemplary use of GPS-assisted navigation to generate 2D planes, according to some implementations of the current subject matter.
Figure 24B:
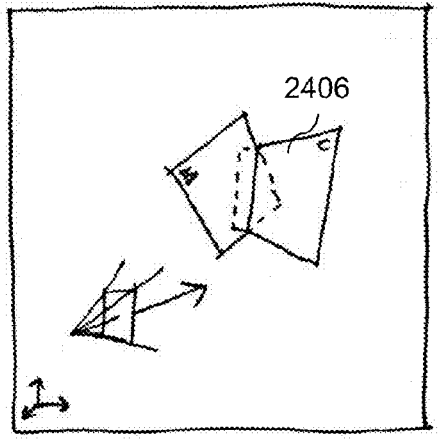
Figure 24C:
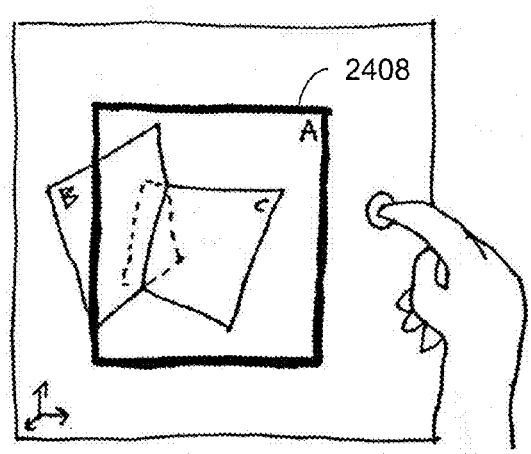
Figure 24D:
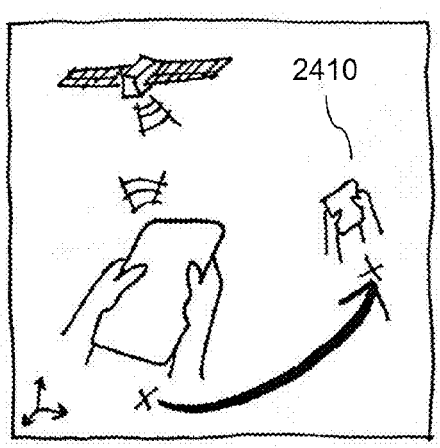
Figure 24E:
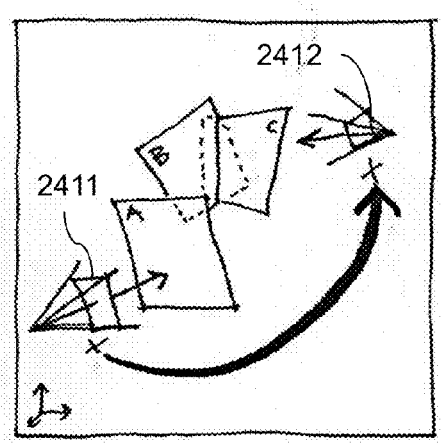
Figure 24F:
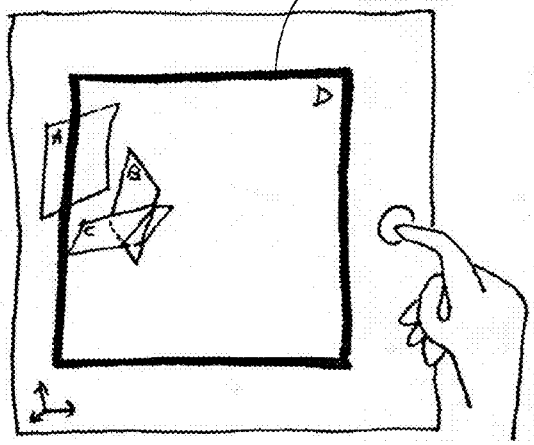

As illustrated in FIG. 24*a*, the user is shown using the system on a mobile device 2402 with a GPS receiver communicating with a GPS device (e.g., a satellite) 2404. FIG. 24*b* illustrates the current canvas arrangement 2406 within the system. FIG. 24*c* illustrates the user adding a new geolocated canvas 2408, based on the current GPS location of the user received by the device. FIG. 24*d* illustrates the user moving to a new location 2410. FIG. 24*e* illustrates that as a result of the GPS-assisted navigation tool, the scene camera navigates to a new location 2412 from the original location 2411 in the virtual scene. FIG. 24*f* illustrates the user creating another geolocated canvas 2414 at the user's new location. Geolocated canvases can be viewed by a passerby using a mobile device, such as a phone, a tablet, a laptop computer, and/or any other device(s). Alternatively, such content can be viewed by a computer via a tour using a digital maps service, such as those offered by Google, Inc., Microsoft or Apple, Inc.

In some implementations, canvases can be produced automatically in sequence as the user is navigating through a scene using a gyroscope or GPS assisted navigation tools. This can allow the user to create a continuous arrangement of canvases along a particular path of motion.

F. Canvases in Relation to a Model

Figure 25A:
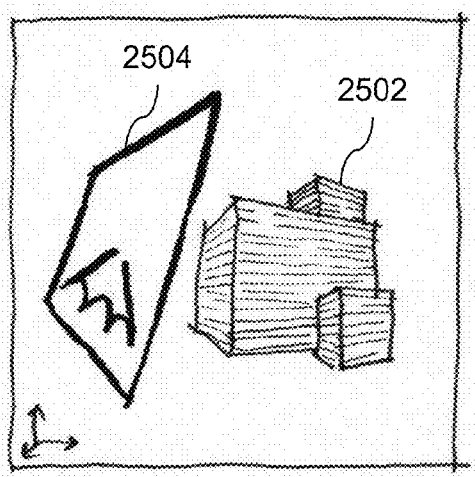
FIGS. 25a-d illustrate exemplary 2D planes positioned in relation to a 3D model, according to some implementations of the current subject matter.
Figure 25B:
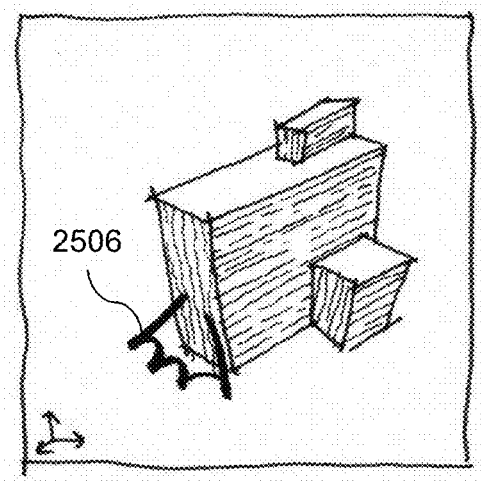
Figure 25C:
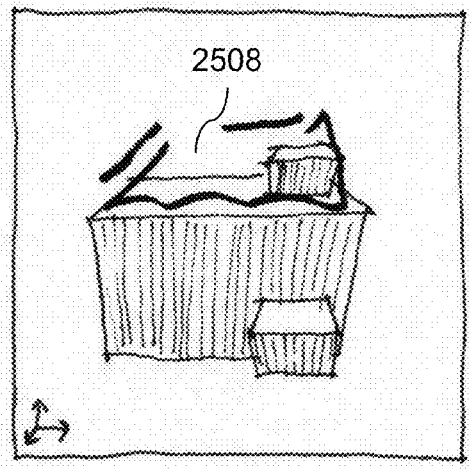
Figure 25D:
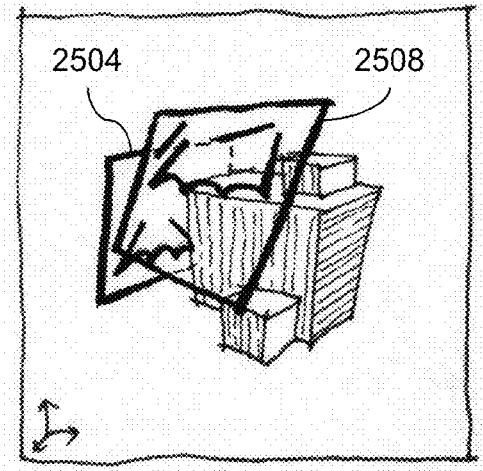

If a relational 3D model is present in the scene, either single canvases, or entire groups of canvases can be placed in relation to this model. In addition to manually creating and positioning a canvas in the vicinity of the model, using one of the previously specified functions, the user can specify a position on the model on which a single new canvas should lie. For a model with a well-defined polygonal mesh representative of the surface of an object, a canvas tangential to the surface of the model is created, where the normal of the canvas plane is simply the normal of the face of the mesh on which the user-specified point lies. For a model composed of an unstructured point cloud (i.e., an unstructured set of vertices in a 3D coordinate system), the plane of the canvas can be found by taking the k-nearest points (k is an integer) to the location specified by the user, and subsequently finding a least-squares plane that approximates the surface of these k points. The user can also define a group of canvases in relation to a model with a well-defined surface mesh, in which case the mesh of the model is approximated by a sparse set (sparsity can be controlled by the user) of canvases. With no approximation, the result would amount to one canvas per mesh face. However, the mesh can be initially simplified, using any known mesh simplification technique, yielding fewer canvases that more roughly approximate the mesh. FIGS. 25a-d illustrate exemplary canvases positioned in relation to a model. FIG. 25a illustrates a relational 3D model 2502 that is inserted into the scene and a canvas 2504 that is created in relation to the model. A sketch 2506 can be drawn on the canvas, as shown in FIG. 25b. FIG. 25c illustrates a second canvas 2508 with the sketched content in relation to the model. FIG. 25d illustrates both canvases and the 3D model.

VI. Addition of Content to Canvas

In some implementations, once one or more canvases are created in the scene, the user can add various types of 2D content to these canvases either before or after the respective canvases are positioned within the scene. FIGS. 26a-29d along with the following discussion illustrate various exemplary methods for adding content to canvas(es).

A. Drawing Strokes

Figure 26A:
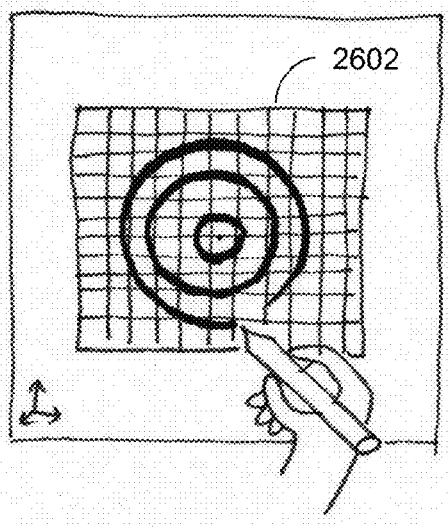
FIGS. 26a-b illustrate exemplary ways a user can draw strokes on a 2D plane, according to some implementations of the current subject matter.
Figure 26B:
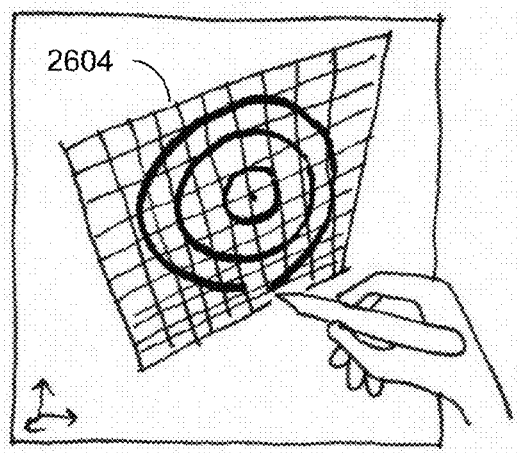

In some implementations, the user can draw strokes on a canvas. The user can draw strokes on a canvas in at least one of the following ways, for example: on a canvas through a 2D interface (potentially having grid-lines drawn on it), on a canvas in 3D space, on a view canvas in 2D, and/or in any other fashion. As illustrated in FIGS. 26a-b, the user can draw on a canvas while looking directly at the canvas (as shown in FIG. 26a), in an orthogonal view 2602, or in perspective, while viewing the canvas from an angle 2604.

In some implementations, the 2D interface can be used for orthogonal drawing or tracing images. The user can draw lines in a gridded window and strokes can appear in a corresponding point on the 3D representation of a scene. Alternatively, the user can draw directly on the 3D representation of a scene and the transformation to 2D can be computed internally. The user can use existing strokes as context and use the user's natural sense of perspective to draw how the user thinks the object should look. These lines can exist in 3D space and, once drawn, can be rotated and repositioned relative to the other canvases.

B. Drawing View-Dependent Strokes

FIGS. 27a-d illustrate an exemplary drawing of view-dependent strokes, according to some implementations of the current subject matter. As shown in FIGS. 27a-d, the user can draw strokes on a view canvas. The view canvas can allow the user to orient a drawing with respect to a scene such as by selecting a particular view angle without designating a specific position for the canvas in the 3D representation of a scene. The user can create a view canvas from any viewpoint in the scene. From that point on, it can act as a bookmark or a reference point to that specific angle of view. Once the view canvas is created, the user can draw freely on the screen, and the strokes can be drawn directly on it. The strokes can be tied to this particular bookmarked view, relative to the rest of the scene.

Figure 27A:
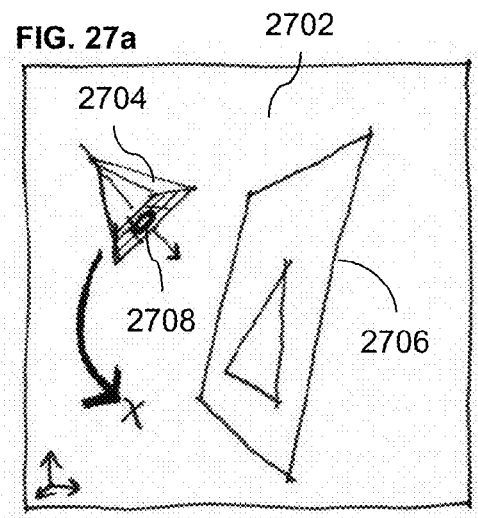
FIGS. 27a-d illustrate an exemplary drawing of view-dependent strokes, according to some implementations of the current subject matter.
Figure 27B:
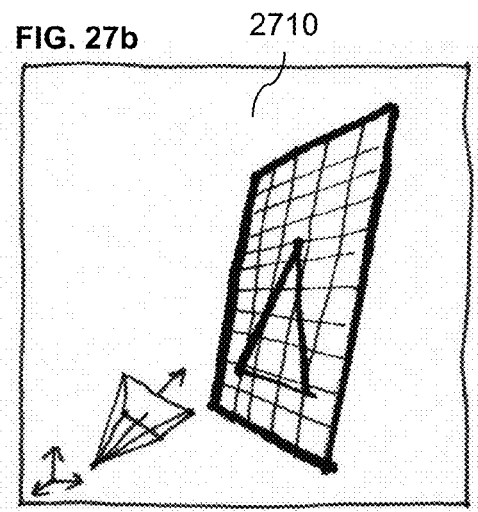
Figure 27C:
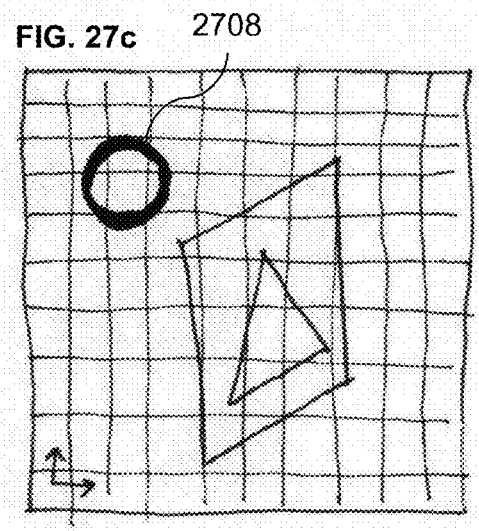
Figure 27D:
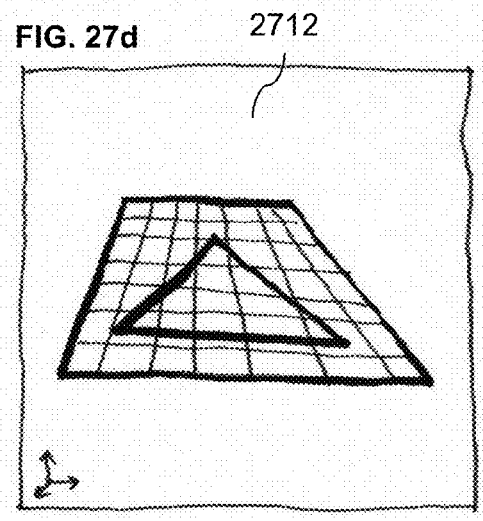

FIG. 27a illustrates an exemplary 3D representation of a scene 2702 with a scene camera 2704 and an existing 2D canvas 2706. FIG. 27c illustrates a camera vantage point 2708. FIGS. 27b and 27d illustrate an exemplary way that the user can navigate to different viewpoints 2710 and 2712, respectively, thereby hiding the vantage point 2708, i.e., the vantage point 2708 can only be seen from the viewpoint from which it was originally drawn.

C. Adding Photographs and View-Dependent Photographs

As shown and discussed in connection with FIGS. 5a-d, photographs can be added to a canvas. Photographs can be taken directly using the camera of the mobile device, or they can be imported from the file system of the device. In each case, photographs may be placed on a specified, pre-existing canvas. Alternatively, the system can allow the user to take a photograph directly within the scene. The user can adjust the position of the photograph while looking through the camera of the mobile device, and can view a preview of the photograph within the scene during this process. Using GPS-assisted navigation, a single photograph or collections of photographs can be placed within the scene at real-world GPS locations. This can enable the user to perform various manipulations of the photograph such as positioning a single photograph in relation to other elements within the scene or the real world, or creating a panorama of photographs from a particular position. As stated above, FIG. 5a illustrates the user taking a photograph using the mobile device's camera. FIG. 5b illustrates the user outlining a portion of the photograph to be retained on the canvas. FIG. 5c illustrates the user viewing the resulting photograph in the 3D scene.

The user can also add view-dependent photographs to a canvas, according to some implementations of the current subject matter, by adding them to a new or existing view canvas within the scene. Such photographs may then only be visible from a specific vantage point, and might not visible otherwise.

D. Adding Occlusions

The user can also add paint texture and/or occlusions to a canvas, according to some implementations of the current subject matter. The user can paint occlusions onto a canvas, thereby rendering part of the canvas either somewhat or fully opaque, and giving the occluded portion of the canvas a certain color. This can prevent displaying various content on other canvases that can be disposed behind this canvas. An example of a user painting occlusions is illustrated and discussed above in connection with FIGS. 6a-c. As shown in FIG. 6a, a canvas with content can be shown behind another blank canvas (gridlines shown in FIG. 6a). FIG. 6b illustrates a user painting onto the front canvas, thereby hiding some of the content on the back canvas. FIG. 6c shows the result from a different viewpoint.

E. Adding Other 2D Content

The user can also add other 2D content to a canvas, according to some implementations of the current subject matter. Text annotations can be inputted within an axis-aligned textbox. The text can be inputted using a keyboard, a mouse, a touchscreen, etc., using text recognition software, and/or using any other methodology. Videos can be added to a canvas similarly to an image. A placeholder for the video, consisting of the first frame of the video, can be displayed by default in the scene. However, if the user is facing the camera, the video can be played back, while displaying the remaining content in the scene. Further, uniform resource locations ("URLs") can also be added similarly to the text and can point to online or offline content. Other visual content such as scanned documents can also be displayed as images placed on the canvas.

F. Adding Content Across Multiple Canvases

In some implementations, the user can add content across multiple canvases. In this case, multiple disjoint canvases positioned in 3D space can be sketched on simultaneously, without having to toggle or otherwise switch between them. Similarly, content, such as a stroke or an image, spanning multiple canvases, can be projected onto these canvases simultaneously, the result being a segmentation and projection of the stroke or image across more than one canvas. From a particular viewpoint, each stroke point or image fragment can initially be projected onto possibly more than one visible canvas in the 3D representation of a scene. For each stroke point, the necessary depth for it to lie on each visible canvas can be computed, and the stroke can be iteratively projected onto each canvas. Each individual projection can be performed in the same way as it would ordinarily be performed on a single canvas. In some implementations, these candidate canvases can have a specific ordering, in relation to how far they are located from the camera. It is reasonable to assume that the user generally draws on canvases that are closer to the camera and, if canvas bounds are visible, the user can be more likely to want a content to be projected onto a particular canvas if the content fits within the canvas bounds. Additionally, it can be assumed that the user may prefer to project content onto canvases the user is facing, as opposed to canvases that are at a sharp angle with the viewpoint of the scene camera. Based on these assumptions, for each stroke/image fragment, a likelihood can be computed for each candidate canvas that it should be projected onto that canvas. For each stroke/image fragment, the canvas with the highest likelihood is the one onto which this fragment can be projected. In this way, the user can create and place content in 3D space without having to explicitly specify which canvas to place it on. Instead, a group of canvases (or all currently visible canvases) can be specified, and the system can partition the content according to the aforementioned algorithm. A number of other assumptions can be made to predict on which canvas(es) a stroke/image fragment is to be projected. Of course, a user can manually specify the canvas(es) on which the stroke/image fragment should be projected.

Figure 28A:
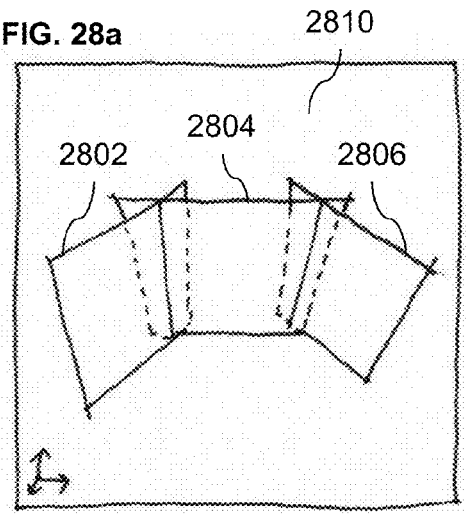
FIGS. 28a-c illustrate an exemplary methodology for adding view dependent content across multiple 2D planes, according to some implementations of the current subject matter.
Figure 28B:
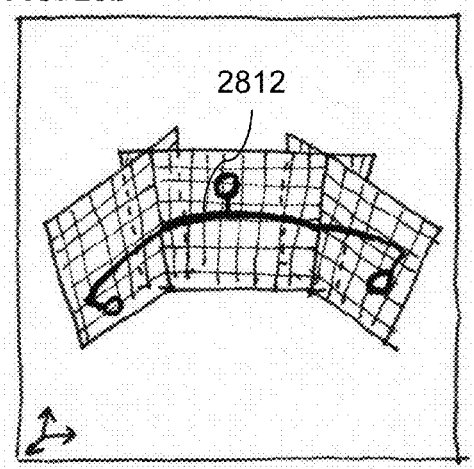
Figure 28C:
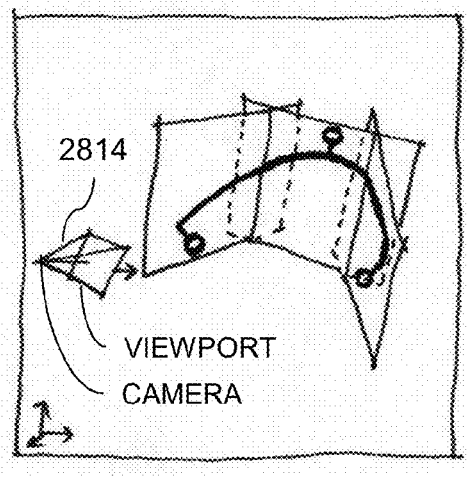

FIGS. 28a-c illustrate the above exemplary methodology for adding view dependent content across multiple canvases. FIG. 28a illustrates three existing canvases 2802, 2804, 2806 in a 3D representation of a scene 2810. As shown in FIG. 28b, the user can draw a sketch 2812 across all three canvases, without needing to toggle between different canvases. FIG. 28c illustrates the resulting sketch from a different viewpoint 2814, showing how the user's strokes were split up and assigned among the different canvases.

G. Erasing Content

Figure 29A:
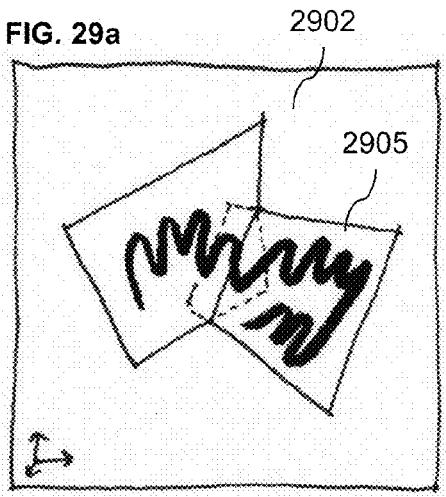
FIGS. 29a-d illustrate an exemplary method for erasing content from a 2D plane, according to some implementations of the current subject matter.
Figure 29B:
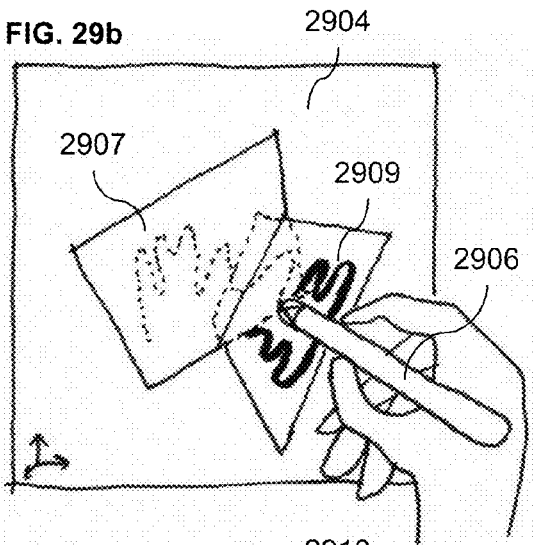

The user can also erase content from a canvas, according to some implementations of the current subject matter. Content can be erased by simply highlighting it, and then deleting it. Additionally, an eraser tool can allow the user to erase specific parts of strokes, images and/or other content. As the user is moving the eraser tool, the screen location of the eraser is projected onto the plane of the selected canvas. If any content overlaps the projected location of the eraser, it is either removed partially or as a whole. FIGS. 29a-b illustrate an exemplary method for erasing content from a canvas, according to some implementations of the current subject matter. FIG. 29a illustrates exemplary arrangement 2902 of canvases with content 2905 being placed across the canvases. An eraser tool 2906 can be used to erase content from the canvases (shown as erased content 2907) while keeping the remainder of the content (shown as content 2909). The entire content can be erased using the eraser 2906.

Figure 29C:
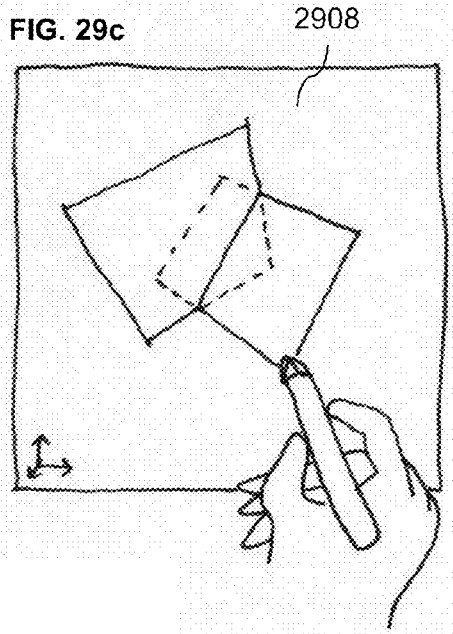
Figure 29D:
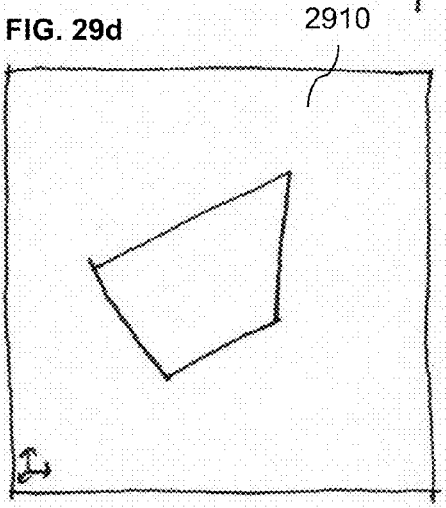

Similar to adding content across multiple canvases, content can also be erased across multiple canvases. In this case, the front-to-back ordering of the canvases (from the point of the view of the user) can be used to decide which content to remove, i.e., only the content on the "front" canvas can be removed. The content removal can be on a local (and/or partial) level, on the level of entire strokes, images, etc., and/or on a canvas level, in which case the entire "front" canvas can be removed. FIGS. 29c-d illustrate an entire canvas being erased by highlighting and then deleting it using the eraser tool 2906, where FIG. 29c illustrates two canvases 2908 prior to one of them being erased, and FIG. 29d illustrates one canvas 2910 being left after the other canvas has been erased. Note that at the location of the eraser tool, the canvas was in front of the other canvas in the scene (from the current viewpoint of the user). Alternatively, the eraser can be projected onto every visible canvas, and content can be removed from each canvas that overlaps the projected location of the eraser. This results in a "scene-wide" removal of content that overlaps the eraser location from the current viewpoint of the user.

VII. Transfer of Content Among Canvases

In some implementations, the user can transfer 2D canvas content to another canvas, according to some implementations of the current subject matter. FIGS. 30a-32b along with the following discussion illustrate various ways of transferring content between canvases.

A. Duplicating Content From Canvas to Canvas

In some implementations, content can be duplicated across canvases. The user can copy the content of one canvas directly onto another canvas. The content can either be transferred from one canvas plane onto another, or duplicated onto the destination canvas (i.e. creating a new copy of the content, and retaining the original copy on the original canvas). The user can copy content while creating new canvases, where the relationship to the original canvas is either predefined or specified by the user. In this way, the user can create groups of canvases with the same content, according to similar predefined arrangements to the ones used to generate groups of empty canvases.

B. Pushing Canvas Content

Figure 30A:
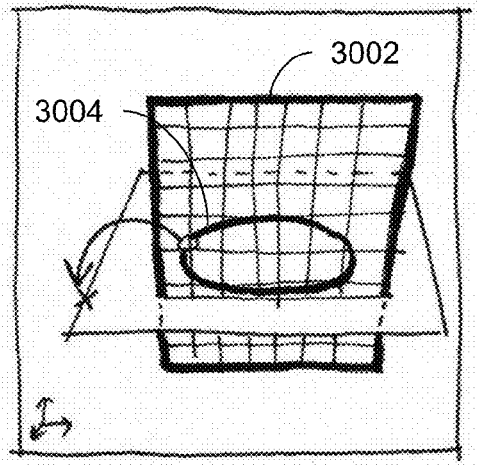
FIGS. 30a-d illustrate an exemplary process of "pushing" or reprojecting content from one 2D plane to another 2D plane, according to some implementations of the current subject matter.
Figure 30B:
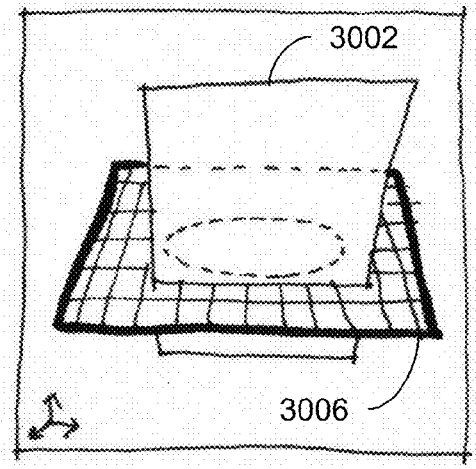
Figure 30C:
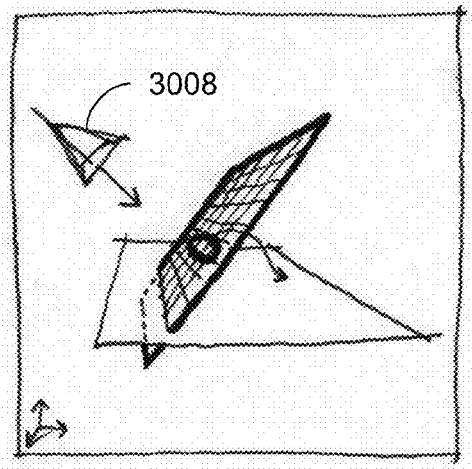
Figure 30D:
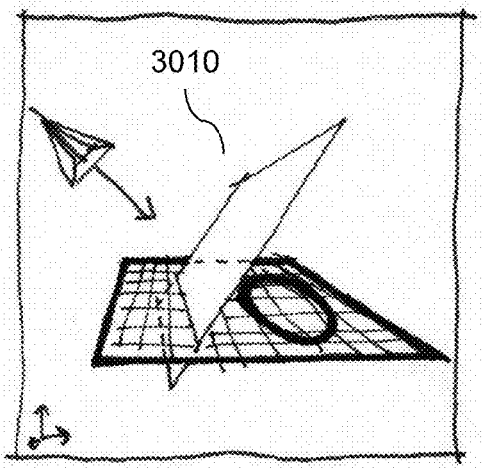

In some implementations, a user can "push" all or a portion of one canvas content onto another canvas, according to some implementations of the current subject matter. The user can transfer strokes, images, and other content from a view canvas into 3D space using the perspective projection functionality that can project content onto 2D canvases positioned in the 3D representation of a scene. The content and target canvas can be selected and then each instance of content (strokes, images, etc.) can be projected from the view canvas onto the plane of the target canvas. From the camera viewpoint of the view canvas, the carried-over strokes might not be visibly different, however, these strokes can now be positioned in the plane of the target canvas—the different location becomes evident as soon as the user navigates to a different location. Content can similarly be projected from one 2D canvas onto another 2D canvas. FIGS. 30a-d illustrate an exemplary pushing of content from one canvas to another. FIG. 30a illustrates a stroke 3004 on the original canvas 3002. FIG. 30b shows the stroke being reprojected onto the target canvas 3006. While from the views of FIGS. 30a-b, the stroke appears the same, the difference is apparent when this operation is viewed from different viewing angles 3008 and 3010, as shown in FIGS. 30c-d, respectively.

C. View-Dependent Clone Brush

In some implementations, the user can use a view-dependent clone brush to transfer content from one canvas to another. A view-dependent clone brush tool can allow the user to clone images, portions of images, strokes, portions of strokes, other content/portions of content, etc. from one canvas to another canvas. As such, some imagery in the view dependent content that exist on one canvas can be projected onto another canvas, where the imagery can be visible in a particular angle of view. In projecting, the perspective of the viewing angle can be taken into account (e.g., strokes projected from a closer canvas to a farther canvas can become proportionally larger when re-projected).

Similarly, content that can exist on one 2D canvas can be projected onto another 2D canvas visible from that camera view, or onto the same 2D canvas, but at a different location on this canvas. The perspective of the viewing camera can be likewise taken into account (e.g., if strokes projected from a closer canvas to a farther canvas can become proportionally larger when re-projected). The user can select the destination canvas, as well as how the new content will be positioned relative to the identical portion of the original content. This can be accomplished by marking an "origin" of the clone tool on the content of the original canvas. The user can then begin drawing or brushing over a new location, either on the same 2D canvas, or on a newly selected 2D canvas. The screen coordinates of the "origin" and "new origin" can be stored, and a mapping in screen coordinate space can be computed. As the user continues to draw or brush over the new location, corresponding areas of the original content can be projected into screen coordinates, duplicated, and then reprojected onto the new location, either on a pixel level, or on an object level by targeting entire strokes or images. Note that a user can also choose to disable the view-dependence of the clone brush, creating a more conventional clone tool. In this case, the mapping can be computed between the "origin" and the "new origin" in canvas coordinate space, and content can be simply duplicated to the new location.

Figure 31A:
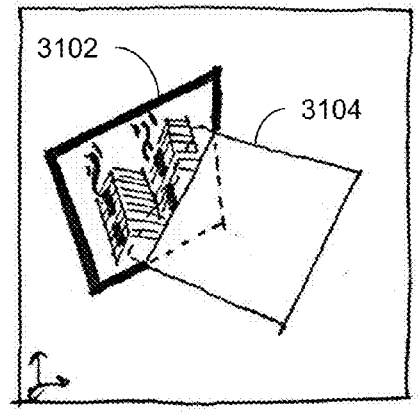
FIGS. 31a-e illustrate an exemplary pixel-level clone brush, according to some implementations of the current subject matter.
Figure 31B:
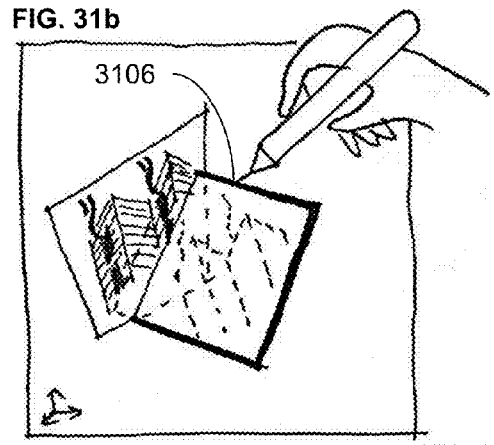
Figure 31C:
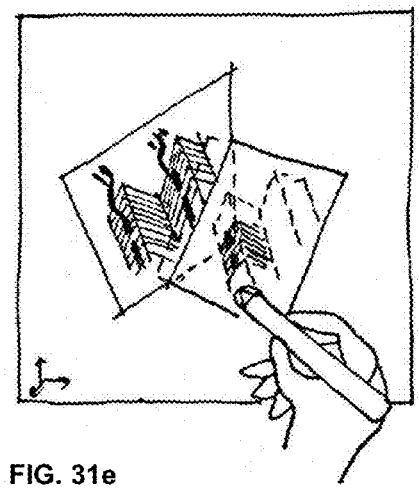
Figure 31D:
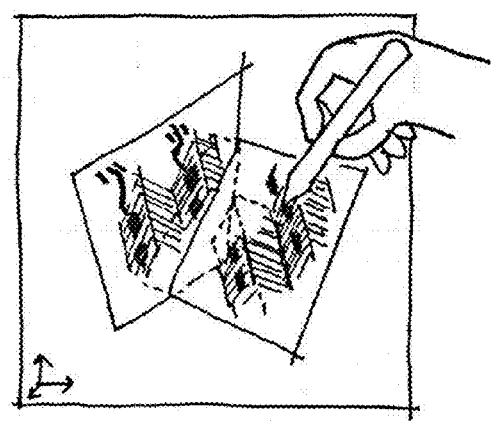
Figure 31E:
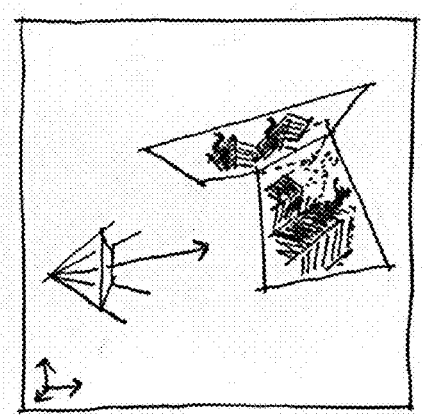

An example of the pixel-level clone brush is shown in FIGS. 31a-e. FIG. 31a illustrates an original canvas with content 3102 and a target blank canvas 3104. As shown in FIG. 31b, the user can select a position 3106 on the blank canvas to begin cloning the content in the original canvas. FIGS. 31c and 31d show two stages of the cloning. Note that from the current viewpoint, the cloned portions of new content can look identical to the original content. However, as seen in FIG. 31e from a different viewpoint, this content has been projected onto the second canvas, and thus has a different perspective projection.

D. Splitting a Canvas

Figure 32A:
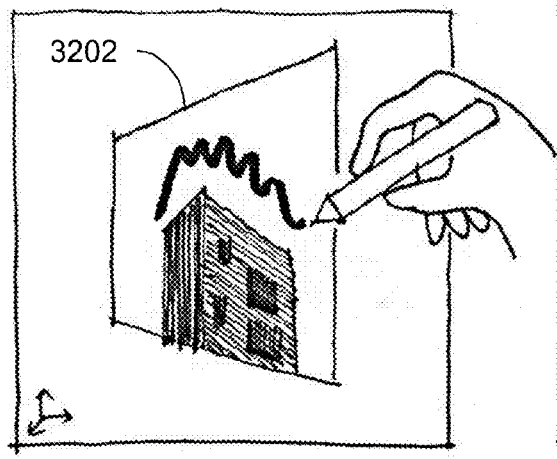
FIGS. 32a-b illustrate an example of a user splitting a 2D plane, according to some implementations of the current subject matter.
Figure 32B:
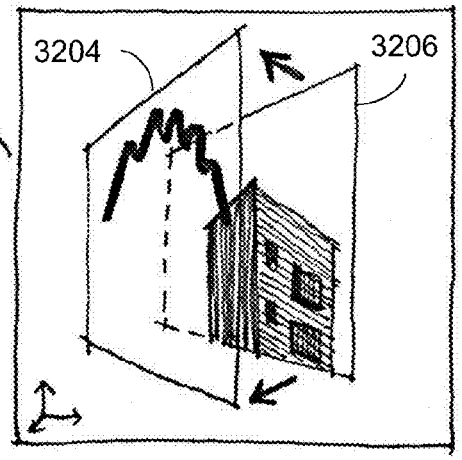

In some implementations, a canvas can be split into several individual canvases each containing only one specific type of content from the original composition of content. In particular, a canvas containing an image, and a sketch over that image, can be split into two canvases, with the background canvas containing the image and the foreground canvas containing the sketch. This can create a notable parallax effect as the user orbits around this selection, in that the user can get a certain sense of depth from the two canvases being positioned at slightly offset depths. In addition, the user can then easily manipulate specific types of content, e.g., hide the original image the sketch was drawn over. FIGS. 32a-b illustrate an example of a user splitting a canvas. FIG. 32a shows the original canvas 3202, which can contain an image and a sketch. As shown in FIG. 32b, the sketch can be separated from the original canvas, leaving two canvases 3204 (with the sketch) and 3206 (with the original image) with unique types of content.

In some implementations, the user can define a dividing line on a canvas (e.g., by using a stylus tool, a hand gesture, a mouse click, etc.), Based on the division, the user's computing device can implement a computer graphics command that can "split" the canvas into at least two separate canvases. Any content present no the original content is split along the dividing line, and content on either side is assigned to the corresponding new canvas. In some implementations, the canvas can be split through objects, strokes, photographs, etc.

VIII. Manipulation of Canvases

In some implementations, the user, while working with 2D canvases, can be provided with an ability to manage 2D canvases and their associated content. FIGS. 33a-35c along with the following discussion illustrate various ways the canvas can be manipulated.

A. Transforming a Canvas

FIGS. 33a-f illustrate various exemplary ways in which a canvas can be transformed, according to some implementations of the current subject matter. A canvas, and all its associated content, can be transformed in various ways within the 3D space. It can be moved in any direction, rotated about any of its axes, scaled uniformly, stretched along its axes, as well as manipulated in any other way. Canvas content can also be deformed in a freeform manner (within the plane of the canvas), by dragging the corners of the bounding box of the canvas. The user can accomplish this through the use of various computing device's input devices (e.g., a stylus tool, a hand gesture, a mouse, a keyboard, etc.).

Figure 33E:
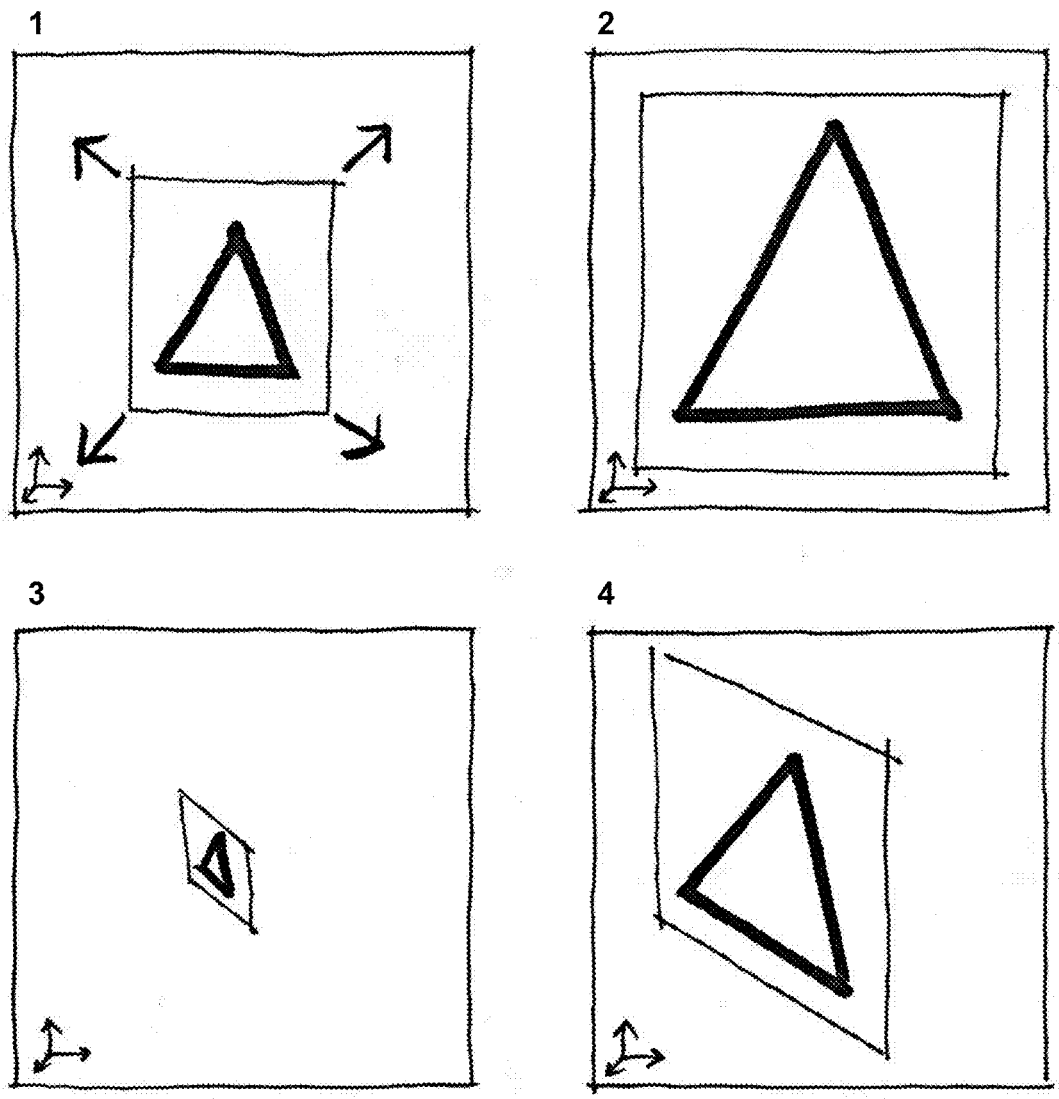

FIG. 33a illustrates an exemplary freeform distortion of canvas content. As shown in FIG. 33a (1, 2, 3, 4), the user can distort an object contained on a canvas by moving it in various directions (either one at a time or simultaneously), changing its shape, contour, orientation, etc. FIG. 33b (1, 2, 3, 4) illustrates an exemplary translating of the content within the plane of the canvas. In this case, the user can move an object on a canvas by "dragging" it to another location on the canvas. In view of the canvases being infinite, the object can be moved anywhere. FIG. 33c (1, 2, 3, 4) illustrates an exemplary shifting of content along the normal of the plane of the canvas. In this case, if the user is viewing the canvas straight on, the shift causes the canvas to move closer or farther away from view. FIG. 33d (1, 2, 3, 4) illustrates an exemplary rotating of content around one of the axes of the canvas. By using the user's computing device's input devices, the user can change the position and/or orientation of an object in space (e.g., either within the same plane as the original object, and/or in space) by moving the object about a virtual axis. For example, FIG. 33d-1 and FIG. 33d-2 display rotating the object around its y-axis; FIG. 33d-3 and FIG. 33d-4 shows the object being rotated around its x-axis. As can be understood, the rotation axis can be arbitrarily chosen. FIG. 33e (1, 2, 3, 4) illustrates an exemplary uniform scaling of the content. For example, the size of an object can be enlarged (FIGS. 33e-1 and 33e-2) or reduced (FIG. 33e-3 and FIG. 33e-4). FIG. 33f (1, 2, 3, 4) illustrates an exemplary stretching of the content along one of the axes of the canvas. For example, the object can be stretched sideways, thereby making it appear different from the original.

B. Folding a Canvas

In some implementations, a canvas lying in 3D space and containing an arbitrary collection of strokes and/or images can be folded into two distinct canvases using the following procedure. First, the folding line can be defined by the user. The user can draw either a straight line or a freeform stroke that can be automatically projected onto the canvas (in the latter case, a line can be approximated using least squares). This can split the contents of the canvas into two groups (one on either side of the line). Strokes on the canvas can be divided along the fold of the canvas, wherein the stroke parts of each side of the fold can be assigned to the corresponding canvas. Similarly, an image on the canvas (a closed outline of points, defining a texture-mapped 2D polygon) can be divided into two new texture mapped images. Note that the union of the two groups of strokes and two groups of images can yield the original set, i.e., no information is discarded. Second, the user can click/tap or otherwise select and drag the side of the canvas the user wishes to fold. The selected face can be freely rotated about the axis defined by the folding line. The parameters defining the canvas plane (x and y axes and origin) can be transformed by the axial rotation; however, the coordinates of the stroke and image vertices (in the 2D coordinate space of the new canvas) do not change as the canvas is folded. This can be similar to folding a piece of paper.

Figure 34A:
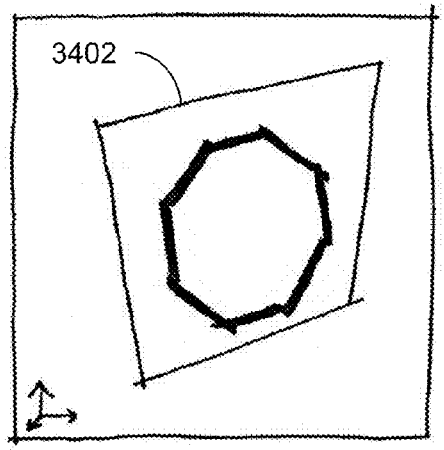
FIGS. 34a-c illustrate an example of folding a 2D plane, according to some implementations of the current subject matter.
Figure 34B:
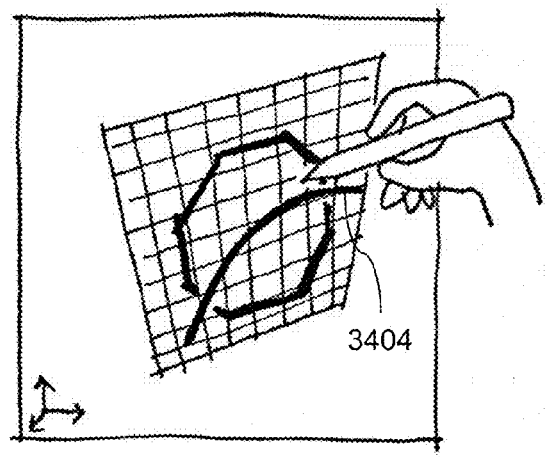
Figure 34C:
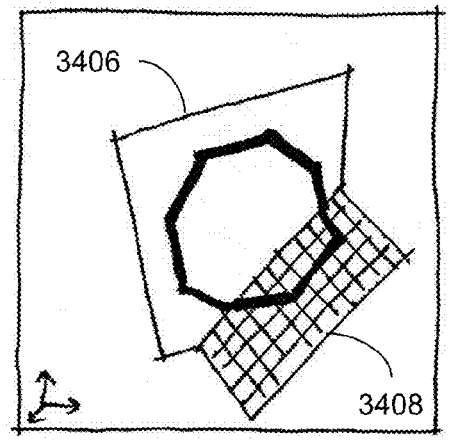

The process of folding a canvas can be recursively repeated one or more times on the two new generated canvases. An example of folding is shown in FIGS. 34a-c. FIG. 34a illustrates a canvas 3402 along with its associated 2D content. In FIG. 34*b*, the user is shown creating a folding line 3404 on this canvas. FIG. 34*c* shows the result of folding the canvas along the folding line 3404, where two portions 3406 and 3408 are created that include the folded content.

C. Bending a Canvas

Figure 35A:
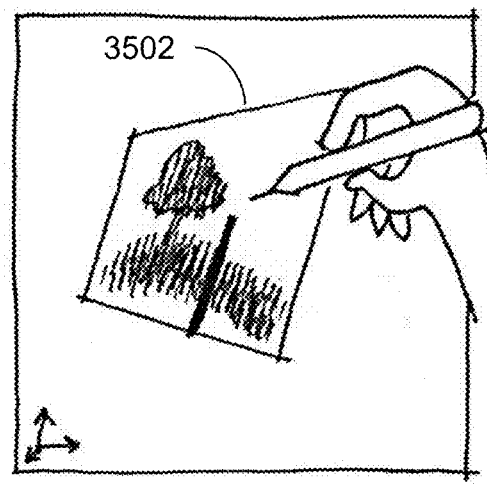
FIGS. 35a-c illustrate an example of bending a 2D plane, according to some implementations of the current subject matter.
Figure 35B:
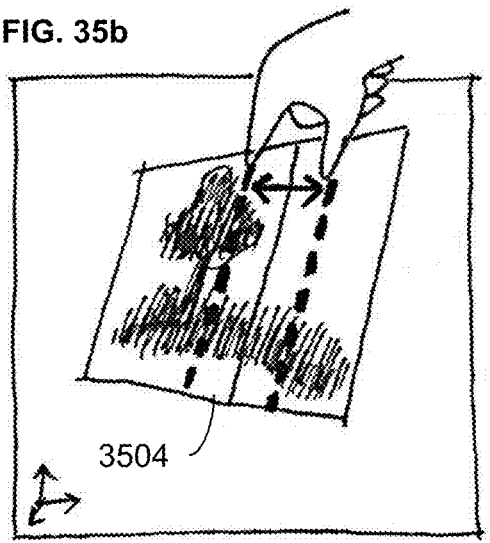
Figure 35C:
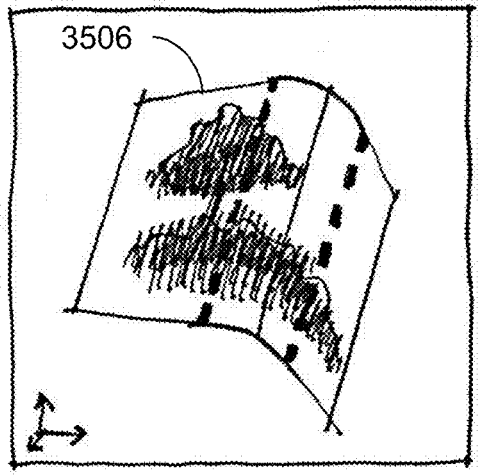

In some implementations, a canvas and its associated content can be bent, adding axial curvature to the canvas. Similarly to folding, the region of the canvas that will be bent can be defined (e.g., the thickness of the bend). Subsequently, the user can specify how much axial curvature to add to the canvas. This changes the bent region of the canvas from being planar to having a certain amount of curvature. Each stroke and image can be divided into n parts (where n is an integer), each of which are planar, but can be at a slightly different angle. Combined, they can provide an impression of following a non-planar curve (e.g., it will seem as if the canvas content is actually cylindrical or spherical). The bent portion of a canvas can be a variation of one of the predefined groups of canvases mentioned earlier—a circumferential ring of canvases. Bending can be performed on a once-bent canvas, to go from cylindrical to spherical curvature. An illustration of canvas bending is shown in FIGS. 35*a-c*. FIG. 35*a* shows the original canvas 3502 with its associated 2D content. In FIG. 35*b*, the user can define the bending region 3504 (indicated by dashed lines) of the canvas. FIG. 35*c* shows the result 3506 of bending the canvas. Users can also interpolate between bending a canvas and folding a canvas, to get different levels of curvature of the canvas.

IX. Creation and Editing of Time-Based Content

In some implementations, the user can create and/or edit time-based content. This can be done to support video content or other animated content. The video or animated content can include user-created videos, computer animations, animated graphics, moving images, movies, as well as any other content that can include movement of content and/or other form of motion. The user can animate content within a scene in various ways. FIGS. 36*a*-38*e* along with the following discussion illustrate exemplary ways in which the user can create and/or edit time-based content.

A. Animating Strokes on a Canvas

Figure 36A:
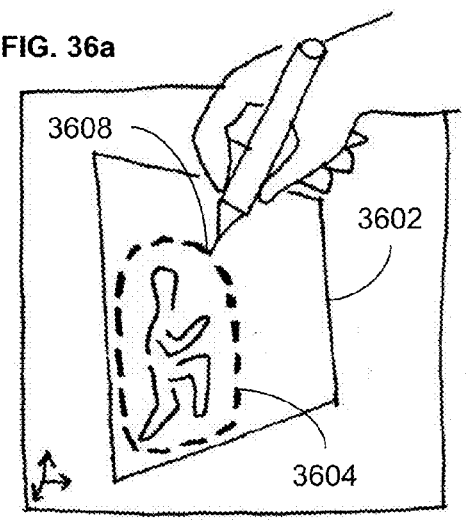
FIGS. 36a-d illustrate a user animating strokes on a 2D plane, according to some implementations of the current subject matter.
Figure 36B:
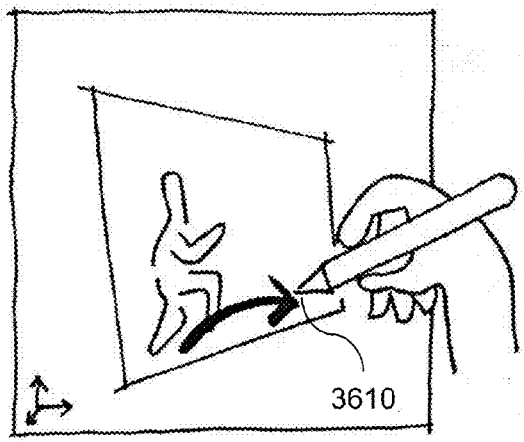
Figure 36C:
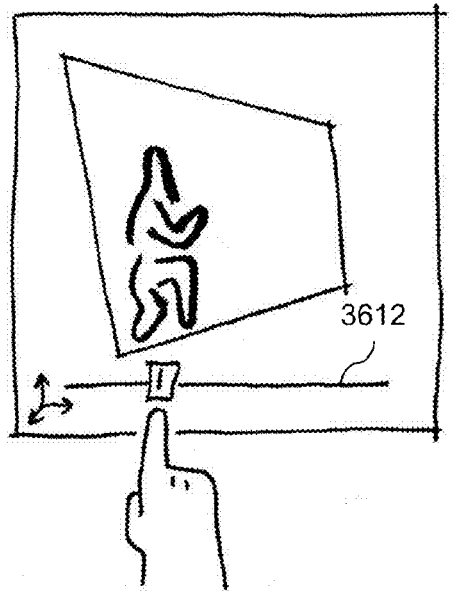
Figure 36D:
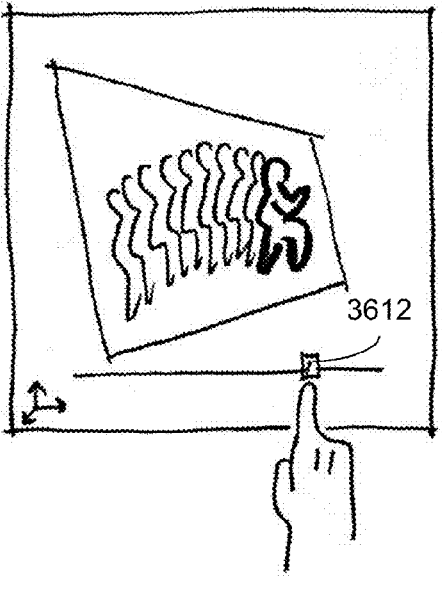

In some implementations, the user can animate strokes on a canvas. Selections of content on a canvas can be animated over time. This content can be moved along a stroke drawn onto the canvas, rotated about the selection's center, and/or scaled uniformly. In addition, the opacity of the content can be varied over time. A sequence of these transformations can be performed, and the user specifies the duration of each transformation. A canvas-specific slider can be used to play through the generated animation. A slider can be a graphical tool that can allow the user to view changes to object(s), canvas(es), and/or scene over time (e.g., from a point of placement of an object on the canvas to another point in time where the object may appear different from the first point). FIGS. 36*a-d* illustrate a user animating strokes on a canvas. In FIG. 36*a*, a canvas 3602 with a sketch 3604 is shown, and the user highlights the strokes 3608 that should be animated. In FIG. 36*b*, the user can specify the final position 3810 of the strokes. FIGS. 36*c* and 36*d* show a sequence of frames of the resulting stroke animation, as the user moves the animation slider 3612.

B. Animation of a Canvas

Figure 37A:
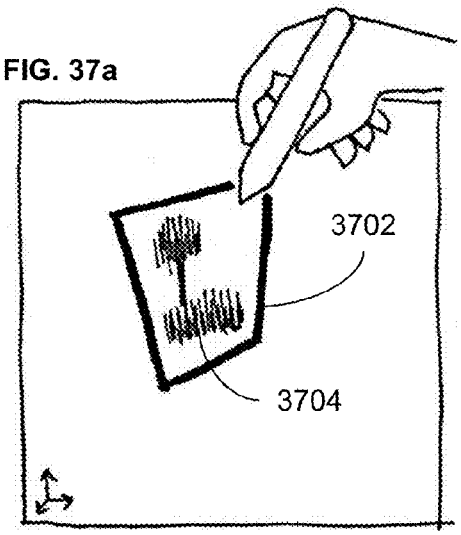
FIGS. 37a-d illustrate animating entire 2D planes, according to some implementations of the current subject matter.
Figure 37B:
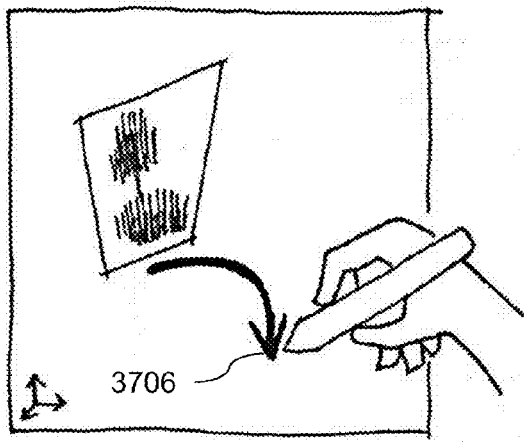
Figure 37C:
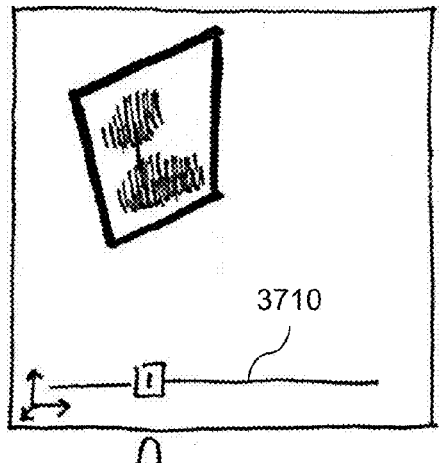
Figure 37D:
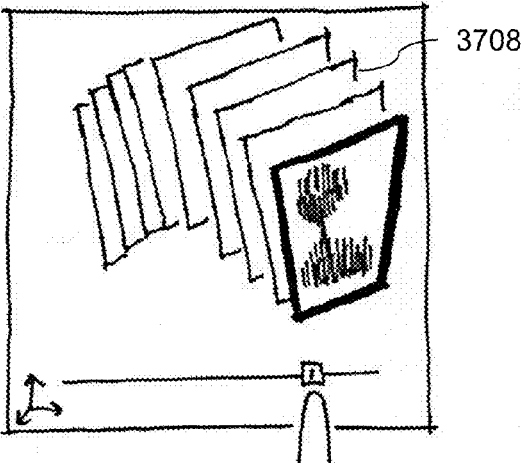

In some implementations, in addition to 2D animation within particular canvases, entire canvases can also be animated. The user can specify the final position, orientation and scale of a canvas (using the transformation tools specified earlier) and the system can interpolate between the initial and final canvas properties. In contrast to the animation in FIGS. 36*a-d*, which can be performed within the local coordinate system of the canvas, this animation is performed in global coordinate space. A global slider is used to view the global animation (this also plays back any planar canvas (i.e., local) animation within the scene). FIGS. 37*a-d* illustrate animating entire canvases. FIG. 37*a* shows a canvas 3702 (containing a sketch 3704) that the user can select for the purposes of animation. In FIG. 37*b*, the user can specify the final 3D position 3706 of the canvas. FIGS. 37*c* and 37*d* show a sequence of frames 3708 of the resulting canvas animation that are displayed as the user moves the animation slider 3710.

C. Animation of Strokes Across Canvases

Figure 38A:
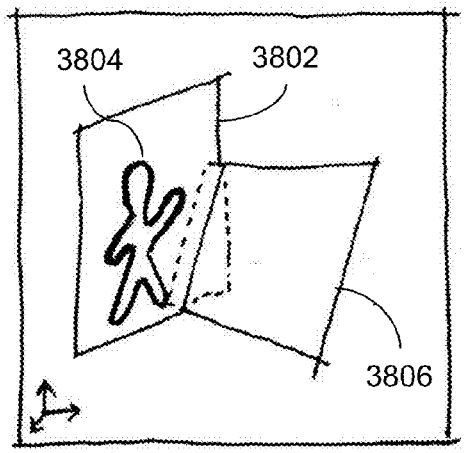
FIGS. 38a-e illustrate a user animating a selection of strokes across two 2D planes, according to some implementations of the current subject matter.
Figure 38B:
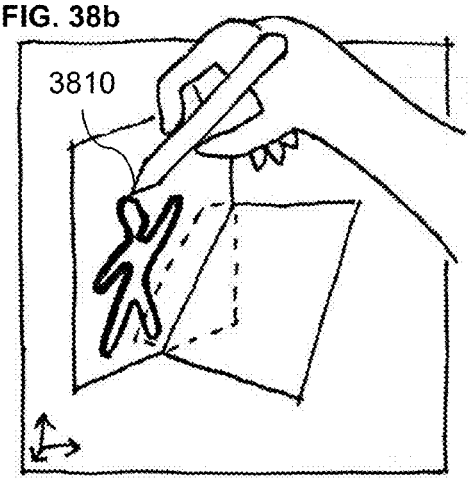
Figure 38C:
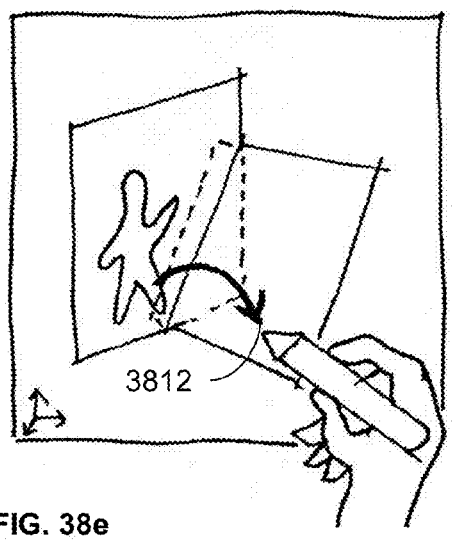
Figure 38D:
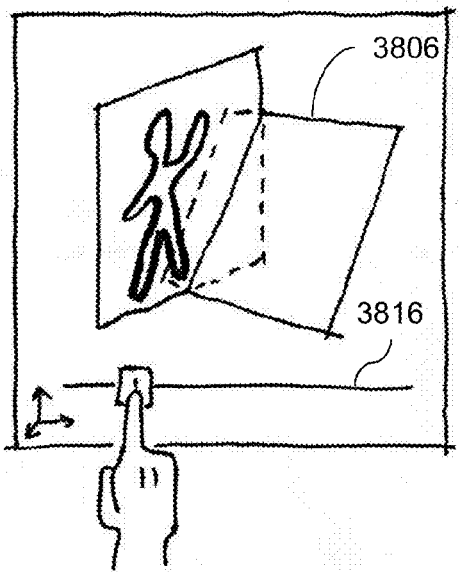
Figure 38E:
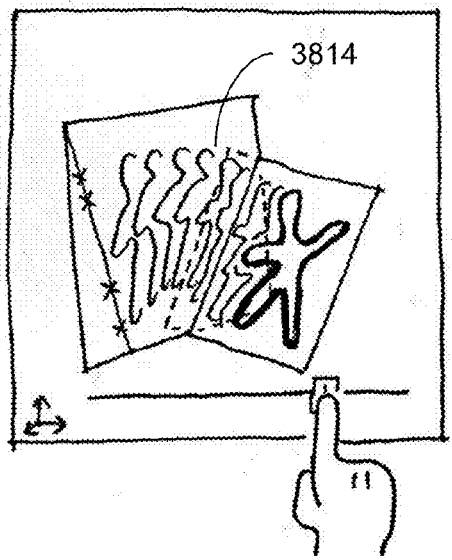

In some implementations, similarly to the animation in FIGS. 37*a-d*, selections of content on a canvas can be animated globally. In other words, the content can move from one canvas onto another canvas over time. The user can specify the content selection, the target canvas, and the location on the target canvas where the content should end up. The system can interpolate between the position and orientation of the content on the original, intermediate, and target canvases. FIGS. 38*a-e* show a user animating a selection of strokes across two canvases. In FIG. 38*a*, a canvas 3802 with a sketch 3804 and another empty canvas 3806 are shown. In FIG. 38*b*, the user can specify the strokes 3810 that should be animated. In FIG. 38*c*, the user can specify that the strokes should move to a location 3812 on the empty canvas 3806. FIGS. 38*d* and 38*e* show a sequence of frames 3814 of the resulting cross-canvas animation, as the user moves the animation slider 3816.

D. Animation of Scene Creation Over Time

In some implementations, scene creation can be animated over time. Content operations (e.g., "create stroke A", "transform canvas B", etc.) can be stored on a stack. The user can use a slider to play through how the scene was created, showing the state of a scene at any particular point in time. Playback can occur by instantaneously displaying higher level operations (e.g. "create stroke A"), alternatively, users can request a more computationally-intensive playback of all lower level operations (e.g. "create vertex X on stroke A").

If a user goes back in time and then performs a new operation, operations that were undone will be erased. However, if a user wishes to create several versions of a design (and store the creation process of each), a user can rewind once the first version is created, specify that the undone operations should be retained, and then begin drawing the second version. The user can then toggle between these different versions, or display more than one version (and all associated content) at a single time.

Figure 39A:
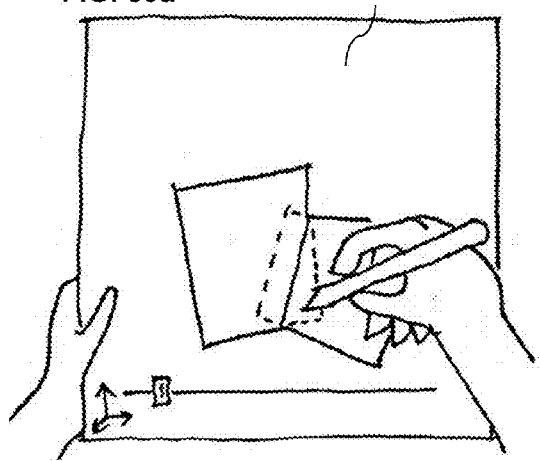
FIGS. 39a-f illustrate the user adding content to the 3D representation of a scene and the user using the scene history slider bar to go back to earlier stages of the scene, according to some implementations of the current subject matter.
Figure 39B:
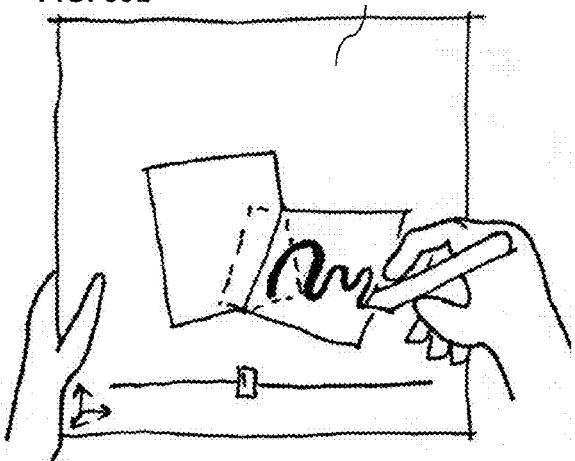
Figure 39C:
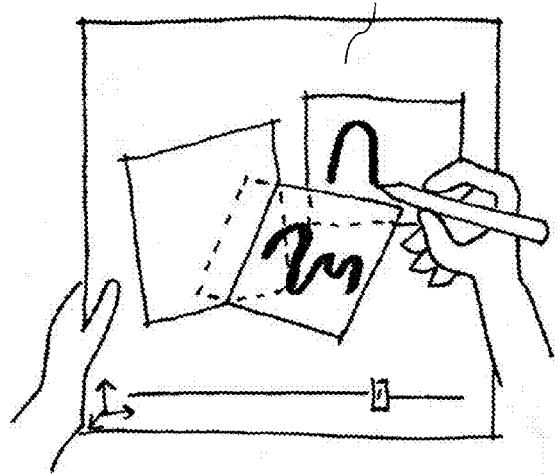
Figure 39D:
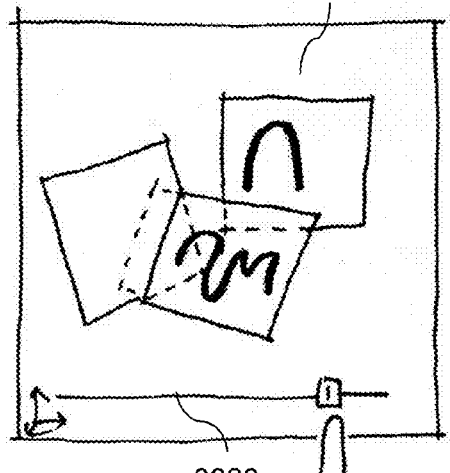
Figure 39E:
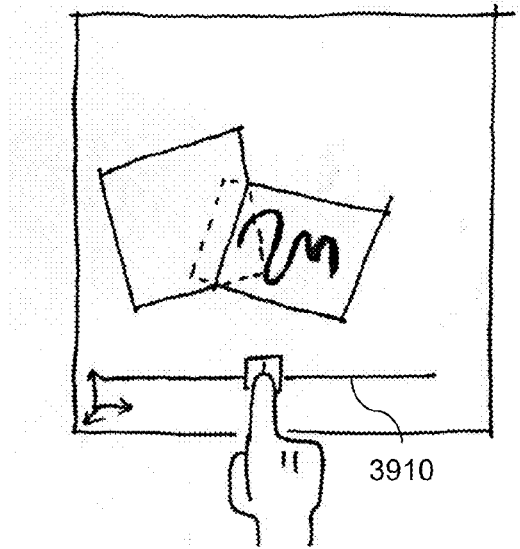
Figure 39F:
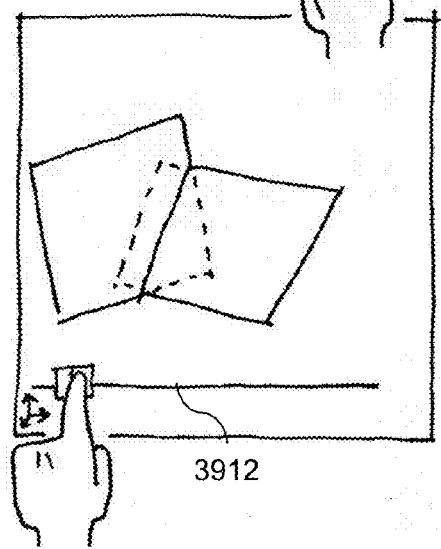

FIGS. 39*a-c* illustrate the user adding content to the 3D representation of a scene. In some implementations, each operation (e.g., adding a sketch, a photograph, etc.) can be added to a history of operations performed on the 3D representation of a scene. The operations proceed from 3902 (user beginning to add content), to 3904 (user adding a sketch), to 3906 (user adding a further sketch). Further, each time something is added to the scene, the slider bar can move indicating passage of time. FIGS. 39*d-f* illustrate the user using the scene history slider bar 3920 to go back to earlier stages of the scene (from stage 3908 corresponding to the operation 3906 in FIG. 39*c* to stage 3910 corresponding to the operation 3906 in FIG. 39*b* and to stage 3910 corresponding to the operation 3902 in FIG. 39*a*).

X. Scene Collaboration

In some implementations, different users can collaborate on a single scene, both in real time and at different instances in time. All content created by a user can be distinguished from content created by another user, through their author tag. A scene can be shown selectively with the content of each author, or both authors, possibly including color coding to indicate which content came from which author. When working in real time, users can work in a split screen view, whereby they can see the viewpoint from which other users are looking at a scene. Animation reflecting scene creation can also take into account multiple authors, as a separate order of operations is created for each author. Users can specify whether their content can be edited by other users, or whether it is read-only.

FIGS. 40a-f illustrate exemplary user scene collaboration, according to some implementations of the current subject matter. FIG. 40a illustrates two users working using the system on separate mobile devices 4002a and 4002b. FIG. 40b shows a split screen view 4004 of the scene being edited. The top view 4006a is a viewpoint of a user using the mobile device 4002a and the bottom view 4006b is a viewpoint of a user using the mobile device 4002b. FIGS. 40b-c illustrate the user of device 4002b beginning to add content to the 3D representation of a scene. The user of the device 4002a can see the location of the drawing tool of the user using the device 4002a on the plane currently being edited. FIGS. 40d-e shows user of the device 4002a beginning to add content to the 3D representation of a scene. Note that user of the device 4002a can now see the location of user of the device 4002a's drawing tool. FIG. 40f shows the scene from a different viewpoint illustrating relative positions of the scene cameras used by both users.

XI. System Output

In some implementations, the current subject matter can generate various output formats. Such formats can include, but are not limited to, a proprietary file format, a standard CAD file format (e.g., Wavefront obj, ply, etc.), and/or any other formats. Canvases, strokes, and/or images can be stored in various ways. In some implementations, an output can include, but is not limited to, a list of vertices and faces for each object, an image file format (in case of a scene that can be exported as a collection of images), a video of a scene animation (where any animations created within the scene can be exported as video files, or saved as a sequence of image frames), a video of a scene fly-through, and/or any other outputs and/or any combination thereof. Users can automatically generate camera motion through a sequence of defined camera views (e.g., saved bookmarks of the scene). Defining a sequence of interesting camera locations in this manner allows a user to very quickly create a fly-through of a design. Fly-throughs and/or animations can be exported as video files or saved as a sequence of image frames. Scenes can be printed onto sheets of paper, in such a way that the scene can be easily reassembled by the user. All canvases (with content) can be printed, and each can have an associated number. All canvas-canvas intersections can be marked in the outputted pages and the number of the intersecting canvas(es) can be printed next to each line. By cutting along the lines and attaching intersecting canvases together, the scene can be recreated. Scenes can be printed using a 3D printer by first converting the CAD output of the model into a complete, hole-free mesh (e.g., polygons that do not include any holes), and then printing the resulting model. For 3D printers that do not support textures, strokes and images on each canvas can be output through embossing and/or engravings on the canvas.

XII. Exemplary Graphics System Implementations

In some implementations, the current subject matter's functionalities described above can be implemented through the use of various graphics hardware and/or software that can be available and/or installed on the user's computing device. The graphics software can include, but is not limited to, software commands and/or operations that can be entered into the user's computing device and that can correspond to certain operations on various parameters, including, but is not limited to, entering, changing, adjusting, varying, etc. As stated above, the various parameters can include, but are not limited to, textures, colors, lines, angles, orientation, GPS positioning coordinates, compass data, speed data, time data, viewing position data, and/or any other parameters and/or a combination of parameters of a particular object and/or objects displayed in an image and/or portion(s) of an image and/or the entire image. The object can be a graphical and/or visual representation of a physical object from the physical environment and/or a virtual object that can be created by the user and/or by a computing device. The operation(s) can be implemented by typing commands in a computer prompt, moving a mouse cursor or otherwise manipulating an image, a portion of an image, or a graphical object displayed on an image, using various methods including, but not limited to, a stylus tool, a joystick, a mouse, a keyboard, etc., using finger(s) (e.g., such as in the case of an iPad®, iPod®, iPhone®, etc. and/or any other touch screen device), and/or using any other methods and/or combination of methods. The view-dependent graphical tools can be displayed on the user's graphical user interface ("GUI") and can be available for selection using any of the above methods.

In some implementations, the current subject matter can be implemented using a model/view/controller ("MVC") application architecture and an object-oriented programming ("OOP") architecture. The current subject matter system can interface with any graphics application programming interface ("API") for rendering 2D and/or 3D graphics (e.g., OpenGL, OpenGL ES, DirectX, etc.). The system can also interface with any graphical user interface ("GUI"), including but not limited to, interfaces that enable callbacks (e.g., iOS, GLUT, etc.), interfaces that use a signal/slot mechanism (e.g., QT), as well as any other interfaces. Further, the current subject matter system can also receive and/or process input from various hardware components and/or devices that can be coupled to the system, including but not limited to, a camera, a GPS device, a compass, a camcorder, and/or any other devices and/or any combinations thereof.

The MVC application architecture can separate representation of information from the user's interaction with it. The model component of the MVC architecture can manage the behavior and data of the application; the controller component can receive input and convert it to commands for the model component or the view component; and the view component can be any output representation of data.

In the OOP architecture, an object-oriented program can be viewed as a collection of interacting objects. An object in the object-oriented programming architecture can be a data structure combined with an associated processing routine(s) (e.g., a file (a collection of data and associated read and write routines) can be an object). An object can be characterized by the following properties: identity (what distinguishes an object from other objects), state (describes the data stored in the object), and behavior (describes the methods in the object's interface by which the object can be used). An object can receive messages, process data, and/or send messages to other objects. An object can be an instance of a class. A class can be a construct that is used to create instances of itself (i.e., class instances, class objects, instance objects, or objects). A class can include structural and behavioral constituents. The structural constituents can include data field descriptions (or properties, fields, data members, or attributes), which can be field types and names that can be associated with state variables at program run time (these state variables either belong to the class or specific instances of the class). The behavioral constituent of a class or its instances can be defined using "methods." Methods can be subroutines with an ability to operate on objects or classes and can alter the state of an object or provide ways of accessing it. Data structures in the object-oriented architecture can carry their own operators around with them or inherit them from a similar object or class. Data can be can be accessed by calling methods that can be bundled with data or inherited from class objects. The methods can be used to retrieve or modify data that they control.

An object-oriented program can include different types of objects, each type corresponding to a particular kind of complex data to be managed or perhaps to a real-world object or concept. A program can include multiple copies of each type of object, one for each of the real-world objects the program is dealing with. An object can provide methods for performing particular operations on its data, while concealing the specifics of how those tasks are accomplished.

Classes can be derived from one or more existing classes, thereby establishing a hierarchical relationship between the derived-from classes ("base classes", "parent classes" or "super-classes") and the derived class ("child class" or "subclass"). Structural and behavioral members of the parent classes can be inherited by the child class. Derived classes can define additional structural members (data fields) and/or behavioral members (methods) in addition to those that they inherit and are therefore specializations of their super-classes.

Figure 41:
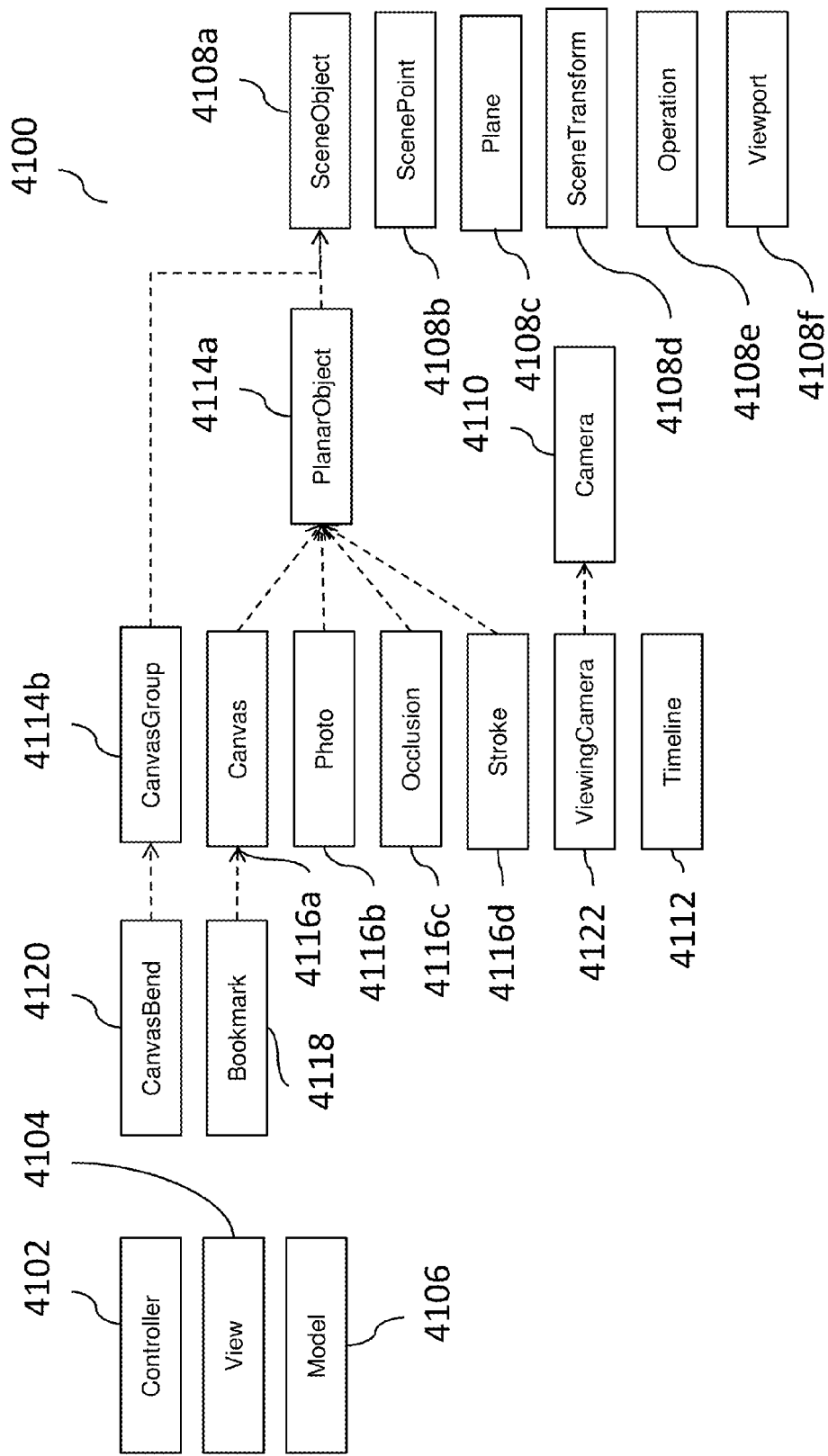
FIG. 41 illustrates an exemplary scene object inheritance architecture, according to some implementations of the current subject matter.

FIG. 41 illustrates an exemplary scene object inheritance architecture 4100, according to some implementations of the current subject matter. The exemplary representation shown in FIG. 41 implements the MVC application architecture that includes a controller component 4102, a view component 4104, and a model component 4106. The architecture 4100 contains a plurality of base objects and a plurality of child or derived objects that inherit the methods and variables of the appropriate base objects. For example, the base objects shown in FIG. 41 include a scene object 4108a, a scene point 4108b, a plane 4108c, a scene transform 4108d, an operation 4108e, and a viewport 4108f, a camera 4110, and a time line 4112. The scene object 4108a can include the following child objects derived from it: a planar object 4114a and a canvas group 4114b. The planar object 4114a can include the following child objects: a canvas 4116a, a photo 4116b, an occlusion 4116c, and a stroke 4116d. The canvas 4116a can include a bookmark 4118 as its child object and the canvas group 4114b can include a canvas bend 4120 as its child object. The camera 4110 can include viewing camera 4122 as its child object. The current subject matter is not limited to the base and/or derived objects and/or the relationships between the base and derived objects shown in FIG. 41 and can include other base objects, derived objects, and/or relationships. These objects correspond to various structural and/or functional implementations shown and discussed above in connection with FIGS. 1a-40f.

Figure 42A:
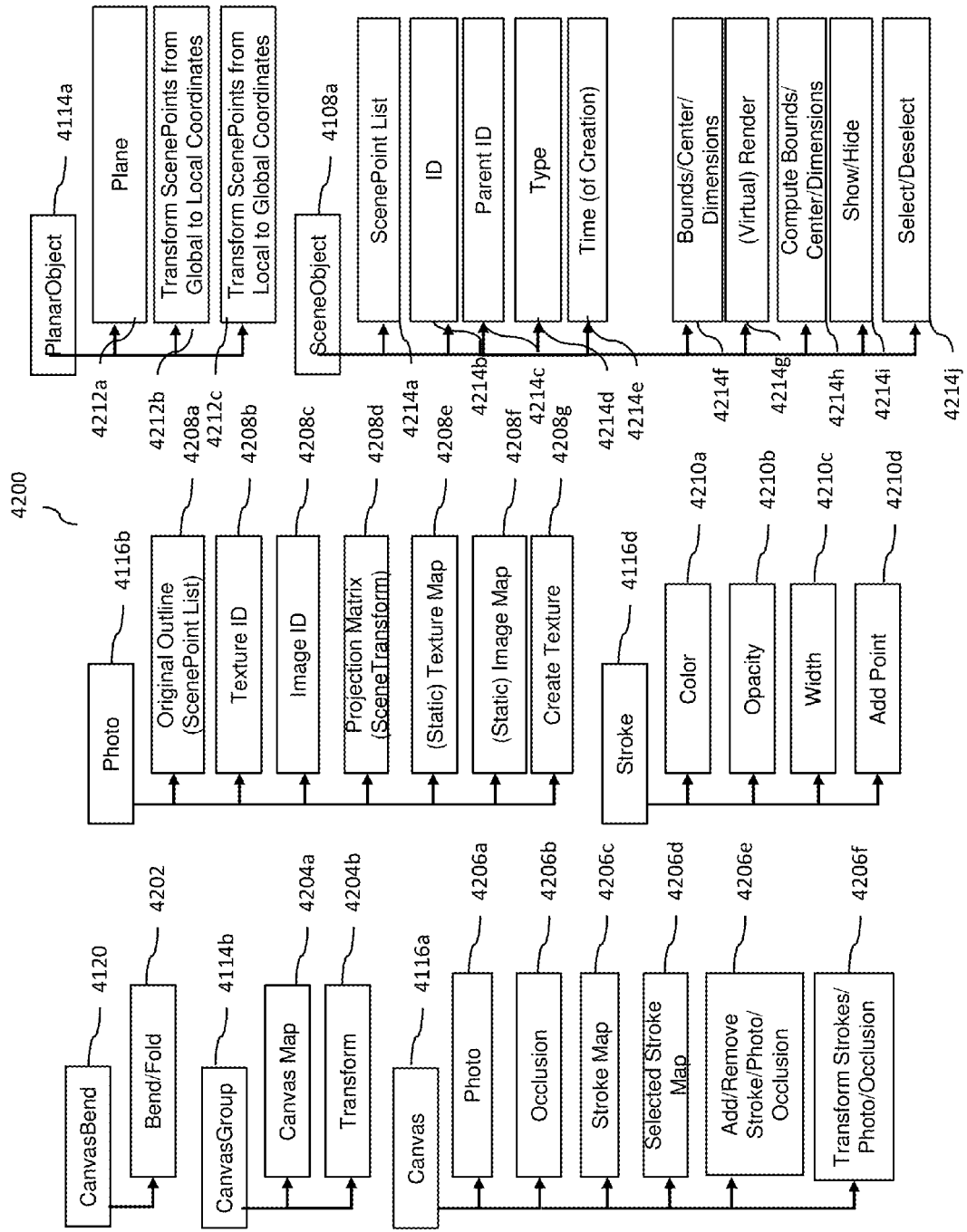
FIGS. 42a-b illustrate exemplary scene object/class structures that can be used in connection with the current subject matter system, according to some implementations of the current subject matter.
Figure 42B:
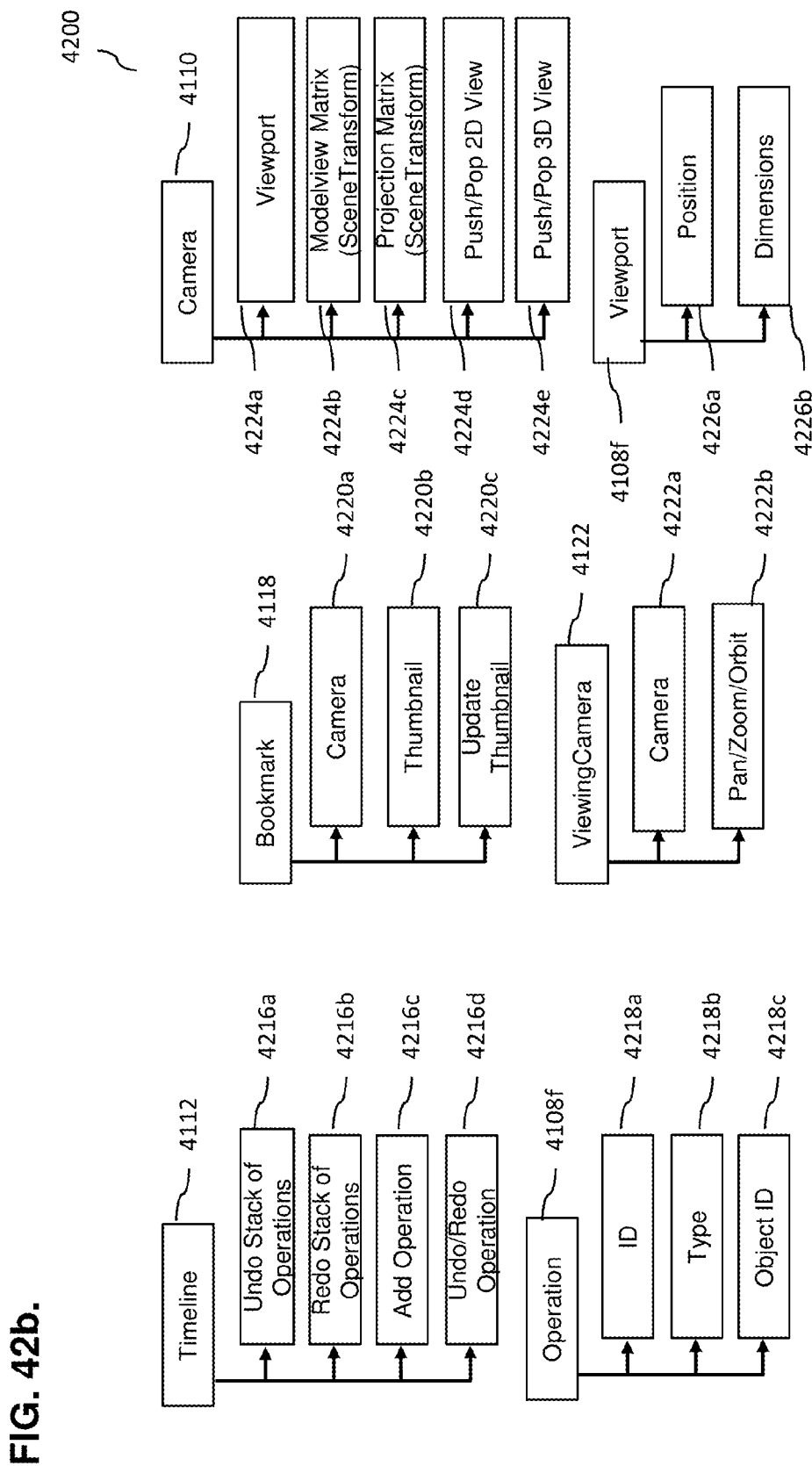

FIGS. 42a-b illustrate exemplary scene object/class structures 4200 that can be used in connection with the current subject matter system, according to some implementations of the current subject matter. As shown in FIG. 42a, the structures 4200 illustrates some of the scene objects illustrated in FIG. 41 (i.e., canvas bend 4120, canvas group 4114b, canvas 4116a, photo 4116b, stroke 4116d, planar object 4114a, and scene object 4108a), where each scene object is characterized by a particular set of class variables and methods. In particular, the canvas bend object 4120 can include a bend/fold method 4202.

The canvas group object 4114b can include an object canvas map 4204a and a transform method 4204b.

The canvas object 4116a can include the following objects: photo 4206a, occlusion 4206b, stroke map 4206c, selected stroke map 4206d and the following corresponding methods: add/remove stroke/photo/occlusion 4206e and transform stroke/photo/occlusion 4206f.

The photo object 4116b can include the following objects: original outline 4208a, texture identification 4208b (i.e., an identifier of a texture that should be mapped onto a planar polygon of the rendered photograph), image identification 4208c (i.e., an identifier of an image), a projection matrix 4208d (i.e., a projection matrix can be used to perform a 3D projection mapping of 3D points to a 2D plane and further can allow for perspective correct textures (such as textures that may appear smaller to the viewer in the distance as compared to textures that may be closer to the viewer), as opposed to just linearly interpolated textures, which may contain discontinuities across faces of the polygon), static texture map 4208e (which can contain all textures used by all photo objects in the system), static image map 4208f (which can contain all images used in all photo objects in the system, whereby the image map and the texture map allow reuse of images/textures, without the need to recreate them when two or more photo objects use the same image/texture), and a following method: create texture 4208g.

The stroke object 4116d can include the following objects: color 4210a, opacity 4210b, width 4210c, and the following method: add a point 4210d.

The planar object 4114a can include the following object: a plane 4212a and the following methods: transform scene points from global to local coordinates 4212b and transform scene points from local to global coordinates 4212c.

The scene object 4108a can include the following objects: scene point list 4214a, identification ("ID") 4214b, parent ID 4214c, type 4214d, time of creation 4214e, bounds/center/dimensions 4214f and the following methods: virtual rendering 4214g, computing of bounds/center/dimensions 4214h, show/hide 4214i, and select/deselect 4214j. The scene point list can be a list of vertices corresponding to the scene object. In the case of a stroke, it can be a list of interconnected points constituting the stroke. In the case of a canvas and photo, it can include points corresponding to an outline of the canvas. For an input 3D model, the list can include a list of vertices of a mesh/point cloud. The ID 4214b can correspond to a unique identification for an object, so that relevant objects can be easily identified and retrieved within methods of the system. The parent ID 4214c can identify the parent of the object. For example, the parent ID of a stroke is the unique identifier of the canvas on which it lies.

FIG. 42b illustrates further structures 4200 of objects shown in FIG. 41. As shown, the timeline object 4112 can include the following objects: undo stack of operations 4216a, redo stack of operations 4216b and the following corresponding methods: add operation 4216c, undo/redo operation 4216d. In some implementations, an operation can correspond to an operation that was at one point performed by the user, e.g., "draw stroke A" or "transform canvas B from position/orientation C to position/orientation D." The undo stack of operations 4216a can contain all past operations that were performed by the user in order (i.e., bottom of the stack can include the very first operation; top of the stack can include the most recent one). Each time a user performs an operation, the "add operation" method 4216c can be used to push the operation onto the stack. The redo stack of operations 4216b can contain all operations that the user has undone at a particular time (i.e., bottom of the stack can include the first undone operation; top of the stack can include the most recent undone operation). When a user requests an undo, the operation at the top of the undo stack (i.e., the most recently performed operation) can be removed and can be pushed onto the top of the redo stack. When a user requests a redo, the operation at the top of the redo stack (i.e., the most recently undone operation) can be removed and can be pushed back to the top of the undo stack. If the user undoes one or more times, and then performs new operation (e.g. draws a new stroke), the redo stack is normally emptied, thereby erasing the undone operations. To retain several versions of a design, the redo stack can instead be stored in a separate stack, for future access.

The object operation 4108f can include the following objects: an identification 4218a, a type 4218b, and an object identification 4218c. The ID 4218a can be a unique identifier for the operation. The type 4218b can correspond to the type of operation that the user performed (e.g., draw a stroke, add a photo, transform a canvas, etc.). The object ID 4218c can be a unique identifier of the object that was affected by the user-performed operation (e.g., stroke A, photo B, canvas C, etc.). The operation class can be extended into derived classes that can contain more information pertaining to a particular operation, as necessary. For example, a TransformOperation object, storing information about a user-performed transformation of a scene object, can contain the before-and-after SceneTransform of the object that was transformed. A BendOperation object, storing information about a user-performed bending of a canvas, can contain an angle of the bend. In some implementations, these objects do not need to contain any methods, with the exception of the model's "undo operation" and "redo operation" methods that can parse the information stored in the operation to be undone/redone and can call a sequence of one or more relevant methods to undo/redo this operation.

The bookmark object 4118 can include camera 4220a and thumbnail 4220b as objects and update thumbnail 4220c as a corresponding method. The camera 4220a can be an instance of the camera object 4110 and can contain information about the scene camera that the user was looking through when the bookmark was created.

The viewing camera 4122 can include a camera object 4222a and a pan/zoom/orbit method 4222b. The viewing camera can also be an instance of the camera object 4110.

The camera object 4110 can include the following objects: a viewport 4224a, a model view matrix 4224b, a projection matrix 4224c and the following corresponding methods: push/pop 2D view 4224d and push/pop 3D view 4224e. The viewport 4224a can hold information about dimensions and position on the device screen of the GUI window in which the scene is rendered. In some implementations, there can be a single or multiple viewports. In a split-screen mode, for example, there can be one viewport corresponding to each rendered view of the scene. The model view and projection matrices 4224b and 4224c can contain transformations necessary to convert between world coordinates and screen coordinates to render and view a virtual scene. To render 3D objects in the scene or perform operations such as projecting an object from screen space to world coordinates, the push/pop 3D methods 4224e can be used. The methods can load/unload the model view and projection matrices 4224b and 4224c, so that 3D objects can be correctly displayed using functions of the rendering API (e.g., OpenGL). Similarly, for 2D (screen space) objects, the push/pop 2D methods 4224d can be used.

The viewport object 4108f can include a position object 4226a and a dimensions object 4226b, as discussed above. The methods can allow a user, using the user's computing system, to perform indicated functionalities on various objects within the group (e.g., perform a canvas bend or fold) as discussed above in connection with FIGS. 1a-40f.

Figure 43:
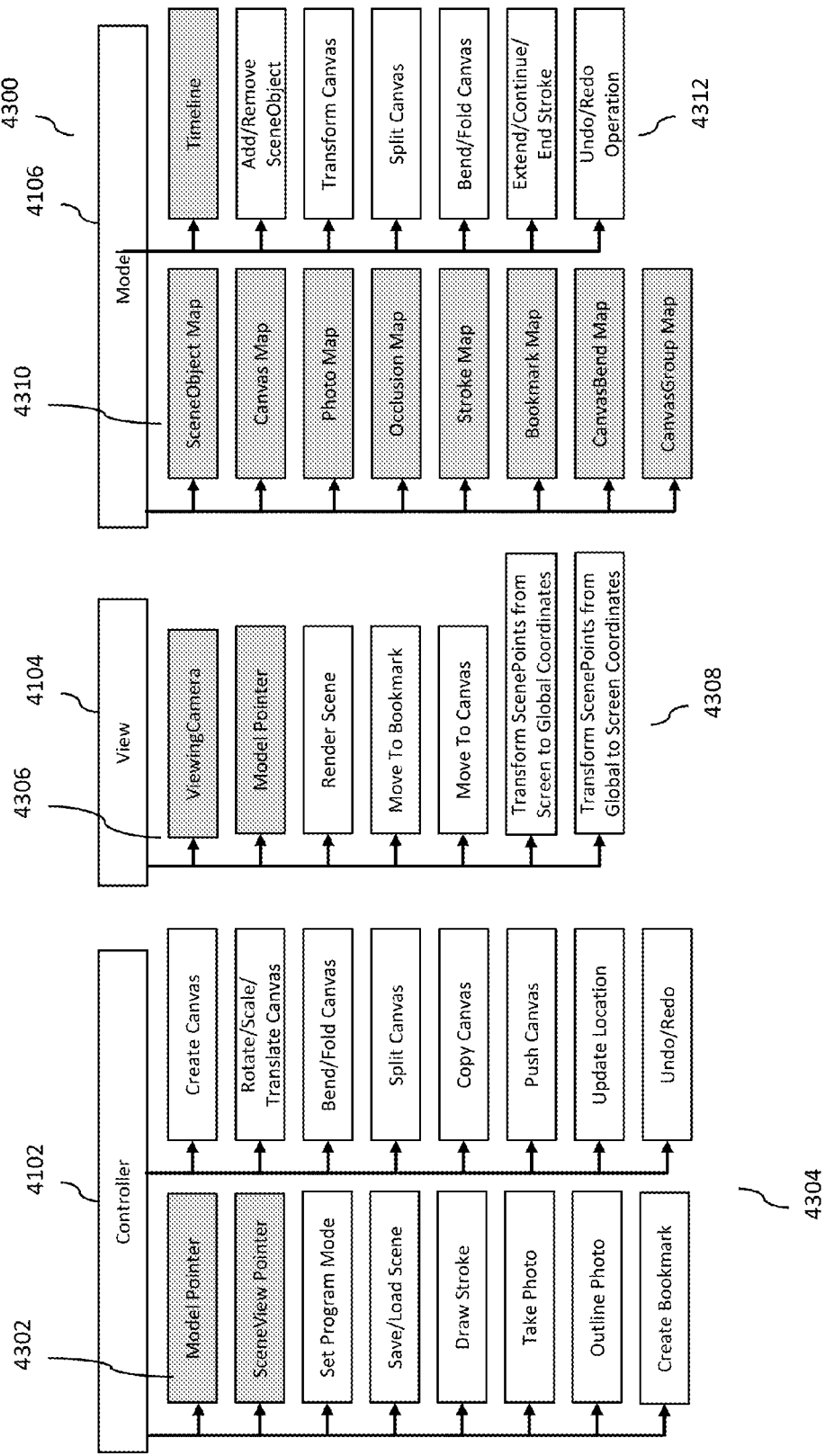
FIG. 43 illustrates an exemplary structure for a model/view/controller application architecture, according to some implementations of the current subject matter.

FIG. 43 illustrates an exemplary structure 4300 for the MVC application architecture, according to some implementations of the current subject matter. The controller object 4102 can include a model pointer and a scene view pointer objects 4302 (shown shaded). It can also include the following exemplary methods 4304: set program mode, save/load scene, draw stroke, take photo, outline photo, create bookmark, create canvas, rotate/scale/translate canvas, bend/fold canvas, split canvas, copy canvas, push canvas, update location, and undo/redo. In some implementations, each of these methods can correspond to an operation the user can perform in the system. For example, a "draw stroke" operation (as shown and discussed below in connection with FIG. 44) can respond to a user's input/gestures to create and/or insert a new stroke into the scene. In each case, the controller 4102 can first process the input information from the user (e.g., the screen coordinate of the input device used by the user), then call one more methods of the model to perform a set of relevant operations (e.g., "rotate canvas" which can call the model's "transform canvas" method with a transformation generated based on the user input). In some implementations, user input can be supplemented by accessing additional information from the user's computing device on which the system is running and/or one or more additional devices. For example, the "take photo" method can interface with a camera that can be coupled to the user's computing device, causing it to capture a photograph and convert it to a digital image. This image can then be passed on by the controller 4102 to the model as input to a new photo object, which can use the image for generating the photograph's texture. Finally, once the model has performed the operations and successfully updated the relevant scene objects, the controller 4102 can call the view's "render scene" method, causing the graphics renderer of the user's computing device to re-render the scene, thus allowing the user to see the result of the user's input gestures. In some implementations, a sequence of frames can be rendered in succession, if, for example, the user wishes to animate the scene camera from its current location to the location of a previously defined bookmark.

The view object 4104 can include view camera and model pointer objects 4306 (shown shaded). It can also include the following exemplary methods 4308 (shown as not shaded): render scene, move to bookmark, move to canvas, transform scene points from screen to global coordinates, and transform scene points from global to screen coordinates. The "render scene" method can render all of the objects contained in the model, taking into account any visibility toggles, program states, etc. The "move to canvas" and "move to bookmark" methods can cause the scene camera parameters to change, either by acquiring the information stores in the specified bookmark's camera object, or by computing the transform necessary to align the camera to face the specified canvas.

The model object 4106 can include the following objects 4310 (shown shaded): scene object map, canvas map, photo map, occlusion map, stroke map, bookmark map, canvas bend map, canvas group map, and timeline. It can also include the following methods 4312 (shown as not shaded): add/remove scene object, transform canvas, split canvas, bend/ fold canvas, start/continue/end stroke, and undo/redo operation. Each of the map objects can contain all scene objects within the scene of that particular type (e.g., the stroke map can contain all the strokes within the scene, etc.). This object "classification" can allow operations performed on specific object types to be performed more efficiently and avoid having to look through the full list of scene objects. The "add/remove scene object" methods can process addition and/or removal of a scene object. For example, when a new stroke is added, the stroke can be added to the stroke map and scene object map, its parent ID can be set to the currently selected canvas, and it can be added to the canvas's own stroke map (which can contain all the strokes projections onto that specific canvas). The "transform canvas" method can transform a canvas, changing its position, orientation and/or scale. All of the content on the canvas can also be transformed. The "split canvas" method can allow a canvas and its content to be divided into two or more canvases, along a specified dividing partition. The "bend/fold canvas" method can convert a planar canvas and its content into a bended/folded canvas group (with all the canvas content similarly transformed). In some implementations, these methods can perform a sequence of splits and transforms to the canvas, converting it into two or more canvases that are oriented in a specific way in reference to each other. The "extend/continue/end stroke" method can correspond to the methods shown in FIG. 44 and can be called while a user is inputting (or drawing) a stroke, as discussed below.

Figure 44:
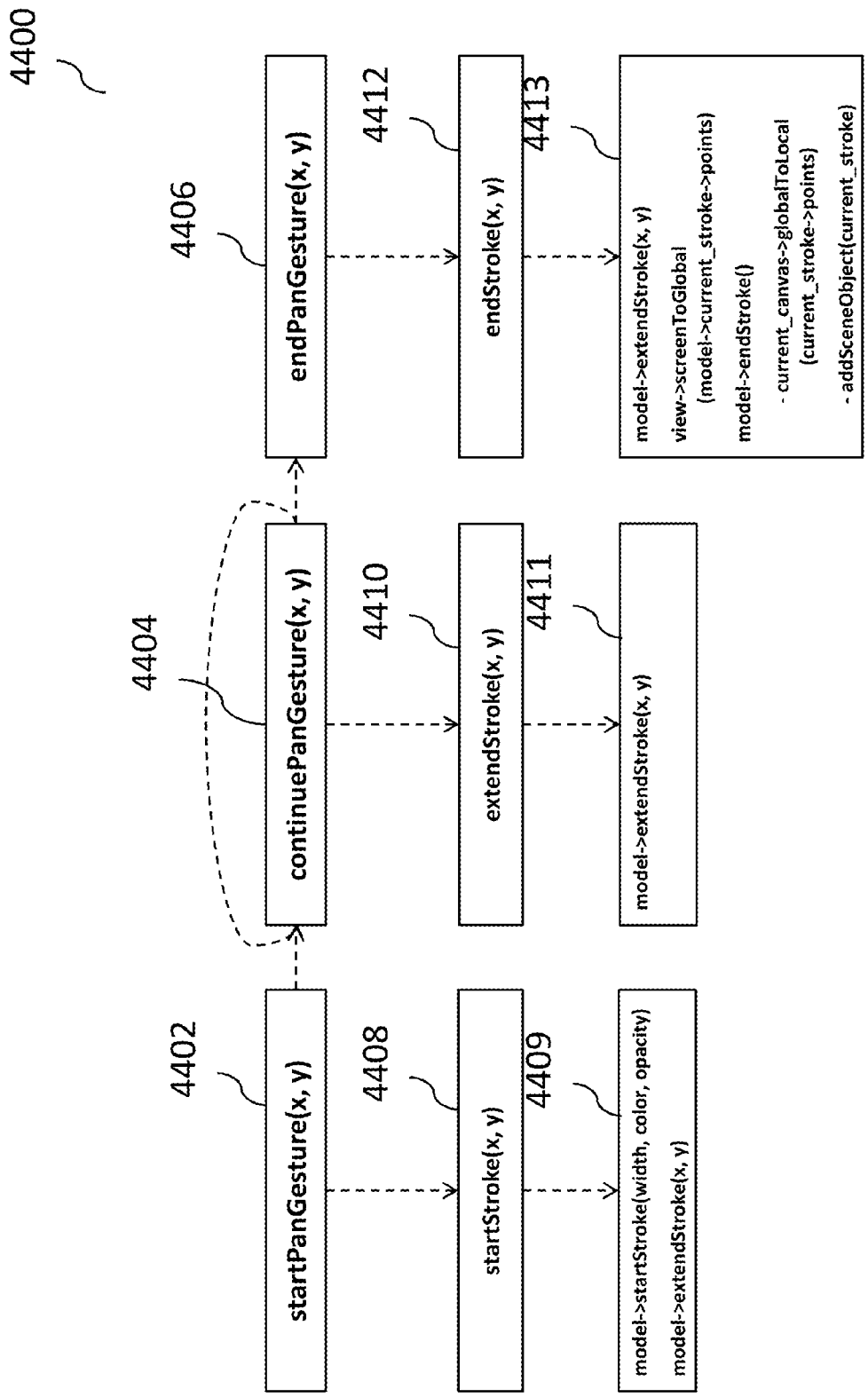
FIG. 44 illustrates an exemplary method for drawing a stroke, according to some implementations of the current subject matter.

FIG. 44 illustrates an exemplary method 4400 for drawing a stroke, according to some implementations of the current subject matter. FIG. 44 illustrates interfacing with a typical GUI callback structure. The structure can include one of the three callback methods: startPanGesture, continuePanGesture, and endPanGesture. These methods can be called whenever a panning operation is performed by the user on the user's computing device. Each of these callback methods can execute a corresponding stroke operation method. Other methods can employ similar or other methodologies that can use video feed from a camera, GPS location, compass orientation, and/or any other information and/or any combination thereof. The method 4400 can begin by calling a startPanGesture (x, y) method, at 4402. At 4408, as a result of calling the startPanGesture method, a startStroke method can be performed, which can call the model's startStroke method 4409. During this method, a new stroke can be initialized, color and opacity of new stroke can be determined. Finally, the model's extendStroke method can be called, adding an initial 2D screen point (x, y) to the stroke.

After the startPanGesture method 4402 is called, the continuePanGesture (x, y) method 4404 can be called. This method can be called repeatedly. During this method, extendStroke method 4410 can be performed, which in turn calls the model's extendStroke method 4411, and can allow for adding 2D screen point (x, y) to a list of points in the new stroke. Each time extendStroke is called, it can pass the user's screen coordinate input to the system. This screen coordinate can be passed onto the newly created stroke (which can be created by startStroke), which can append it to the end of its ScenePoint list.

To end drawing of a stroke, an endPanGesture (x, y) method 4406 can be called. During this method, an endStroke method 4412 can be performed. This method can first add the last point (x, y) to the newly created stroke, through one last call to the model's extendStroke method 4413. Then, all the stroke points in its ScenePoint list can be projected onto the currently selected canvas, using first the screenToGlobal function of the view ("Transform ScenePoints from Screen to Global Coordinates" 4308, as shown in FIG. 43), and subsequently the globalToLocal PlanarObject function of the currently selected canvas ("Transform ScenePoints from Global to Local Coordinates" 4212b, as shown in FIG. 42a, can be called from within the model's endStroke method 4413). Finally, if the stroke is successfully projected onto the canvas, the addSceneObject method can be called from within the model's endStroke method 4413, adding the new stroke to current canvas's stroke map, setting the stroke's parent ID to the ID of the current canvas, and adding the stroke to the model's stroke map and scene object map.

Figure 45:
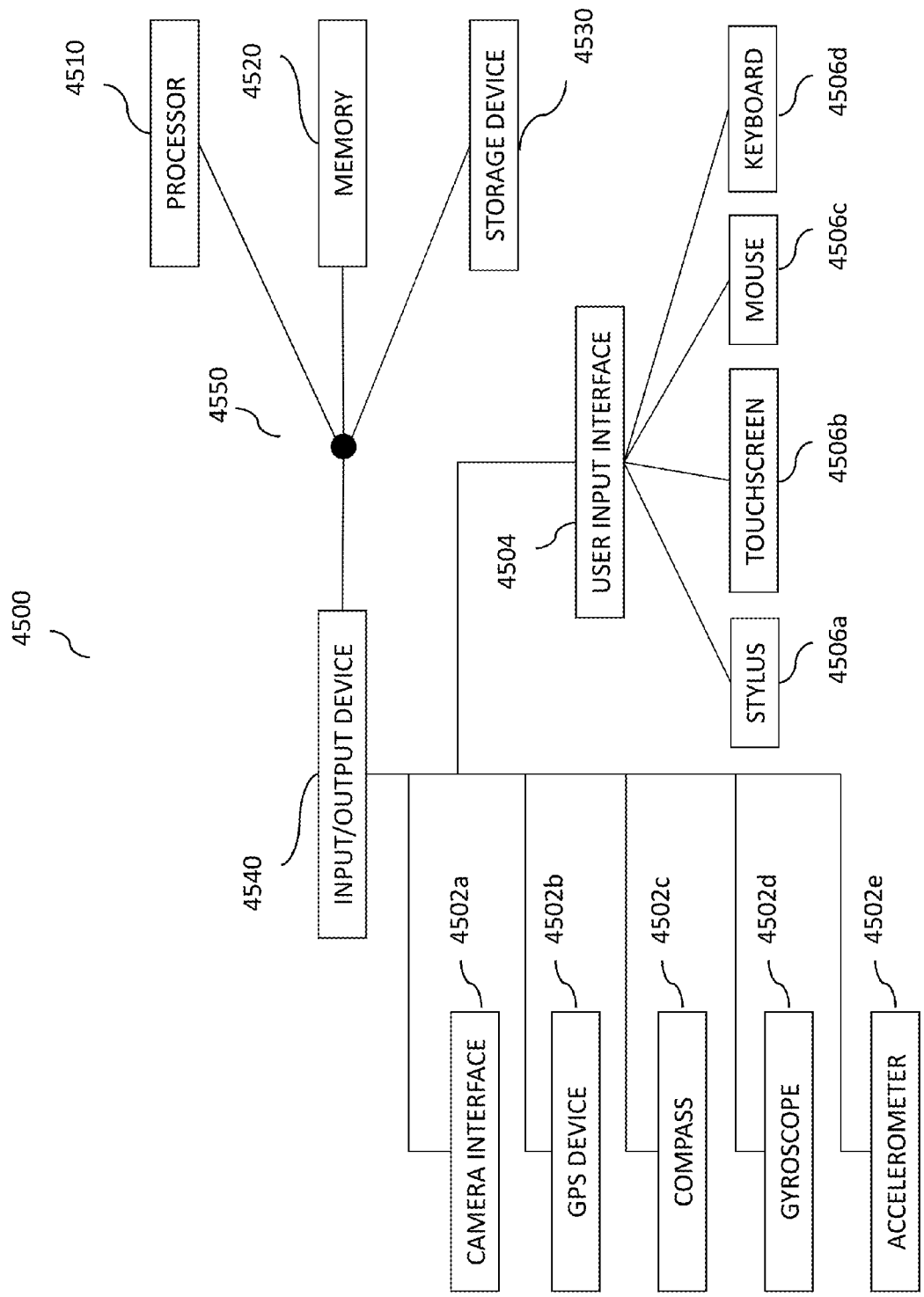
FIG. 45 illustrates an exemplary system, according to some implementations of the current subject matter.

In some implementations, the current subject matter can be configured to be implemented in a system 4500, as shown in FIG. 45. The system 4500 can include a processor 4510, a memory 4520, a storage device 4530, and an input/output device 4540. Each of the components 4510, 4520, 4530 and 4540 can be interconnected using a system bus 4550. The processor 4510 can be configured to process instructions for execution within the system 4500. In some implementations, the processor 4510 can be a single-threaded processor. In alternate implementations, the processor 4510 can be a multi-threaded processor. The processor 4510 can be further configured to process instructions stored in the memory 4520 or on the storage device 4530, including receiving or sending information through the input/output device 4540. The memory 4520 can store information within the system 4500. In some implementations, the memory 4520 can be a computer-readable medium. In alternate implementations, the memory 4520 can be a volatile memory unit. In yet some implementations, the memory 4520 can be a non-volatile memory unit. The storage device 4530 can be capable of providing mass storage for the system 4500. In some implementations, the storage device 4530 can be a computer-readable medium. In alternate implementations, the storage device 4530 can be a floppy disk device, a hard disk device, an optical disk device, a tape device, non-volatile solid state memory, or any other type of storage device. The input/output device 4540 can be configured to provide input/output operations for the system 4500. In some implementations, the input/output device 4540 can include, but is not limited to, a camera interface 4502a, a GPS device 4502b, a compass 4502c, a gyroscope 4502d, an accelerometer 4502e, and/or any other device and/or any combination thereof. The input/output device 4540 can also include a user input interface 4504. The user input interface 4504 can include, but is not limited to, a stylus tool 4506a, a touch screen 4506b, a mouse 4506c, a keyboard 4506d, and/or any other device and/or any combination thereof. In alternate implementations, the input/output device 4540 can include a display unit for displaying graphical user interfaces. The system can also contain a graphical processing unit.

Figure 46:
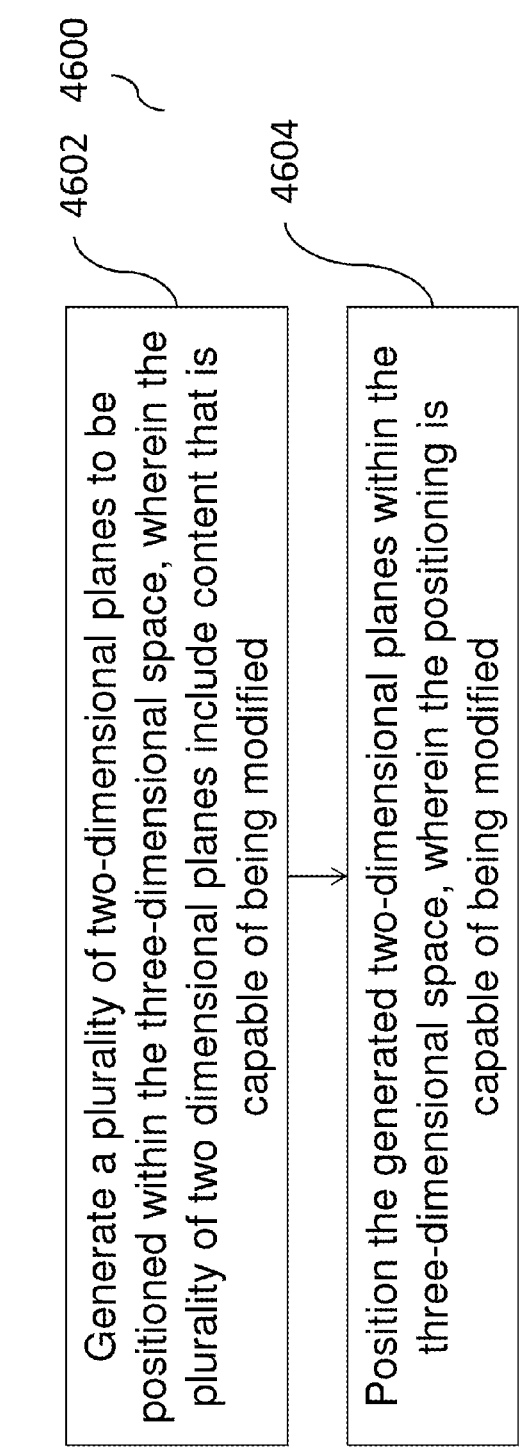
FIG. 46 illustrates an exemplary method, according to some implementations of the current subject matter.

FIG. 46 illustrates an exemplary computer-implemented method 4600 for generating a three-dimensional representation of a scene within a three-dimensional space, according to some implementations of the current subject matter. At 4602, a plurality of two-dimensional planes to be positioned within the three-dimensional space can be generated. The plurality of two dimensional planes can include content that is capable of being modified. At 4604, the generated two-dimensional planes can be positioned within the three-dimensional space. The positioning is capable of being modified. At least one of the generating and the positioning can be performed by at least one processor.

In some implementations, the current subject matter can include one or more of the following optional features. The content can include at least one of the following: an object, a texture, a color, a photograph, a photograph dependent on a predetermined angle of view of the two-dimensional plane, a portion of a photograph, a drawing, a sketch, a stroke, a stroke dependent on a predetermined angle of view of the two-dimensional plane, an occlusion, an annotation, an animation, and/or a video. The content can be a user-defined content. A portion of the content can be arranged on at least one two-dimensional plane according to a referential model.

In some implementations, the representation of the three-dimensional scene can be viewed from a least one angle of view located within the representation of the three-dimensional scene.

In some implementations, at least one two-dimensional plane in the plurality of planes can intersect at least another two-dimensional plane in the plurality of planes. Further, the representation of the three-dimensional scene can include a plurality of layers. Each layer in the plurality of layers can include at least one two-dimensional plane in the plurality of two-dimensional planes and at least a portion of the content. Also, the representation of the three-dimensional scene can include at least one view-dependent layer that is viewable only from a predetermined angle of view within the representation of the three-dimensional scene. At least one view-dependent layer can include at least one two-dimensional plane in the plurality of two-dimensional planes and at least a portion of the content. Further, at least one two-dimensional plane in the plurality of two-dimensional planes can include at least one layer that can have at least a portion of the content.

In some implementations, the method can include generating a plurality of angles of view for viewing the three-dimensional representation of the scene, selecting an angle of view from the plurality of angles of view for viewing the three-dimensional representation of the scene, and changing from at least one selected angle of view in the plurality of angles of view to at least another angle of view in the plurality of angles of view to view the three-dimensional representation of the scene. The method can also include selecting a predetermined angle of view from the plurality of angles of view for viewing the three-dimensional representation of the scene, wherein the three-dimensional representation of the scene is not viewable from at least another angle of view of the plurality of angles of view. In some implementations, modification of the content can include selecting at least one of the content and at least one two-dimensional plane in the plurality of two-dimensional planes based on a predetermined angle of view and modifying the selected content and the at least one two-dimensional plane based on the predetermined angle of view. Modification of the positioning of the plurality of two-dimensional planes can also include grouping at least two two-dimensional planes in the plurality of two-dimensional planes based on a predetermined arrangement for positioning in the three-dimensional space. The predetermined arrangement can include at least one of the following: parallel stacks grouping, axial cross-section grouping, a circumferential ring, and a random grouping. Further, modification of the positioning of the plurality of two-dimensional planes can include positioning at least one two-dimensional plane in the plurality of two-dimensional planes based on at least one of the following: at least one geographical coordinate of the content contained on the at least one two-dimensional plane, and a global positioning coordinate of the content contained on the at least one two-dimensional plane. In some implementations, modification of the positioning of the plurality of two-dimensional planes can include positioning at least two two-dimensional planes in the plurality of two-dimensional planes based on at least one of the following: at least one geographical coordinate of the content contained on at least one of the two two-dimensional planes, and a global positioning coordinate of the content of at least one of the two two-dimensional planes. Also, modification of the positioning of the plurality of two-dimensional planes can include positioning at least one two-dimensional plane in the plurality of two-dimensional planes based on a predetermined three-dimensional model.

In some implementations, the method can include generating additional content, wherein the additional content is configured to be placed on at least one generated two-dimensional plane in the plurality of two-dimensional planes an placing the additional content on at least one generated two-dimensional plane, wherein the additional content is capable of being modified.

In some implementations, a portion of the content contained on at least one two-dimensional plane in the plurality of two-dimensional planes can be merged with a portion of the content contained on at least another two-dimensional plane in the plurality of two-dimensional planes.

In some implementations, the method can include generating another two-dimensional plane, selecting a portion of the content contained on at least one two-dimensional plane in the plurality of two-dimensional planes, and placing the selected portion of the content on the another two-dimensional plane.

In some implementations, at least one attribute for a portion of the content can be defined and the portion of the content can be modified based on the at least one attribute. At least one attribute can include at least one of the following: a thickness, a length, a width, a height, a brightness, an opacity, at least one geographical coordinate, a time, a moving velocity, a gyroscopical positioning parameter, and/or a combination thereof. Modification of the content can also include removing content from the at least one two-dimensional plane.

In some implementations, a portion of the content contained on the at least one two-dimensional plane can be transferred to another two-dimensional plane in the plurality of two-dimensional planes. Transferring can include at least one of the following: duplicating a portion of content from a first two dimensional plane to a second two-dimensional plane in the plurality of two-dimensional planes, pushing a portion of the content from a view-dependent two-dimensional plane onto another two-dimensional plane in the plurality of two-dimensional planes, and splitting a portion of the content contained on a two-dimensional plane into a first split portion and a second split portion and placing the first split portion onto a first two-dimensional plane and the second split portion onto a second two-dimensional plane in the plurality of two-dimensional planes.

In some implementations, a portion of the content contained on a first two-dimensional plane in the plurality of two-dimensional planes can be projected onto a second two-dimensional plane in the plurality of two-dimensional planes based on at least one angle of view located within the representation of the three-dimensional scene. The content can be modified by copying a portion of the content contained on a first two-dimensional plane in the plurality of two-dimensional planes and placing the copied portion onto a second two-dimensional plane in the plurality of two-dimensional planes. A portion of the content contained on at least one of two-dimensional plane can also be concealed.

In some implementations, the content contained on at least one two-dimensional plane can be split into at least two portions for placement on at least two other two-dimensional planes in the plurality of two-dimensional planes, wherein at least one of a position and an orientation of the at least one two-dimensional plane is different from respective positions and orientations of the at least two other two-dimensional planes.

In some implementations, a portion of the content can be transformed within at least one two-dimensional plane in the plurality of two-dimensional planes. The transformation can include at least one of the following: freeform distortion, translation, shifting, rotation, scaling, stretching and/or combination thereof.

In some implementations, a folding region in at least one two-dimensional plane in the plurality of two-dimensional planes can be defined and, using the defined folding region, the at least one two-dimensional plane can be folded into at least two portions representative of the two-dimensional plane separated by the folding region.

In some implementations, a bending region in at least one two-dimensional plane in the plurality of two-dimensional planes can be defined and, using the defined bending region, the at least one two-dimensional plane can be bent to generate an axial curvature to the at least one two-dimensional plane.

In some implementations, at least one of a position and an orientation of at least one two-dimensional plane can be modified.

In some implementations, modification of the positioning of the plurality of two-dimensional planes can include inserting a three-dimensional surface into the three-dimensional space, visualizing the three-dimensional surface, and positioning at least one two-dimensional plane in relation to the inserted three-dimensional surface. Visualizing can be performed using at least one of the following: a point cloud and a polygonal mesh.

In some implementations, two-dimensional planes can be positioned according to at least one first position within the three-dimensional space. Then, the modification of the positioning of the generated two-dimensional planes can include selecting at least one two-dimensional plane to be re-positioned to at least one second position within the three-dimensional space, and re-positioning the selected two-dimensional plane within the three-dimensional space according to the at least one second position.

In some implementations, a portion of the content contained on at least one two-dimensional plane in the plurality of two-dimensional planes can be animated. The animation can be performed based on time.

In some implementations, a plurality of users can perform at least one generating, the positioning, the modification of the content, and the modification of the positioning of the plurality of two-dimensional planes.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also refer to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method for generating a three-dimensional representation of a scene within a three-dimensional space, the method comprising:
    generating a plurality of two-dimensional planes to be positioned within the three-dimensional space, wherein the plurality of two dimensional planes include content that is capable of being modified; and
    positioning the generated two-dimensional planes within the three-dimensional space, wherein the positioning is capable of being modified;
    wherein the representation of the three-dimensional scene is configured to be viewed from at least one angle of view located within the representation of the three-dimensional scene;
    wherein at least one of the generating and the positioning is performed by at least one processor.

2. The method according to claim 1, wherein the content includes at least one of the following: an object, a texture, a color, a photograph, a photograph dependent on a predetermined angle of view of the two-dimensional plane, a portion of a photograph, a drawing, a sketch, a stroke, a stroke dependent on a predetermined angle of view of the two-dimensional plane, an occlusion, an annotation, an animation, and a video.

3. The method according to claim 1, wherein the content is a user-defined content.

4. The method according to claim 1, wherein at least a portion of the content is configured to be arranged on at least one two-dimensional plane according to a referential model.

5. The method according to claim 1, wherein at least one two-dimensional plane in the plurality of planes is configured to intersect at least another two-dimensional plane in the plurality of planes.

6. The method according to claim 1, wherein the representation of the three-dimensional scene includes a plurality of layers, wherein each layer in the plurality of layers includes at least one two-dimensional plane in the plurality of two-dimensional planes and at least a portion of the content.

7. The method according to claim 1, wherein the representation of the three-dimensional scene includes at least one view-dependent layer configured to be viewable only from a predetermined angle of view within the representation of the three-dimensional scene, wherein the at least one view-dependent layer includes at least one two-dimensional plane in the plurality of two-dimensional planes and at least a portion of the content.

8. The method according to claim 1, wherein at least one two-dimensional plane in the plurality of two-dimensional planes includes at least one layer configured to have at least a portion of the content.

9. The method according to claim 1, further comprising
    generating a plurality of angles of view for viewing the three-dimensional representation of the scene;
    selecting an angle of view from the plurality of angles of view for viewing the three-dimensional representation of the scene; and
    changing from at least one selected angle of view in the plurality of angles of view to at least another angle of view in the plurality of angles of view to view the three-dimensional representation of the scene.

10. The method according to claim 9, further comprising:
    selecting a predetermined angle of view from the plurality of angles of view for viewing the three-dimensional representation of the scene, wherein the three-dimensional representation of the scene is not viewable from at least another angle of view of the plurality of angles of view.

11. The method according to claim 9, wherein modification of the content includes
    selecting at least one of the content and at least one two-dimensional plane in the plurality of two-dimensional planes based on a predetermined angle of view; and
    modifying the selected content and the at least one two-dimensional plane based on the predetermined angle of view.

12. The method according to claim 1, wherein the modification of the positioning of the plurality of two-dimensional planes includes
    grouping at least two two-dimensional planes in the plurality of two-dimensional planes based on a predetermined arrangement for positioning in the three-dimensional space.

13. The method according to claim 12, wherein the predetermined arrangement includes at least one of the following: parallel stacks grouping, axial cross-section grouping, a circumferential ring, and a random grouping.

14. The method according to claim 1, wherein the modification of the positioning of the plurality of two-dimensional planes includes
    positioning at least one two-dimensional plane in the plurality of two-dimensional planes based on at least one of the following: at least one geographical coordinate of the content contained on the at least one two-dimensional plane, and a global positioning coordinate of the content contained on the at least one two-dimensional plane.

15. The method according to claim 1, wherein the modification of the positioning of the plurality of two-dimensional planes includes
positioning at least two two-dimensional planes in the plurality of two-dimensional planes based on at least one of the following: at least one geographical coordinate of the content contained on at least one of the two two-dimensional planes, and a global positioning coordinate of the content of at least one of the two two-dimensional planes.

16. The method according to claim 1, wherein the modification of the positioning of the plurality of two-dimensional planes includes
positioning at least one two-dimensional plane in the plurality of two-dimensional planes based on a predetermined three-dimensional model.

17. The method according to claim 1, further comprising:
generating additional content, wherein the additional content is configured to be placed on at least one generated two-dimensional plane in the plurality of two-dimensional planes; and
placing the additional content on at least one generated two-dimensional plane, wherein the additional content is capable of being modified.

18. The method according to claim 1, wherein the modification of content includes
merging a portion of the content contained on at least one two-dimensional plane in the plurality of two-dimensional planes with a portion of the content contained on at least another two-dimensional plane in the plurality of two-dimensional planes.

19. The method according to claim 1, further comprising:
generating another two-dimensional plane;
selecting a portion of the content contained on at least one two-dimensional plane in the plurality of two-dimensional planes; and
placing the selected portion of the content on the another two-dimensional plane.

20. The method according to claim 1, wherein the modification of the content includes
defining at least one attribute for a portion of the content; and
modifying the portion of the content based on the at least one attribute.

21. The method according to claim 20, wherein the at least one attribute includes at least one of the following: a thickness, a length, a width, a height, a brightness, an opacity, at least one geographical coordinate, a time, a moving velocity, a gyroscopical positioning parameter, and/or a combination thereof.

22. The method according to claim 1, wherein the modification of the content includes
removing content from the at least one two-dimensional plane.

23. The method according to claim 1, wherein the modification of the content includes
transferring a portion of the content contained on the at least one two-dimensional plane to another two-dimensional plane in the plurality of two-dimensional planes.

24. The method according to claim 23, wherein the transferring includes at least one of the following: duplicating a portion of content from a first two dimensional plane to a second two-dimensional plane in the plurality of two-dimensional planes, pushing a portion of the content from a view-dependent two-dimensional plane onto another two-dimensional plane in the plurality of two-dimensional planes, and splitting a portion of the content contained on a two-dimensional plane into a first split portion and a second split portion and placing the first split portion onto a first two-dimensional plane and the second split portion onto a second two-dimensional plane in the plurality of two-dimensional planes.

25. The method according to claim 1, wherein the modification of the content includes
projecting a portion of the content contained on a first two-dimensional plane in the plurality of two-dimensional planes onto a second two-dimensional plane in the plurality of two-dimensional planes based on at least one angle of view located within the representation of the three-dimensional scene.

26. The method according to claim 1, wherein the modification of the content includes
copying a portion of the content contained on a first two-dimensional plane in the plurality of two-dimensional planes and placing the copied portion onto a second two-dimensional plane in the plurality of two-dimensional planes.

27. The method according to claim 1, wherein the modification of the content includes
concealing a portion of the content contained on at least one of two-dimensional plane.

28. The method according to claim 1, wherein modification of the content includes
splitting the content contained on at least one two-dimensional plane into at least two portions for placement on at least two other two-dimensional planes in the plurality of two-dimensional planes, wherein at least one of a position and an orientation of the at least one two-dimensional plane is different from respective positions and orientations of the at least two other two-dimensional planes.

29. The method according to claim 1, wherein the modification of the content includes
transforming a portion of the content within at least one two-dimensional plane in the plurality of two-dimensional planes.

30. The method according to claim 29, wherein the transforming includes at least one of the following: freeform distortion, translation, shifting, rotation, scaling, stretching and/or combination thereof.

31. The method according to claim 1, wherein the modification of the positioning of the plurality of two-dimensional planes includes
defining a folding region in at least one two-dimensional plane in the plurality of two-dimensional planes; and
folding, using the defined folding region, the at least one two-dimensional plane into at least two portions representative of the two-dimensional plane separated by the folding region.

32. The method according to claim 1, wherein the modification of the positioning of the plurality of two-dimensional planes includes
defining a bending region in at least one two-dimensional plane in the plurality of two-dimensional planes; and
bending, using the defined bending region, the at least one two-dimensional plane to generate an axial curvature to the at least one two-dimensional plane.

33. The method according to claim 1, wherein the modification of the positioning of the plurality of two-dimensional planes includes
modifying at least one of a position and an orientation of at least one two-dimensional plane.

34. The method according to claim 1, wherein the modification of the positioning of the plurality of two-dimensional planes includes
  inserting a three-dimensional surface into the three-dimensional space;
  visualizing the three-dimensional surface; and
  positioning at least one two-dimensional plane in relation to the inserted three-dimensional surface.

35. The method according to claim 34, wherein the visualizing is performed using at least one of the following: a point cloud and a polygonal mesh.

36. The method according to claim 1, wherein the generated two-dimensional planes are positioned according to at least one first position within the three-dimensional space;
  wherein the modification of the positioning of the generated two-dimensional planes includes
  selecting at least one two-dimensional plane to be re-positioned to at least one second position within the three-dimensional space; and
  re-positioning the selected two-dimensional plane within the three-dimensional space according to the at least one second position.

37. The method according to claim 1, wherein the modification of the content includes
  animating a portion of the content contained on at least one two-dimensional plane in the plurality of two-dimensional planes.

38. The method according to claim 37, wherein the animation is performed based on time.

39. The method according to claim 1, wherein a plurality of users perform at least one generating, the positioning, the modification of the content, and the modification of the positioning of the plurality of two-dimensional planes.

40. A computer program product comprising a machine-readable non-transitory medium storing instructions that, when executed by at least one programmable processor, cause the at least one programmable processor to generate a three-dimensional representation of a scene within a three dimensional space by performing operations comprising:
  generating a plurality of two-dimensional planes to be positioned within the three-dimensional space, wherein the plurality of two dimensional planes include content that is capable of being modified; and
  positioning the generated two-dimensional planes within the three-dimensional space, wherein the positioning is capable of being modified;
  wherein the representation of the three-dimensional scene is configured to be viewed from at least one angle of view located within the representation of the three-dimensional scene.

41. The computer program product according to claim 40, wherein the content includes at least one of the following: an object, a texture, a color, a photograph, a photograph dependent on a predetermined angle of view of the two-dimensional plane, a portion of a photograph, a drawing, a sketch, a stroke, a stroke dependent on a predetermined angle of view of the two-dimensional plane, an occlusion, an annotation, an animation, and a video.

42. The computer program product according to claim 40, wherein the content is a user-defined content.

43. The computer program product according to claim 40, wherein at least a portion of the content is configured to be arranged on at least one two-dimensional plane according to a referential model.

44. The computer program product according to claim 40, wherein at least one two-dimensional plane in the plurality of planes is configured to intersect at least another two-dimensional plane in the plurality of planes.

45. The computer program product according to claim 40, wherein the representation of the three-dimensional scene includes a plurality of layers, wherein each layer in the plurality of layers includes at least one two-dimensional plane in the plurality of two-dimensional planes and at least a portion of the content.

46. The computer program product according to claim 40, wherein the representation of the three-dimensional scene includes at least one view-dependent layer configured to be viewable only from a predetermined angle of view within the representation of the three-dimensional scene, wherein the at least one view-dependent layer includes at least one two-dimensional plane in the plurality of two-dimensional planes and at least a portion of the content.

47. The computer program product according to claim 40, wherein at least one two-dimensional plane in the plurality of two-dimensional planes includes at least one layer configured to have at least a portion of the content.

48. The computer program product according to claim 40, wherein the operations further comprise:
  generating a plurality of angles of view for viewing the three-dimensional representation of the scene;
  selecting an angle of view from the plurality of angles of view for viewing the three-dimensional representation of the scene; and
  changing from at least one selected angle of view in the plurality of angles of view to at least another angle of view in the plurality of angles of view to view the three-dimensional representation of the scene.

49. The computer program product according to claim 48, wherein the operations further comprise:
  selecting a predetermined angle of view from the plurality of angles of view for viewing the three-dimensional representation of the scene, wherein the three-dimensional representation of the scene is not viewable from at least another angle of view of the plurality of angles of view.

50. The computer program product according to claim 48, wherein modification of the content includes
  selecting at least one of the content and at least one two-dimensional plane in the plurality of two-dimensional planes based on a predetermined angle of view; and
  modifying the selected content and the at least one two-dimensional plane based on the predetermined angle of view.

51. The computer program product according to claim 40, wherein the modification of the positioning of the plurality of two-dimensional planes includes
  grouping at least two two-dimensional planes in the plurality of two-dimensional planes based on a predetermined arrangement for positioning in the three-dimensional space.

52. The computer program product according to claim 51, wherein the predetermined arrangement includes at least one of the following: parallel stacks grouping, axial cross-section grouping, a circumferential ring, and a random grouping.

53. The computer program product according to claim 40, wherein the modification of the positioning of the plurality of two-dimensional planes includes
  positioning at least one two-dimensional plane in the plurality of two-dimensional planes based on at least one of the following: at least one geographical coordinate of the content contained on the at least one two-dimensional plane, and a global positioning coordinate of the content contained on the at least one two-dimensional plane.

54. The computer program product according to claim 40, wherein the modification of the positioning of the plurality of two-dimensional planes includes
　　positioning at least two two-dimensional planes in the plurality of two-dimensional planes based on at least one of the following: at least one geographical coordinate of the content contained on at least one of the two two-dimensional planes, and a global positioning coordinate of the content of at least one of the two two-dimensional planes.

55. The computer program product according to claim 40, wherein the modification of the positioning of the plurality of two-dimensional planes includes
　　positioning at least one two-dimensional plane in the plurality of two-dimensional planes based on a predetermined three-dimensional model.

56. The computer program product according to claim 40, wherein the operations further comprise:
　　generating additional content, wherein the additional content is configured to be placed on at least one generated two-dimensional plane in the plurality of two-dimensional planes; and
　　placing the additional content on at least one generated two-dimensional plane, wherein the additional content is capable of being modified.

57. The computer program product according to claim 40, wherein the modification of content includes
　　merging a portion of the content contained on at least one two-dimensional plane in the plurality of two-dimensional planes with a portion of the content contained on at least another two-dimensional plane in the plurality of two-dimensional planes.

58. The computer program product according to claim 40, the operations further comprise:
　　generating another two-dimensional plane;
　　selecting a portion of the content contained on at least one two-dimensional plane in the plurality of two-dimensional planes; and
　　placing the selected portion of the content on the another two-dimensional plane.

59. The computer program product according to claim 40, wherein the modification of the content includes
　　defining at least one attribute for a portion of the content; and
　　modifying the portion of the content based on the at least one attribute.

60. The computer program product according to claim 59, wherein the at least one attribute includes at least one of the following: a thickness, a length, a width, a height, a brightness, an opacity, at least one geographical coordinate, a time, a moving velocity, a gyroscopical positioning parameter, and/or a combination thereof.

61. The computer program product according to claim 40, wherein the modification of the content includes
　　removing content from the at least one two-dimensional plane.

62. The computer program product according to claim 40, wherein the modification of the content includes
　　transferring a portion of the content contained on the at least one two-dimensional plane to another two-dimensional plane in the plurality of two-dimensional planes.

63. The computer program product according to claim 62, wherein the transferring includes at least one of the following: duplicating a portion of content from a first two dimensional plane to a second two-dimensional plane in the plurality of two-dimensional planes, pushing a portion of the content from a view-dependent two-dimensional plane onto another two-dimensional plane in the plurality of two-dimensional planes, and splitting a portion of the content contained on a two-dimensional plane into a first split portion and a second split portion and placing the first split portion onto a first two-dimensional plane and the second split portion onto a second two-dimensional plane in the plurality of two-dimensional planes.

64. The computer program product according to claim 40, wherein the modification of the content includes
　　projecting a portion of the content contained on a first two-dimensional plane in the plurality of two-dimensional planes onto a second two-dimensional plane in the plurality of two-dimensional planes based on at least one angle of view located within the representation of the three-dimensional scene.

65. The computer program product according to claim 40, wherein the modification of the content includes
　　copying a portion of the content contained on a first two-dimensional plane in the plurality of two-dimensional planes and placing the copied portion onto a second two-dimensional plane in the plurality of two-dimensional planes.

66. The computer program product according to claim 40, wherein the modification of the content includes
　　concealing a portion of the content contained on at least one of two-dimensional plane.

67. The computer program product according to claim 40, wherein modification of the content includes
　　splitting the content contained on at least one two-dimensional plane into at least two portions for placement on at least two other two-dimensional planes in the plurality of two-dimensional planes, wherein at least one of a position and an orientation of the at least one two-dimensional plane is different from respective positions and orientations of the at least two other two-dimensional planes.

68. The computer program product according to claim 40, wherein the modification of the content includes
　　transforming a portion of the content within at least one two-dimensional plane in the plurality of two-dimensional planes.

69. The computer program product according to claim 68, wherein the transforming includes at least one of the following: freeform distortion, translation, shifting, rotation, scaling, stretching and/or combination thereof.

70. The computer program product according to claim 40, wherein the modification of the positioning of the plurality of two-dimensional planes includes
　　defining a folding region in at least one two-dimensional plane in the plurality of two-dimensional planes; and
　　folding, using the defined folding region, the at least one two-dimensional plane into at least two portions representative of the two-dimensional plane separated by the folding region.

71. The computer program product according to claim 40, wherein the modification of the positioning of the plurality of two-dimensional planes includes
　　defining a bending region in at least one two-dimensional plane in the plurality of two-dimensional planes; and
　　bending, using the defined bending region, the at least one two-dimensional plane to generate an axial curvature to the at least one two-dimensional plane.

72. The computer program product according to claim 40, wherein the modification of the positioning of the plurality of two-dimensional planes includes
　　modifying at least one of a position and an orientation of at least one two-dimensional plane.

73. The computer program product according to claim 40, wherein the modification of the positioning of the plurality of two-dimensional planes includes
inserting a three-dimensional surface into the three-dimensional space;
visualizing the three-dimensional surface; and
positioning at least one two-dimensional plane in relation to the inserted three-dimensional surface.

74. The computer program product according to claim 73, wherein the visualizing is performed using at least one of the following: a point cloud and a polygonal mesh.

75. The computer program product according to claim 40, wherein the generated two-dimensional planes are positioned according to at least one first position within the three-dimensional space;
wherein the modification of the positioning of the generated two-dimensional planes includes
selecting at least one two-dimensional plane to be re-positioned to at least one second position within the three-dimensional space; and
re-positioning the selected two-dimensional plane within the three-dimensional space according to the at least one second position.

76. The computer program product according to claim 40, wherein the modification of the content includes
animating a portion of the content contained on at least one two-dimensional plane in the plurality of two-dimensional planes.

77. The computer program product according to claim 76, wherein the animation is performed based on time.

78. The computer program product according to claim 40, wherein a plurality of users perform at least one generating, the positioning, the modification of the content, and the modification of the positioning of the plurality of two-dimensional planes.

79. A system for generating a three-dimensional representation of a scene within a three dimensional space comprising:
at least one programmable processor; and
a machine-readable medium storing instructions that, when executed by the at least one programmable processor, cause the at least one programmable processor to perform operations comprising:
generating a plurality of two-dimensional planes to be positioned within the three-dimensional space, wherein the plurality of two dimensional planes include content that is capable of being modified; and
positioning the generated two-dimensional planes within the three-dimensional space, wherein the positioning is capable of being modified;
wherein the representation of the three-dimensional scene is configured to be viewed from at least one angle of view located within the representation of the three-dimensional scene.

80. The system according to claim 79, wherein the content includes at least one of the following: an object, a texture, a color, a photograph, a photograph dependent on a predetermined angle of view of the two-dimensional plane, a portion of a photograph, a drawing, a sketch, a stroke, a stroke dependent on a predetermined angle of view of the two-dimensional plane, an occlusion, an annotation, an animation, and a video.

81. The system according to claim 79, wherein the content is a user-defined content.

82. The system according to claim 79, wherein at least a portion of the content is configured to be arranged on at least one two-dimensional plane according to a referential model.

83. The system according to claim 79, wherein at least one two-dimensional plane in the plurality of planes is configured to intersect at least another two-dimensional plane in the plurality of planes.

84. The system according to claim 79, wherein the representation of the three-dimensional scene includes a plurality of layers, wherein each layer in the plurality of layers includes at least one two-dimensional plane in the plurality of two-dimensional planes and at least a portion of the content.

85. The system according to claim 79, wherein the representation of the three-dimensional scene includes at least one view-dependent layer configured to be viewable only from a predetermined angle of view within the representation of the three-dimensional scene, wherein the at least one view-dependent layer includes at least one two-dimensional plane in the plurality of two-dimensional planes and at least a portion of the content.

86. The system according to claim 79, wherein at least one two-dimensional plane in the plurality of two-dimensional planes includes at least one layer configured to have at least a portion of the content.

87. The system according to claim 79, wherein the operations further comprise:
generating a plurality of angles of view for viewing the three-dimensional representation of the scene;
selecting an angle of view from the plurality of angles of view for viewing the three-dimensional representation of the scene; and
changing from at least one selected angle of view in the plurality of angles of view to at least another angle of view in the plurality of angles of view to view the three-dimensional representation of the scene.

88. The system according to claim 87, wherein the operations further comprise:
selecting a predetermined angle of view from the plurality of angles of view for viewing the three-dimensional representation of the scene, wherein the three-dimensional representation of the scene is not viewable from at least another angle of view of the plurality of angles of view.

89. The system according to claim 87, wherein modification of the content includes
selecting at least one of the content and at least one two-dimensional plane in the plurality of two-dimensional planes based on a predetermined angle of view; and
modifying the selected content and the at least one two-dimensional plane based on the predetermined angle of view.

90. The system according to claim 79, wherein the modification of the positioning of the plurality of two-dimensional planes includes
grouping at least two two-dimensional planes in the plurality of two-dimensional planes based on a predetermined arrangement for positioning in the three-dimensional space.

91. The system according to claim 90, wherein the predetermined arrangement includes at least one of the following: parallel stacks grouping, axial cross-section grouping, a circumferential ring, and a random grouping.

92. The system according to claim 79, wherein the modification of the positioning of the plurality of two-dimensional planes includes
positioning at least one two-dimensional plane in the plurality of two-dimensional planes based on at least one of the following: at least one geographical coordinate of the content contained on the at least one two-dimensional plane, and a global positioning coordinate of the content contained on the at least one two-dimensional plane.

93. The system according to claim 79, wherein the modification of the positioning of the plurality of two-dimensional planes includes
positioning at least two two-dimensional planes in the plurality of two-dimensional planes based on at least one of the following: at least one geographical coordinate of the content contained on at least one of the two two-dimensional planes, and a global positioning coordinate of the content of at least one of the two two-dimensional planes.

94. The system according to claim 79, wherein the modification of the positioning of the plurality of two-dimensional planes includes
positioning at least one two-dimensional plane in the plurality of two-dimensional planes based on a predetermined three-dimensional model.

95. The system according to claim 79, wherein the operations further comprise:
generating additional content, wherein the additional content is configured to be placed on at least one generated two-dimensional plane in the plurality of two-dimensional planes; and
placing the additional content on at least one generated two-dimensional plane, wherein the additional content is capable of being modified.

96. The system according to claim 79, wherein the modification of content includes
merging a portion of the content contained on at least one two-dimensional plane in the plurality of two-dimensional planes with a portion of the content contained on at least another two-dimensional plane in the plurality of two-dimensional planes.

97. The system according to claim 79, the operations further comprise:
generating another two-dimensional plane;
selecting a portion of the content contained on at least one two-dimensional plane in the plurality of two-dimensional planes; and
placing the selected portion of the content on the another two-dimensional plane.

98. The system according to claim 79, wherein the modification of the content includes
defining at least one attribute for a portion of the content; and
modifying the portion of the content based on the at least one attribute.

99. The system according to claim 98, wherein the at least one attribute includes at least one of the following: a thickness, a length, a width, a height, a brightness, an opacity, at least one geographical coordinate, a time, a moving velocity, a gyroscopical positioning parameter, and/or a combination thereof.

100. The system according to claim 79, wherein the modification of the content includes
removing content from the at least one two-dimensional plane.

101. The system according to claim 79, wherein the modification of the content includes
transferring a portion of the content contained on the at least one two-dimensional plane to another two-dimensional plane in the plurality of two-dimensional planes.

102. The system according to claim 101, wherein the transferring includes at least one of the following: duplicating a portion of content from a first two dimensional plane to a second two-dimensional plane in the plurality of two-dimensional planes, pushing a portion of the content from a view-dependent two-dimensional plane onto another two-dimensional plane in the plurality of two-dimensional planes, and splitting a portion of the content contained on a two-dimensional plane into a first split portion and a second split portion and placing the first split portion onto a first two-dimensional plane and the second split portion onto a second two-dimensional plane in the plurality of two-dimensional planes.

103. The system according to claim 79, wherein the modification of the content includes
projecting a portion of the content contained on a first two-dimensional plane in the plurality of two-dimensional planes onto a second two-dimensional plane in the plurality of two-dimensional planes based on at least one angle of view located within the representation of the three-dimensional scene.

104. The system according to claim 79, wherein the modification of the content includes
copying a portion of the content contained on a first two-dimensional plane in the plurality of two-dimensional planes and placing the copied portion onto a second two-dimensional plane in the plurality of two-dimensional planes.

105. The system according to claim 79, wherein the modification of the content includes
concealing a portion of the content contained on at least one of two-dimensional plane.

106. The system according to claim 79, wherein modification of the content includes
splitting the content contained on at least one two-dimensional plane into at least two portions for placement on at least two other two-dimensional planes in the plurality of two-dimensional planes, wherein at least one of a position and an orientation of the at least one two-dimensional plane is different from respective positions and orientations of the at least two other two-dimensional planes.

107. The system according to claim 79, wherein the modification of the content includes
transforming a portion of the content within at least one two-dimensional plane in the plurality of two-dimensional planes.

108. The system according to claim 107, wherein the transforming includes at least one of the following: freeform distortion, translation, shifting, rotation, scaling, stretching and/or combination thereof.

109. The system according to claim 79, wherein the modification of the positioning of the plurality of two-dimensional planes includes
defining a folding region in at least one two-dimensional plane in the plurality of two-dimensional planes; and
folding, using the defined folding region, the at least one two-dimensional plane into at least two portions representative of the two-dimensional plane separated by the folding region.

110. The system according to claim 79, wherein the modification of the positioning of the plurality of two-dimensional planes includes
defining a bending region in at least one two-dimensional plane in the plurality of two-dimensional planes; and
bending, using the defined bending region, the at least one two-dimensional plane to generate an axial curvature to the at least one two-dimensional plane.

111. The system according to claim 79, wherein the modification of the positioning of the plurality of two-dimensional planes includes
modifying at least one of a position and an orientation of at least one two-dimensional plane.

112. The system according to claim 79, wherein the modification of the positioning of the plurality of two-dimensional planes includes
inserting a three-dimensional surface into the three-dimensional space;
visualizing the three-dimensional surface; and
positioning at least one two-dimensional plane in relation to the inserted three-dimensional surface.

113. The system according to claim 112, wherein the visualizing is performed using at least one of the following: a point cloud and a polygonal mesh.

114. The system according to claim 79, wherein the generated two-dimensional planes are positioned according to at least one first position within the three-dimensional space; wherein the modification of the positioning of the generated two-dimensional planes includes
selecting at least one two-dimensional plane to be re-positioned to at least one second position within the three-dimensional space; and
re-positioning the selected two-dimensional plane within the three-dimensional space according to the at least one second position.

115. The system according to claim 79, wherein the modification of the content includes
animating a portion of the content contained on at least one two-dimensional plane in the plurality of two-dimensional planes.

116. The system according to claim 115, wherein the animation is performed based on time.

117. The system according to claim 79, wherein a plurality of users perform at least one generating, the positioning, the modification of the content, and the modification of the positioning of the plurality of two-dimensional planes.

\* \* \* \* \*